US012094303B2

(12) United States Patent
Fine et al.

(10) Patent No.: US 12,094,303 B2
(45) **Date of Patent: *Sep. 17, 2024**

(54) SYSTEM AND METHOD OF REVEALING THE OUTCOMES OF REAL WORLD WAGERS USING RESERVE WAGERING

(71) Applicant: Game Play Network, Inc., Los Angeles, CA (US)

(72) Inventors: Russell Marc Fine, Westlake Village, CA (US); Jamison Todd Selby, Sherman Oaks, CA (US); Robert John Siemasko, Las Vegas, NV (US); David Michael Marshall, Los Angeles, CA (US); Scott Alan Solomon, San Francisco, CA (US)

(73) Assignee: Game Play Network, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,018

(22) Filed: Oct. 3, 2023

(65) Prior Publication Data

US 2024/0038028 A1 Feb. 1, 2024

Related U.S. Application Data

(63) Continuation of application No. 17/817,691, filed on Aug. 5, 2022, now Pat. No. 11,798,376, which is a (Continued)

(51) Int. Cl.
*G07F 17/32* (2006.01)

(52) U.S. Cl.
CPC ...... *G07F 17/3288* (2013.01); *G07F 17/3227* (2013.01); *G07F 17/3239* (2013.01)

(58) Field of Classification Search
CPC ............. G07F 17/3288; G07F 17/3227; G07F 17/3239
See application file for complete search history.

(56) References Cited

U.S. PATENT DOCUMENTS 4,582,324 A 4/1986 Koza
5,709,603 A 1/1998 Kaye (Continued)

FOREIGN PATENT DOCUMENTS

WO 2006060438 6/2006
WO 2011109454 A1 9/2011

(Continued)

*Primary Examiner* — Kevin Y Kim

(74) *Attorney, Agent, or Firm* — Sheppard Mullin Richter & Hampton LLP

(57) ABSTRACT

The invention relates to systems and methods of revealing portions of outcomes of real-world wagers through interactive media by storing reserve wagers, receiving an indication a first token has been acquired by a user, determining a tracking wager associated with the first token, matching a stored reserve wager with the tracking wager, associating the matched reserve wager with the first token, and revealing at least a portion of the outcome of the matched reserve wager to the user by the user's interaction with the interactive media. By integrating real-world wager outcomes with user interactions, the system may provide an engaging user experience with interactive media. For example, a game may reveal an outcome of a real-world wager (which has already occurred), in response to in-game actions such as user actions in the game, other players' actions, game events, and/or other events.

22 Claims, 16 Drawing Sheets

Related U.S. Application Data continuation of application No. 17/553,166, filed on Dec. 16, 2021, now Pat. No. 11,410,504.

(56) References Cited

U.S. PATENT DOCUMENTS

| | | | |
|---|---|---|---|
| 5,749,785 | A | 5/1998 | Rossides |
| 6,450,887 | B1 | 9/2002 | Mir |
| 6,511,375 | B1 | 1/2003 | Kaminkow |
| 6,729,961 | B1 | 5/2004 | Millerschone |
| 6,749,500 | B1 | 6/2004 | Nelson |
| 6,761,632 | B2 | 7/2004 | Bansemer |
| 6,786,818 | B1 | 9/2004 | Rothschild |
| 6,939,224 | B2 | 9/2005 | Palmer |
| 7,530,892 | B2 | 5/2009 | Jordan |
| 7,658,672 | B1 | 2/2010 | Wolf |
| 7,666,082 | B2 | 2/2010 | Kane |
| 7,699,706 | B2 | 4/2010 | Walker |
| 7,785,187 | B2 | 8/2010 | Millerschone |
| 7,798,896 | B2 | 9/2010 | Katz |
| 7,931,531 | B2 | 4/2011 | Oberberger |
| 7,942,735 | B2 | 5/2011 | Meyer |
| 7,950,993 | B2 | 5/2011 | Oberberger |
| 8,012,014 | B2 | 9/2011 | Low |
| 8,162,735 | B2 | 4/2012 | Walker |
| 8,167,309 | B1 | 5/2012 | Laut |
| 8,348,753 | B2 | 1/2013 | Low |
| 8,353,757 | B2 | 1/2013 | Walker |
| 8,376,833 | B1 | 2/2013 | Gagner |
| 8,393,949 | B2 | 3/2013 | Kane |
| 8,430,735 | B2 | 4/2013 | Oberberger |
| 8,449,375 | B2 | 5/2013 | Oberberger |
| 8,613,649 | B2 | 12/2013 | Low |
| 8,651,960 | B2 | 2/2014 | Malik |
| 8,657,680 | B2 | 2/2014 | Chung |
| 8,721,433 | B2 | 5/2014 | Walker |
| 8,764,567 | B2 | 7/2014 | Smith |
| 8,777,735 | B1 | 7/2014 | Fine |
| 8,784,198 | B2 | 7/2014 | Walker |
| 8,819,758 | B2 | 8/2014 | Howe |
| 8,845,409 | B2 | 9/2014 | Kane |
| 8,864,564 | B2 | 10/2014 | Oberberger |
| 8,864,572 | B2 | 10/2014 | Oberberger |
| 8,915,781 | B2 | 12/2014 | Fine |
| 8,961,300 | B2 | 2/2015 | Fine |
| 8,961,301 | B2 | 2/2015 | Fine |
| 8,968,082 | B2 | 3/2015 | Fine |
| 8,968,104 | B2 | 3/2015 | Fine |
| 8,974,284 | B2 | 3/2015 | Selby |
| 8,986,096 | B2 | 3/2015 | Fine |
| 8,992,311 | B2 | 3/2015 | Fine |
| 8,992,312 | B2 | 3/2015 | Fine |
| 9,070,252 | B2 | 6/2015 | Riahei |
| 9,070,253 | B2 | 6/2015 | Tung |
| 9,076,294 | B2 | 7/2015 | Fine |
| 9,076,295 | B2 | 7/2015 | Fine |
| 9,092,939 | B2 | 7/2015 | Fine |
| 9,092,940 | B2 | 7/2015 | Fine |
| 9,214,063 | B2 | 12/2015 | Fine |
| 9,224,262 | B2 | 12/2015 | Fine |
| 9,299,218 | B2 | 3/2016 | Fine |
| 9,305,428 | B2 | 4/2016 | Fine |
| 9,317,997 | B2 | 4/2016 | Fine |
| 9,317,998 | B2 | 4/2016 | Fine |
| 9,317,999 | B2 | 4/2016 | Fine |
| 9,406,195 | B2 | 8/2016 | Fine |
| 9,443,383 | B2 | 9/2016 | Fine |
| 9,489,798 | B2 | 11/2016 | Fine |
| 9,536,385 | B2 | 1/2017 | Fine |
| 9,552,694 | B2 | 1/2017 | Fine |
| 9,552,696 | B2 | 1/2017 | Fine |
| 9,558,623 | B2 | 1/2017 | Fine |
| 9,576,426 | B2 | 2/2017 | Marshall |
| 9,728,037 | B2 | 8/2017 | Fine |
| 9,767,651 | B2 | 9/2017 | Fine |
| 9,786,127 | B2 | 10/2017 | Marshall |
| 2001/0007828 | A1 | 7/2001 | Walker |
| 2001/0008842 | A1 | 7/2001 | Walker |
| 2002/0010013 | A1 | 1/2002 | Walker |
| 2002/0022516 | A1 | 2/2002 | Forden |
| 2002/0049082 | A1 | 4/2002 | Bansemer |
| 2002/0077165 | A1 | 6/2002 | Bansemer |
| 2002/0151363 | A1 | 10/2002 | Letovsky |
| 2002/0169018 | A1 | 11/2002 | Schneier |
| 2003/0003980 | A1 | 1/2003 | Moody |
| 2003/0013514 | A1 | 1/2003 | Cregan |
| 2003/0054879 | A1 | 3/2003 | Schneier |
| 2003/0060276 | A1 | 3/2003 | Walker |
| 2003/0078103 | A1 | 4/2003 | Lemay |
| 2003/0087683 | A1 | 5/2003 | Gatto |
| 2003/0199312 | A1 | 10/2003 | Walker |
| 2003/0220133 | A1 | 11/2003 | Walker |
| 2004/0072618 | A1 | 4/2004 | Bartholomew |
| 2004/0229671 | A1 | 11/2004 | Stronach |
| 2004/0235542 | A1 | 11/2004 | Stronach |
| 2004/0259631 | A1 | 12/2004 | Katz |
| 2005/0023758 | A1 | 2/2005 | Noyes |
| 2005/0054441 | A1 | 3/2005 | Landrum |
| 2005/0143170 | A1 | 6/2005 | Maya |
| 2005/0164779 | A1 | 7/2005 | Okuniewicz |
| 2006/0035697 | A1 | 2/2006 | Packes |
| 2006/0052148 | A1 | 3/2006 | Blair |
| 2006/0082056 | A1 | 4/2006 | Kane |
| 2006/0100009 | A1 | 5/2006 | Walker |
| 2006/0111172 | A1 | 5/2006 | Walker |
| 2006/0121973 | A1 | 6/2006 | Parisien |
| 2006/0135249 | A1 | 6/2006 | Seelig |
| 2006/0154714 | A1 | 7/2006 | Montross |
| 2006/0154720 | A1 | 7/2006 | Okuniewicz |
| 2006/0154721 | A1 | 7/2006 | Okuniewicz |
| 2006/0154724 | A1 | 7/2006 | Okuniewicz |
| 2006/0258459 | A1 | 11/2006 | Davis |
| 2006/0294568 | A1 | 12/2006 | Walter |
| 2007/0060254 | A1 | 3/2007 | Muir |
| 2007/0060295 | A1 | 3/2007 | Demar |
| 2007/0167226 | A1 | 7/2007 | Kelly |
| 2007/0173327 | A1 | 7/2007 | Kilgore |
| 2007/0178969 | A1 | 8/2007 | Luciano |
| 2007/0265060 | A1 | 11/2007 | Hornik |
| 2007/0265068 | A1 | 11/2007 | Kane |
| 2007/0293305 | A1 | 12/2007 | Amour |
| 2008/0026816 | A1 | 1/2008 | Sammon |
| 2008/0032762 | A1 | 2/2008 | Kane |
| 2008/0045295 | A1 | 2/2008 | Walker |
| 2008/0064478 | A1 | 3/2008 | Roukis |
| 2008/0070669 | A1 | 3/2008 | Walker |
| 2008/0085769 | A1 | 4/2008 | Lutnick |
| 2008/0108406 | A1 | 5/2008 | Oberberger |
| 2008/0108425 | A1 | 5/2008 | Oberberger |
| 2008/0176637 | A1 | 7/2008 | Letovsky |
| 2008/0200225 | A1 | 8/2008 | Walker |
| 2008/0270288 | A1 | 10/2008 | Butterly |
| 2008/0300055 | A1 | 12/2008 | Lutnick |
| 2009/0054148 | A1 | 2/2009 | Hardy |
| 2009/0093299 | A1 | 4/2009 | Acres |
| 2009/0227367 | A1 | 9/2009 | Schneier |
| 2009/0227377 | A1 | 9/2009 | Yin |
| 2009/0247272 | A1 | 10/2009 | Abe |
| 2009/0291736 | A1 | 11/2009 | Walker |
| 2009/0312094 | A1 | 12/2009 | Dewaal |
| 2010/0016056 | A1 | 1/2010 | Thomas |
| 2010/0035679 | A1 | 2/2010 | Oram |
| 2010/0062840 | A1 | 3/2010 | Herrmann |
| 2010/0120491 | A1 | 5/2010 | McLaughlin |
| 2010/0144428 | A1 | 6/2010 | Fontaine |
| 2010/0304843 | A1 | 12/2010 | Aoki |
| 2010/0311496 | A1 | 12/2010 | Taylor |
| 2011/0086702 | A1 | 4/2011 | Borst |
| 2011/0212766 | A1 | 9/2011 | Bowers |
| 2011/0218028 | A1 | 9/2011 | Acres |
| 2011/0224001 | A1 | 9/2011 | Yin |
| 2011/0224002 | A1 | 9/2011 | Burke |
| 2011/0250974 | A1 | 10/2011 | Shuster |
| 2011/0287841 | A1 | 11/2011 | Watanabe |
| 2012/0071223 | A1 | 3/2012 | Sharkov |

(56) References Cited

U.S. PATENT DOCUMENTS

| | | | |
|---|---|---|---|
| 2012/0100918 | A1 | 4/2012 | Ginsberg |
| 2012/0172112 | A1 | 7/2012 | Sklanka |
| 2012/0178514 | A1 | 7/2012 | Schulzke |
| 2012/0190435 | A1 | 7/2012 | Muir |
| 2012/0201365 | A1 | 8/2012 | Brown |
| 2012/0202571 | A1 | 8/2012 | Stanek |
| 2012/0214576 | A1 | 8/2012 | Okuniewicz |
| 2012/0244923 | A1 | 9/2012 | Wolf |
| 2012/0302312 | A1 | 11/2012 | Katz |
| 2012/0309499 | A1 | 12/2012 | Bigelow |
| 2012/0309511 | A1 | 12/2012 | Chung |
| 2012/0315979 | A1 | 12/2012 | Eads |
| 2012/0315981 | A1 | 12/2012 | Gagner |
| 2012/0322545 | A1 | 12/2012 | Arnone |
| 2013/0053118 | A1 | 2/2013 | Schueller |
| 2013/0072288 | A1 | 3/2013 | Thoeni |
| 2013/0084951 | A1 | 4/2013 | Davis |
| 2013/0102372 | A1 | 4/2013 | Lutnick |
| 2013/0122999 | A1 | 5/2013 | Gagner |
| 2013/0165209 | A1 | 6/2013 | Lemay |
| 2013/0165210 | A1 | 6/2013 | Nelson |
| 2013/0172059 | A1 | 7/2013 | Nicely |
| 2013/0190074 | A1 | 7/2013 | Arnone |
| 2013/0217471 | A1 | 8/2013 | Arnone |
| 2013/0225272 | A1 | 8/2013 | Moshal |
| 2013/0225297 | A1 | 8/2013 | Bautista |
| 2013/0225298 | A1 | 8/2013 | Hamlin |
| 2013/0237326 | A1 | 9/2013 | Arnone |
| 2013/0244764 | A1 | 9/2013 | Arnone |
| 2013/0244765 | A1 | 9/2013 | Arnone |
| 2013/0252687 | A1 | 9/2013 | Arnone |
| 2013/0252693 | A1 | 9/2013 | Arnone |
| 2013/0252718 | A1 | 9/2013 | Arnone |
| 2013/0324220 | A1 | 12/2013 | Dicillo |
| 2013/0324228 | A1 | 12/2013 | Barber |
| 2013/0337887 | A1 | 12/2013 | Meistrich |
| 2014/0024437 | A1 | 1/2014 | Vann |
| 2014/0024442 | A1 | 1/2014 | Johnson |
| 2014/0024454 | A1 | 1/2014 | Patchen |
| 2014/0040765 | A1 | 2/2014 | Fung |
| 2014/0080585 | A1 | 3/2014 | Anderson |
| 2014/0082645 | A1 | 3/2014 | Stern |
| 2014/0087801 | A1 | 3/2014 | Nicely |
| 2014/0087851 | A1 | 3/2014 | Low |
| 2014/0094274 | A1 | 4/2014 | Guinn |
| 2014/0135084 | A1 | 5/2014 | Venkat |
| 2014/0274263 | A1 | 9/2014 | Fine |
| 2014/0274264 | A1 | 9/2014 | Fine |
| 2014/0274265 | A1 | 9/2014 | Fine |
| 2014/0274266 | A1 | 9/2014 | Fine |
| 2014/0274267 | A1 | 9/2014 | Fine |
| 2014/0274268 | A1 | 9/2014 | Marshall |
| 2014/0274269 | A1 | 9/2014 | Fine |
| 2014/0274270 | A1 | 9/2014 | Fine |
| 2014/0274271 | A1 | 9/2014 | Fine |
| 2014/0274272 | A1 | 9/2014 | Tung |
| 2014/0274325 | A1 | 9/2014 | Fine |
| 2014/0274326 | A1 | 9/2014 | Fine |
| 2014/0274327 | A1 | 9/2014 | Fine |
| 2014/0274328 | A1 | 9/2014 | Fine |
| 2014/0274329 | A1 | 9/2014 | Fine |
| 2014/0274330 | A1 | 9/2014 | Selby |
| 2014/0274331 | A1 | 9/2014 | Fine |
| 2014/0274333 | A1 | 9/2014 | Fine |
| 2014/0274334 | A1 | 9/2014 | Fine |
| 2014/0274335 | A1 | 9/2014 | Fine |
| 2014/0274336 | A1 | 9/2014 | Tung |
| 2014/0274337 | A1 | 9/2014 | Fine |
| 2014/0274338 | A1 | 9/2014 | Fine |
| 2014/0274339 | A1 | 9/2014 | Fine |
| 2014/0274340 | A1 | 9/2014 | Fine |
| 2014/0274352 | A1 | 9/2014 | Marshall |
| 2014/0274365 | A1 | 9/2014 | Riahei |
| 2014/0302905 | A1 | 10/2014 | Fine |
| 2015/0170470 | A1 | 6/2015 | Fine |
| 2015/0170471 | A1 | 6/2015 | Fine |
| 2015/0199875 | A1 | 7/2015 | Fine |
| 2015/0206389 | A1 | 7/2015 | Fine |
| 2015/0332554 | A1 | 11/2015 | Fine |
| 2016/0071368 | A1 | 3/2016 | Fine |
| 2016/0071372 | A1 | 3/2016 | Fine |
| 2016/0098898 | A1 | 4/2016 | Fine |
| 2016/0232746 | A1 | 8/2016 | Fine |
| 2016/0247351 | A1 | 8/2016 | Fine |
| 2016/0275753 | A1 | 9/2016 | Fine |
| 2017/0127135 | A1 | 5/2017 | Chung |
| 2022/0076538 | A1 | 3/2022 | Ford |

FOREIGN PATENT DOCUMENTS

| | | |
|---|---|---|
| WO | 2012078668 | 1/2012 |
| WO | 2014160446 | 1/2014 |

FIG. 7
700
http://url.com
Balance: $1,000.00
701
Manage my account
702
PLACE REAL WORLD WAGER
704
PLAY GAMES
706
WATCH VIDEOS
708
OTHER ACTIONS
710

FIG. 10
1000
http://url.com/selectgames
1001
Balance: $10.00
GAME 1
$0.50 TO PLAY
GAME 2
$1 TO PLAY
GAME 3
$0.75 TO PLAY
NEW!
GAME 4
$2 TO PLAY
GAME 5
$1.50 TO PLAY
Play this game now to get a special prize
GAME 6
FREE!
OTHER GAMES

SYSTEM AND METHOD OF REVEALING THE OUTCOMES OF REAL WORLD WAGERS USING RESERVE WAGERING

CROSS-REFERENCE TO RELATED APPLICATIONS

This application is a continuation of U.S. patent application Ser. No. 17/817,691, filed Aug. 5, 2022, entitled "SYSTEM AND METHOD OF REVEALING THE OUTCOMES OF REAL WORLD WAGERS USING RESERVE WAGERING", which is a continuation of U.S. patent application Ser. No. 17/553,166, filed Dec. 16, 2021, entitled "SYSTEM AND METHOD OF REVEALING THE OUTCOMES OF REAL WORLD WAGERS USING RESERVE WAGERING" (which issued as U.S. Pat. No. 11,410,504 on Aug. 9, 2022), which are hereby incorporated herein by reference in their entirety.

FIELD OF THE INVENTION

The invention relates to systems and methods for revealing portions of outcomes of real-world wagers through interactive media while avoiding wager outcome delay by placing and storing results of reserve wagers, managing the allocation of reserve wagers to users, and revealing at least a portion of the outcome of the reserve wager to the user by the user's interaction with the interactive media.

BACKGROUND OF THE INVENTION

Delayed reveal systems in general are known. Some delayed reveal systems provide a more engaging user experience than traditional wagering systems by allowing users to place real-world wagers (e.g., on an upcoming horse race), the results of which (e.g., the payouts) are tracked by the system but the results are not immediately displayed to a user. In some cases, the users unrevealed results are tracked in an unrevealed account associated with the user and revealed results are tracked via a revealed account associated with the user.

In delayed reveal systems, rather than immediately presenting the results of the real-world wager to the user, the systems allow the user to interact with interactive media (e.g., a video game), which then presents the results of the real-world wagers as responses to that interaction. In this manner, the real-world results appear to be outcomes of interactive media interactions rather than the direct results of the real-world wagers. By integrating real-world wager outcomes with gameplay and other user interactions, the system may provide an engaging user experience with interactive media. For example, a game may reveal an outcome of a real-world wager (which has already occurred), in response to in-game actions such as user actions in the game, other players' actions in the game, game events (e.g., events caused by the game logic/artificial intelligence), and/or other events. Various examples of this delayed reveal mechanism are disclosed, for example, in U.S. Pat. No. 10,186,115, entitled "System And Method Of Revealing Real World Wager Outcomes Based On User Interactions With Interactive Media" and various other patents referenced therein. U.S. Pat. No. 10,186,115 is hereby incorporated herein by reference in its entirety.

In such existing systems, users typically will allocate a certain amount of money and the system will place a corresponding amount of wagers on the user's behalf through the system. When the results of the wagers are received, the results are not immediately presented to the user, but the value of the results are added to that user's unrevealed account. If the user runs out of value in their unrevealed account (or at other desired times), the user may allocate an additional sum of money and the system will place additional wagers on the user's behalf through the system.

One of the problems with this approach is that if, at a time a user desired to allocate money for wagers, wagers are not available, the user must wait to make the wager to be able to engage in the interactive media through which the results are displayed. This is due to the fact that the range of real-world wagers that may be placed may be limited. For example, if the real-world wagers are based on horse races, there are a limited number of horse races a day at any given track and there is a period of time between races. This can lead to a situation where a user needs to place real-world wagers, but the opportunity to place a wager does not currently exist. When this occurs, y a user typically needs to wait to place a wager before they have outcomes that may be revealed through interactive media. This delay, called a wager outcome delay, may be from minutes to hours or more depending on the time of day and other factors (e.g., when horse races are actively being run).

The inventors herein have recognized that wager outcome delay is undesirable in systems and methods of revealing portions of outcomes of real-world wagers through interactive media. Other drawbacks exist.

SUMMARY OF THE INVENTION

According to one aspect of the invention, the system may use various technology approaches to overcome wager outcome delay in delayed reveal systems.

According to an aspect of the invention, there is provided a system and method for revealing portions of outcomes of real-world wagers through interactive media applications using stored reserve wagers. Stored reserve wagers are wagers that are placed by the system. When the results of the wager (or a group of wagers) are received, the results are stored by the system in a reserve wager store of the system. The reserve wager store is maintained by the system to ensure there is an available supply of wager results in real-time as a user needs or desires to obtain additional wagers. As needed, a portion of the reserve wagers, for which results have been obtained and stored by the system, may be allocated to the user. This overcomes issues associated with wager outcome delay, in part, by avoiding the need for a user to wait for a real-world wager to be placed and results obtained.

Various technologies and approaches may be used to determine how to store and allocate reserve wagers to users. According to one approach, all of the reserve wagers results flow into a single pool and portions of the pool may be allocated to a user as needed. In another approach, the system may make reserve wagers on behalf of a user, and the results of the reserve wagers are stored in a reserve wager account for a specific user. This account is a separate account from the players unrevealed account and the revealed account. These wagers are designated for a user, but since the user has not yet "bought" the wagers, the results are not available to the user. Once the user buys additional wagers, the results of reserved wagers may be added to the user's unrevealed account and deleted from the user's reserve wager.

According to an aspect of the invention, the reserve wagers may be real-world wagers that are independently placed by the system according to system rules and/or preferences. The reserve wagers, and their respective results (when available), may be stored in a reserve wager store, the contents of which are maintained by the system to ensure there is an available supply of reserve wagers. The amount and value of wagers the system makes can be managed through various technologies (e.g., heuristics) based on a desire to balance the desire to always maintain the availability of wager results when needed by a user while not over committing unnecessary capital by making more wagers than necessary.

The wagers in the store may or may not be "paid" (i.e. their outcome is known). They may be stored in an encrypted/secure manner, so that if their outcomes/prizing is known in the store, it is unknown outside the store system, and cannot be inquired (to defeat cheating).

According to an aspect of the invention, there is provided a system and method for revealing portions of outcomes of real-world wagers related to a token acquisition through interactive media applications by storing a plurality of reserve wagers in a reserve wager store, receiving an indication that a first token has been acquired by a user, determining a tracking wager associated with the first token, matching at least one reserve wager of the plurality of reserve wagers in the reserve wager store with the tracking wager, associating the matched reserve wager with the first token, obtaining an outcome of the matched reserve wager, updating an unrevealed account balance associated with the user based on the outcome of the matched reserve wager, and causing at least a portion of the unrevealed account balance to be revealed to the user by the user's interaction with interactive media.

The system architecture may include a set of accounts and wallets. According to some embodiments of the invention, the system may be configured to maintain a number of accounts associated with the user in order to implement the features described herein. Certain accounts may be visible to, or hidden from, the user. A Cash Balance Account, or Advanced Deposit Wagering Account, may be provided to maintain a user's current cash balance, which may be displayed to the user. A Token Account may maintain a user's tokens and related information. A Revealed Account maintains a user's first balance that includes payouts that have been revealed to the user. The Revealed Account may be accessible to make purchases, place wagers, etc., and is what the user perceives is the value of the user's account. An Unrevealed Account may be provided to maintain a user's second balance that includes payouts that have not yet been revealed to the user, but which are known by the system. A user's tokens may be held in a "Pending" state until the underlying hidden reveal value is known to the system (i.e. the race the wagers were placed on hasn't been completed.) A Reserve Unrevealed Account may be provided to maintain reserve wager outcomes in a manner such that they are not revealed to the user or known to the system. As part of the delayed reveal functionality discussed herein, certain outcomes stored in the Reserve Unrevealed Account may be revealed to a user and then transferred to the user's Revealed Account. The underlying value of the reserved wagers stored in the Reserve Unrevealed Account may be encrypted.

Claiming Reserved Wagers

When a user deposits cash into their account, the Advanced Deposit Wagering Account will reflect their cash balance. When a user elects to use funds from the Advanced Deposit Wagering Account to buy tokens and agrees to utilize the reserve wagering process (e.g., by selecting such functionality via a user interface and accepting terms and conditions displayed thereon), the user's cash balance from their Advanced Deposit Wagering Account is decremented, and a token balance in their Token Account is incremented. But rather than the incrementation being related to the result of a wager being placed in response to the token purchase via a standard process, a reserve wager is assigned to the token and an outcome of the reserve wager is placed in the user's Reserve Unrevealed Account. Then, as outcomes of the reserve wager are revealed to the user, the Reserve Unrevealed Account is decremented and the Revealed Account is incremented (assuming the outcome is positive).

First Wager

The system may account for reserved wagers in various ways. For example, the reserved wagers can be reserved on a per player or per account basis (e.g., each wagering account or player has its own store of reserved wagers). Alternatively, the reserved wagers can be configured to be owned by a third party (i.e. the company store), or remain "unowned" in the wagering system, waiting to be retrieved/assigned to a user on an as-needed basis. In various embodiments, any wager replaced by a reserve wager may still be placed and its outcome tracked and may then be used as a new reserve wager in the reserve wager store (e.g., replacing the reserve wager that was previously used) or provided as a bonus to the user.

Subsequent Wagers

If, after playing through their token balance, the user elects to purchase additional tokens, the system can be configured to perform the same process, assigning the user a matching balance amount from the system's or user's reserved wagers store.

Account Abandonment

If a user stops wagering (e.g. closes or otherwise abandons their account), any balance in the Reserve Unrevealed Account may be revealed and transferred automatically to the user's Advanced Deposit Wagering Account. In embodiments where a user has its own store of reserved wagers, any available balance in an unrevealed account may be assigned back to the system and used as a bonus or assigned as a reserved wager for another user. Other techniques may be used.

Maintaining Reserve Wager Store

The store may have thresholds and rules to maintain its amount of fill to help ensure sufficient wagers are always available to meet the anticipated requirements for upcoming chip purchases. Wagers can be categorized in many ways, including: by the nature of the wager being placed (i.e. in horse racing the track, race number, selections, cost and estimated payout); or by their characteristics as probabilities for risk return.

By way of example, a wager could be categorized as follows as a horse racing wager: Track Santa Anita, Date 05/05/2022, Race 4, Horse 6 to WIN for $5, estimated payout if winner of $15Asas probabilities: $5 cost financial instrument, approximately 30% likelihood of success, 70% failure, projected return on winning: 300%. These categorizations are relevant to the extent that they are used by the reserve system to ensure that the right type(s) and amount of wagers are available in store(s) to fulfill upcoming purchases. There will be systems that learn the rules needed to keep the stores optimally full, breaking them down into categories by: anticipated cost of wagers needed; anticipated denominations of wagers needed to fulfill expected purchase sizes/payout tables; anticipated probabilities of wagers needed; anticipated rules that would limit the wagers that can be used to fulfill order(s) for a player (for example, a player that resides in the state of NM is not allowed to utilize wagers on tracks located in NM. There may be varying attributes of the wagers that will be factored in to ensure that the selections of wagers filling the store meet the requirements for the anticipated player(s)); anticipated availability of events with public vs. private pari-mutuel pools (the system may include rules preferring or requiring events featuring available private or public pools for the purposes of placing wagers. Wagers placed into public or private pools may represent different levels of company revenue and/or prizing for the user, and may be prioritized accordingly); anticipated event parameters; And other appropriate preference rules (e.g., the geographic location of the event, the type of event, (e.g. Thoroughbred vs Harness), and the field size, (i.e. the number of horses in the race)). A randomization factor (RNG) may be factored in if multiple wagers are available with the identical category characteristics required to fulfill the order(s) for a player.

Result Encryption

According to another aspect of some embodiments, even though the outcome of a reserved wager may be known or knowable (e.g., the horse race has been completed) the system may be configured using various technical features to prevent the system from obtaining or determining the outcome until the occurrence of some event (e.g., the reserved wager is assigned to a specific user). By using the technology and/or an audit trail to implement this, any attempt to specifically assign to a specific user reserved wagers with known outcomes that are particularly high or low can be prevented. As one example, the reserved wagers (and/or the results) can be encrypted (by the system and/or as received by the system) to facilitate this. Alternatively or in addition, the system may not request the results of the reserved wager until assigned to the user. Other techniques may be used.

By integrating real-world wager outcomes with gameplay and other user interactions, and by utilizing the reserve wagering implementations herein, the systems and methods herein provide a more engaging and immersive user experience.

DETAILED DESCRIPTION OF THE INVENTION

Figure 1:
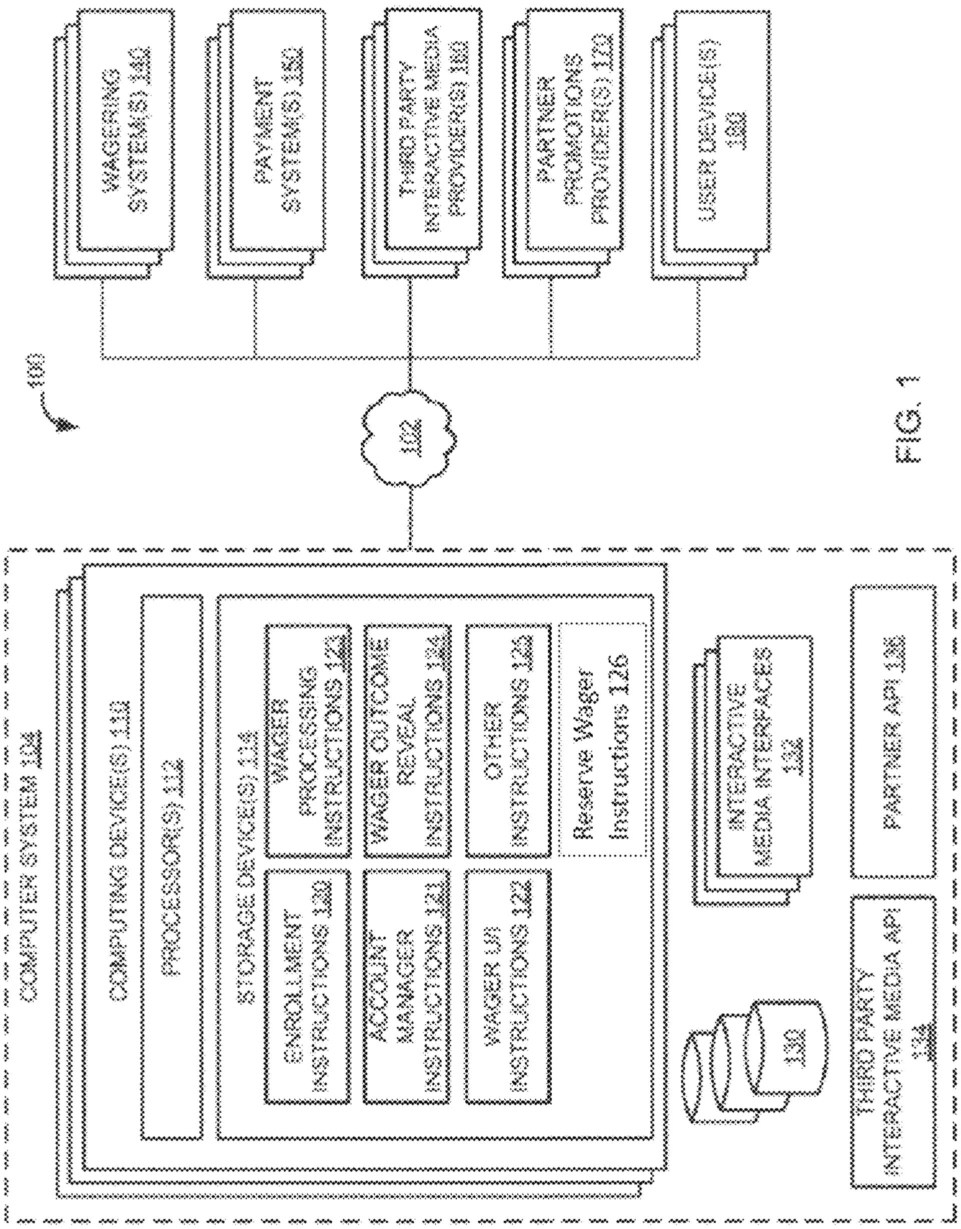
FIG. 1 illustrates a system of revealing real-world wager outcomes based on user interactions with interactive media, including by using reserve wagering, according to an implementation of the invention.

FIG. 1 illustrates a system 100 of revealing real-world wager outcomes through different reveal mechanisms that may be based on user interactions with interactive media (e.g., games, mobile applications, online applications, television programs, etc.), including by using reserve wagering, according to an implementation of the invention. The user interactions may include, for example, providing input to, receiving output from, downloading, streaming, and/or otherwise interfacing with the interactive media.

System 100 may place a real-world wager based on one or more wager parameters that includes information used to specify and/or place a wager. The wager parameters may include, without limitation, a type of event on which to wager (e.g., horse races), a particular event (e.g., a particular horse race) on which to wager, a particular event parameter (e.g., a selection of a winner), a type of wager, an amount of the wager, a timing related to when to place the wager, a location of where to place the wager (e.g., a locality or wagering system 140), and/or other parameter that is used to place a wager.

A real-world wager may relate to any of a variety of wager events based on a set of wager parameters. For example, the wager event may include, without limitation, a sporting event, a random event (e.g., random number picks from a lottery), stock market activity, a political race, and/or other form of risk resolution that provides a return against an amount wagered depending on the outcome of the wager event. In an implementation, the real-world wager relates to a wager event that has not yet occurred. In another embodiment, the real-world wager relates to a reserve wager event that has already occurred. The wager may be based on various criteria, including the legality based on where a user is located and other user-related parameters (e.g., age).

System 100 may obtain an outcome of the real-world wager and reveal the outcome based on one or more reveal parameters that specify when to reveal the outcome and/or a reveal mechanism. The one or more reveal parameters may include, without limitation, a date/time to reveal the outcome, a game or other interactive media used to reveal the outcome, an amount of the outcome (e.g., a portion of a payout) to reveal, and/or other reveal parameters.

The reveal mechanisms may give the appearance to the user that the user achieved the outcome through the user interactions with the interactive media even though the outcome resulted from the real-world wager and was determined before the user interactions with the interactive media. Such interactions may include gameplay, multimedia views, multimedia downloads, and/or other interactions that can give the appearance to the user that they won or lost something based on the interactions. For example, the user may be given the impression that an in-game action resulted in a cash win, even though the cash win resulted from a real-world wager that was placed and the in-game action triggered the win.

The interactive media may include, without limitation, mobile, online or other games, other multimedia content, and/or other media that may be presented to and/or interacted with by a user. The interactive game may involve a skill, physical coordination, problem solving, and/or or other activity unrelated or related to the underlying wager event. For example, the interactive game may include, without limitation, a crossword puzzle, an action game, a puzzle game, a shooting game (e.g., a first person shooter game), a strategy game (e.g., chess, checkers, go, etc.), a pinball-type game, a card game, a single player game (including games against an AI player), a multiplayer game (including games against other users), a game of chance, such as a slot machine, a bingo game, a lottery, casual games, alternate reality games, FLASH games, handheld games, a math game, a match game, a prediction game or challenge, an arcade game, etc. The interactive game may also include a passive form of entertainment requiring little if any intervention from the user. The interactive game may be run on any platform such as a console, a computer, a mobile device, and/or other device that can facilitate gameplay of the interactive game.

The multimedia content may include a video, audio, image, text, data, and/or other media content that may be interacted with (e.g., viewed/listened to for a period of time, downloaded, etc.). For example, a slide show may be presented to the user, with random payouts presented to the user while watching the slide show. Thus, certain implementations do not require a game or game play in order to provide the delayed reveal functionality described herein.

System 100 may provide the outcome of wagers directly to the user or through the reveal mechanisms described herein based on a user preference. In this manner, the system and/or user may decide whether to obtain outcomes directly or through one or more of the various reveal mechanisms described herein.

Other uses of system 100 are described herein and still others will be apparent to those having skill in the art. Having described a high level overview of some of the system functions, attention will now be turned to various system components that facilitate these and other functions.

System Components

System 100 may include a computer system 104, one or more wagering systems 140, one or more payment systems 150, one or more interactive media providers 160, one or more partner promotions providers 170, one or more user devices 180, and/or other components. Computer system 104 may debit and/or credit funds related to real-world wagers through payment system(s) 150. Computer system 104 may place real-world wagers with one or more wagering system(s) 140. Computer system 104 may interface with third party interactive media provider(s) 140 to allow user interactions through third party media, interface with partner promotions provider(s) 170 to leverage the system to provide partner promotions, and provide various interfaces to user device(s) 180 so that users may interact with computer system 104.

To facilitate these and other functions, computer system 104 may include one or more computing devices 110. Each computing device 110 may include one or more processors 112, one or more storage devices 114, one or more databases 130, a third party interactive media Application Programming Interface ("API") 134, a partner API 136, and/or other components.

Processor(s) 112 may be programmed by one or more computer program instructions, which may be stored in storage device(s) 114. The one or more computer program instructions may include, without limitation, enrollment instructions 120, account manager instructions 121, wager user interface ("U/I") instructions 122, wager processing instructions 123, wager outcome reveal instructions 124, reserve wager instructions 126, and/or other instructions 125.

Enrolling Users to Obtain User Information

In an implementation, enrollment instructions 120 may program processor(s) 112 (and therefore computer system 104) to enroll a user to use computer system 104. As used hereinafter, for convenience, the various instructions will be described as performing an operation, when, in fact, the various instructions may program processor(s) 112 to perform the operation.

To enroll the user, enrollment instructions 120 may obtain user information such as, without limitation, a username, a password, demographic information, user risk profile information, payment account information, reserve wagering preference, and/or other information related to the user. Once obtained, enrollment instructions 120 may store a portion or all of the user information in a database for later retrieval (such as in one or more database(s) 130), including in various user accounts, such as user profile account 1480 shown in FIG. 14. It should be understood that enrollment instructions 120 may obtain at least some of the foregoing user information after the user has initially enrolled. For example, enrollment instructions 120 may obtain new user information, updates to existing user information, and/or deletions of existing user information after the user has initially enrolled.

The username and password may be used to authenticate user logins to computer system 104. Such logins may be performed through third party interactive media provider(s)

160 and/or through various interactive media interface(s) 134 provided by computer system 104.

The demographic information may include, without limitation, a name, a location of the user (e.g., a residence address), an age, device information, a gender, and/or other information that describes the user. The device information may include, without limitation, a mobile phone number, a Media Access Control address, a Subscriber Identity Module identifier, and/or other information that uniquely identifies a mobile device of the user. Computer system 104 may use the location of the user to localize real-world wagers that are placed by computer system 104 (as described herein elsewhere), provide location-based services for promotion provider(s) 170, and/or perform other functions. Computer system 104 may determine the location of the user based on a location of the user's mobile device, a residence address of the user, and/or other information that indicates a location (which may or may not be a real-time location) of the user.

In an implementation, some or all of the demographic information may be subject to verification. For example, enrollment instructions 120 may verify the address and/or age of the user by requiring verification information to be submitted. Such verification information may include, without limitation, government issued document information (such as a social security number, passport number, driver's license number, etc.), a credit card bill of the user, a location of the mobile device of the user to be as a proxy for the location of the user, and/or other information used to verify the demographic information. In this manner, enrollment instructions 120 may verify that the user is able to place real-world wagers in compliance with applicable wagering regulations and laws. Enrollment instructions 120 may store such verification in association with the user for later retrieval.

The user risk profile information may include a risk tolerance, which indicates a level of risk that the user is willing to take with respect to real-world wagers. Enrollment instructions 120 may obtain the risk tolerance through direct questionnaires to the user (e.g., request the user to specify high, medium, low, and/or other direct indications of risk tolerance, such as a scale from 1 to 10), indirect questionnaires (e.g., request the user to specify whether higher payouts, but lower chance of winning, are preferred, etc.), previous wagering history of the user, and/or other methods of obtaining a risk tolerance of the user. In an implementation, computer system 104 may use the user risk profile information to automatically identify types, quantities, and/or amounts of wagers to place on behalf of the user.

The payment account information may include, without limitation, a credit card number, a debit card number, a smart card number, an online payment account identifier (e.g., a PAYPAL account identifier), a bank account routing number, Advanced Deposit Wagering ("ADW") account identification information, and/or other information that can be used to identify a payment account that is used to debit and/or credit funds.

The reserve wagering preference may include, without limitation, the user's preference as to whether the reserve wagering functionality discussed herein will be used in conjunction with a user's token purchasing and related real-world wagers, and/or other wagering implementations related to the account. The reserve wagering preference may be selected as a default for the account, on a token-by-token and/or wager-by-wager basis, or any combination thereof.

Managing User Accounts for Wagering, Payouts, and Losses

Figure 14:
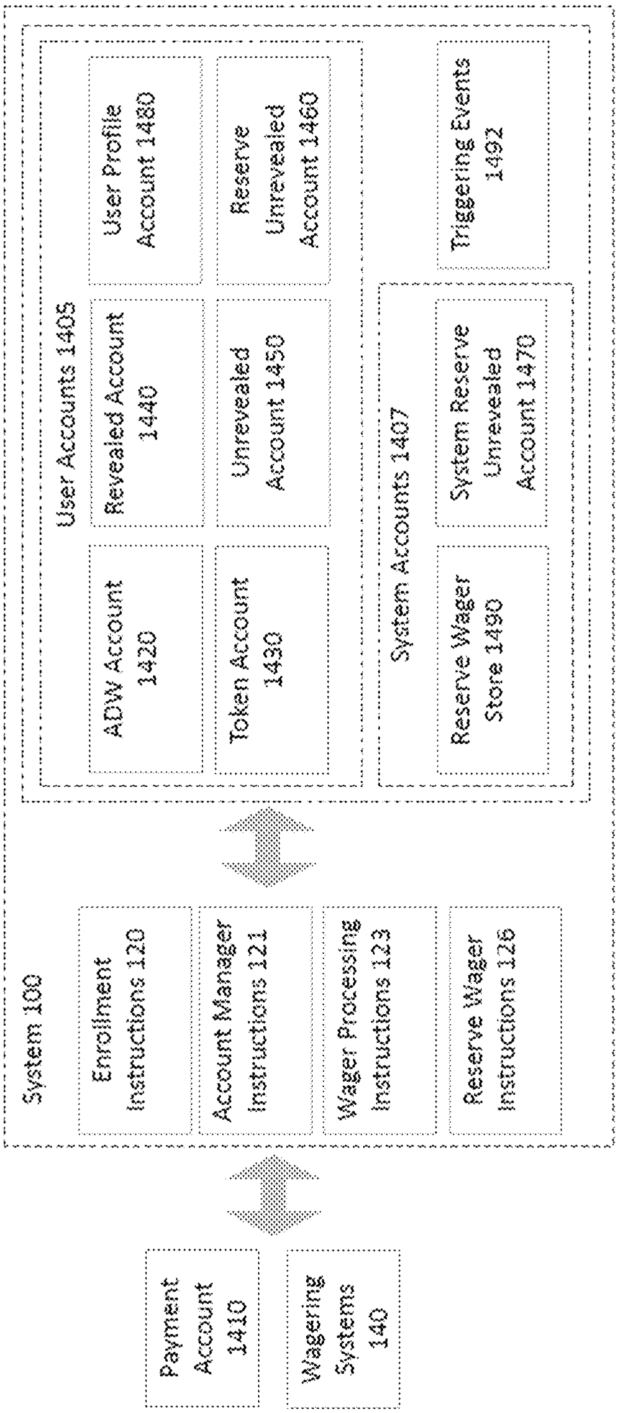
FIG. 14 illustrates various accounts used by the system of revealing real-world wager outcomes based on user interactions with interactive media, including by using reserve wagering, according to an implementation of the invention.

Account manager instructions 121 may maintain one or more types of accounts associated with a user. The different types of accounts may include, as shown in FIG. 14, without limitation, a payment account 1410 (e.g., credit card account, a debit card account, a digital currency account, etc.) and an Advanced Deposit Wagering ("ADW") Account 1420 that allow the transfer of funds therebetween. In some embodiments, for example those used with delayed reveals and/or reserve wagering, accounts may also include a token account 1430, a revealed account 1440, and an unrevealed account 1450. In other embodiments, for example those using reserve wagering, user accounts may include a reserve unrevealed account 1460. In addition to user accounts there may be various system accounts, for example accounts used with reserve wagering including system reserve unrevealed account 1470 and a reserve wager store 1490. Other embodiments may include other types of accounts. The accounts may be selected by a user during enrollment and/or automatically created by the system in response to user preferences and/or system options.

Account manager instructions 121 may cause funds, tokens, or other forms of value to be debited from and/or credited to one or more accounts associated with the user and/or system (e.g., one or more accounts identified during user enrollment) in connection with various operations performed by computer system 104. For example, account manager instructions 121 may debit one or more payment accounts of the user in connection with a token purchase and/or real-world wager that is placed by computer system 104 on behalf of the user. Account manager instructions 121 may debit a payment account 1410 of the user before or after a token has been purchased and/or the wager has been placed. For example, the account manager instructions 121 may debit a payment account 1410 of the user when a token is purchased but before a real-world wager is placed, or otherwise in advance of a real-world wager. Alternatively, when legal, a wager may be made without advance funding and/or token purchase, and user accounts may be settled at a later date if the wager resulted in a loss (e.g., by invoicing the user, charging a user credit card, and/or otherwise causing a user's payment account to be debited).

In an implementation, account manager instructions 121 may interface with external accounting systems (e.g., an accounting system associated with a state gambling system) to manage (e.g., view balances, update, etc.) an external account.

In an implementation, account manager instructions 121 may cause an existing ADW account 1420 of the user to be debited in connection with the token purchase and/or real-world wager. In some embodiments, a bettor is required to fund an ADW account 1420 prior to token purchase and/or real-world wagers being placed. In other embodiments, tokens may be purchased and/or real-world wagers may be placed before a better funds an ADW account. The account manager may maintain a relationship between an ADW account and a payment account that is used to fund the ADW account. The account manager may also maintain a relationship between the ADW account and a segregated trust account that is used to fund real-world wagers.

In an implementation, account manager instructions 121 may cause one or more payment accounts 1410 of the user to fund the ADW account 1420. The funding may be performed before any tokens are purchased and/or real-world wagers are placed, subsequent to token purchase and/or placement of real-world wagers, or in connection with a particular token purchase and/or real-world wager. The user may also separately fund the ADW account 1420 apart from any token purchase and/or wagering functionality, or without using computer system 104 such as by initiating the funding from the payment account 1410 side.

In an implementation, account manager instructions 121 may receive a user indication of whether any payout resulting from a real-world wager should be paid to the user immediately. In other words, a user may specify that the user wishes to receive a payout immediately, in which case, account manager instructions 121 may credit a user payment account 1410 (e.g., a bank account) with the payout amount. On the other hand, if the user specifies that the payout should be processed according to the reveal platform of computer system 104, then the payout may be revealed as described herein with respect to wager outcome reveals. Such user indication can be received directly from a user related to a particular wager, token acquisition, or other user interaction with the system, or may be received from accessing the user profile account 1480 according to system preferences.

In another implementation, the account manager instructions 121 also receive a user indication of whether the reveal platform should use the reserve wagering functionality in relation to any wager outcome reveal, as discussed herein. Such user indication can be received directly from a user related to a particular wager, token acquisition, or other user interaction with the system, or may be received from accessing the user profile account 1480 according to system preferences.

In an implementation, account manager instructions 121 may generate and provide one or more user interfaces that allow the user to transfer funds between user accounts, enter, modify, and view user account information (e.g., balances, previous wagers, payouts, losses, etc.), and/or otherwise interact with user account information related to payment accounts of the user. For example, account manager instructions 121 may generate and provide one or more user interfaces that allow the user to transfer funds from a payment account 1410, such as a bank account, to an ADW account 1420. In an implementation, account manager instructions 121 may use one or more payment system(s) 150 to process the foregoing and other fund transfers. For example, account manager instructions 121 may communicate conventional Electronic Funds Transfer requests, Automated Clearinghouse payment requests, and/or other suitable payment requests to payment system(s) 150.

In an implementation, account manager instructions 121 may generate and provide one or more user interfaces that indicate previous token purchases or redemptions, previously placed wagers, wager outcomes (e.g., payouts, losses, and draws), and/or other information related to wagers. In another implementation, account manager instructions 121 may not display wager outcomes so that the user is unaware of actual wager outcomes and instead is required to discover such outcomes through interactive media interface(s) 132 provided by computer system 104 and/or third party interactive media provided by third party interactive media provider(s) 160 as described herein. In yet another implementation, account manager instructions 121 may display (or not display) wager outcomes based on a user configurable setting (e.g., depending on whether the user chooses to view the wager outcomes without user interactions with the interactive media).

Allocating Tokens

In various embodiments, the funds used in the system are represented by or related to tokens or chips. In an implementation, account manager instructions 121 may allocate a token and store the allocated token using a user account, such as a token account 1430 in FIG. 14. The token may be defined by one or more token parameters that describe the token. A token parameter may include, for example, a denomination of the token, an amount or value of the token, a level of risk associated with the token (which may determine a level of risk of a wager placed using the value of the token), and/or other characteristic of the token.

As used herein, the term "token" generally refers to a unit of value. The unit of value may correspond to (e.g., be representative of) an amount of real currency (e.g., a U.S. dollar), an amount of virtual currency (e.g., an in-game currency), an amount of digital currency (e.g., a BITCOIN), a reward point, a tournament point, an experience point in a game, a time value (e.g., a stock option or future), combinations of the foregoing, and/or other measure of real or perceived value. Unless contextually or explicitly indicated otherwise, a token may be represented using any type of visual representation.

The token account 1430 may indicate a number of tokens, a type of token, an amount of other value (e.g., cash winnings, funds transfers, etc.), and/or other information related to a value that is associated with the user.

In an implementation, account manager instructions 121 may manage more than one type of token. For example, a given token may represent one unit of value (e.g., one dollar) while another token may represent another unit of value (e.g., five dollars). Furthermore, a given token may represent real currency while other another token may represent experience points. Some tokens may represent a combination of different units of value such as an amount of real currency and an amount of reward points. For example, a given token may represent ten U.S. dollars and 1000 airline miles.

In an implementation, account manager instructions 121 may allocate tokens by adding a number of tokens to the token account 1430 (e.g., increasing a number of tokens), adding a unit of value to a token (e.g., incrementing a dollar value of a given token and/or adding airline miles to a token that originally was worth a given amount of dollars), and/or otherwise increasing a value of tokens in the token account 1430. Likewise, account manager instructions 121 may de-allocate, or subtract, units of value from the token account 1430.

Account manager instructions 121 may make such allocations based on an action that causes tokens to be allocated to a user. The action may be initiated by the user, the system, and/or a third party. For example, the action may include a purchase (e.g., the user may purchase tokens), a promotional campaign, a bonus based on user interactions with interactive media, a bonus related to a user's use of the reserve wagering functionality, a consolation prize, a wager outcome, and/or other allocation technique. The consolation prize and/or the bonus may each include an item such as a virtual item that is not otherwise purchasable or may include an item that is being promoted.

In an implementation, account manager instructions 121 may facilitate a token purchase using payment account information of the user, which may be pre-stored or newly added at the time of the purchase. Account manager instructions 121 may facilitate purchase of different denominations of tokens having different denominations (e.g., ten cents, fifty cents, one dollar, two dollars, five dollars, ten dollars, etc.). In an implementation, a fixed amount and/or a percentage of the token purchase price may be retained by the system operator, acting as the house.

Using Tokens

In an implementation, a token may be used to initiate or otherwise represent wagers, interact with interactive media (e.g., purchase or play games, videos, etc.), purchase virtual goods, exchange for other tokens, and/or otherwise be used to obtain another unit of value or perceived value.

In an implementation, a token, when used, may be depleted by one or more units of value. For example, account manager instructions 121 may deplete all or a portion of the value of a token used to place a wager to provide currency for the wager. If the wager results in a payout (or draw), account manager instructions 121 may increase the value of the token such that the depleted value is replenished. Depending on the payout amount, the token may be worth more after the wager outcome than before the wager was placed. The increase in value of the token may be revealed in a time-delayed manner as described herein. In an implementation, account manager instructions 121 may distribute the payout across more than one token, which may be owned by the user and/or other users.

Managing ADW Accounts

In an implementation, account manager instructions 121 may maintain an ADW account 1420 that includes an actual balance. The actual balance may be denominated in real currency, virtual currency, and/or other unit of value. In an implementation, the actual balance may include a combination of different units of value (e.g., real currency and virtual items).

Certain crediting events may cause funds to be credited to the ADW account 1420. The crediting events may include, without limitation, funds transfers from a payment account 1410 to the ADW account 1420, redemption of one or more items (e.g., tokens, virtual items, etc.), a real-world wager payout, and/or other events that can cause the actual balance to increase. Certain debiting events may cause funds to be debited from the ADW account 1420. The debiting events may include, without limitation, withdrawals from the ADW account 1420 (e.g., a transfer of real currency from the ADW account to another account), purchases of one or more items (e.g., tokens, virtual items, etc.), placement of real-world wagers (e.g., to pay for the real-world wagers in advance), and/or other events that can cause the actual balance to decrease.

In an implementation, at least a portion of the ADW account 1420 balance may be associated with a given token. For example, for a given ADW account 1420, eight real currency dollars may be associated with a first token such that the first token is worth eight real currency dollars. Two real currency dollars may be associated with a second token such that the second token is worth two real currency dollars. These relationships may be tracked in an appropriate account, such as the ADW account 1420 and/or token account 1430, and the corresponding value of the tokens may be reported between and to other accounts. The value of each token may be adjusted (e.g., incremented or decremented) in a manner similar to the ADW account 1420 balance being adjusted. For example, a payout from a real-world wager that was placed using a given token may be credited to the real currency value of the given token (and therefore credited to the corresponding ADW account). Likewise, use of a token may decrease the real currency value of the token (and therefore debited from the corresponding ADW account).

In an implementation, at least a portion of the ADW account balance may not be associated with a given token. For example, five real currency dollars may not be associated with a token. A portion of the ADW balance may be associated with one or more tokens while another portion of the ADW balance may not be associated with one or more tokens. In the foregoing examples, a given ADW account balance may have a total actual value of fifteen real currency dollars (eight of which is associated with the first token, two of which is associated with the second token, and five of which is associated with real currency that is not associated with a token). Account manager instructions 121 may provide access to the total actual value (e.g., fifteen dollars) and/or a breakdown of the total actual value (eight dollars associated with the first token, two dollars associated with the second token, and five dollars not associated with a token).

Managing Unrevealed Payouts and Reserve Wagers

In various implementations, as discussed herein, the results of a real-world wager may not immediately be displayed to a user, but rather revealed through the user interacting with interactive media. In such implementations, various tracking accounts may be utilized to track unrevealed payouts, such as a revealed account 1440 and unrevealed account 1450, as discussed below. Moreover, as discussed herein, various implementations of the system may utilize a reserve wager functionality. In such implementations, a system reserve unrevealed account 1470 and/or reserve unrevealed account 1460 may be utilized to track the reserve wagers and unrevealed payouts.

In an unrevealed payout implementation, account manager instructions 121 may maintain a tracking account, such as an unrevealed account 1450. that tracks any unrevealed outcomes of real-world wagers. For example, a payout in the amount of five dollars resulting from a real-world wager may be credited to the unrevealed account 1450 until the payout is revealed. A reveal opportunity may be presented to the user in the form of a game objective. If the game objective is achieved by the user, the user may be given the appearance that the achievement of the game object resulted in the payout, the unrevealed account 1450 may be decremented by five dollars, and the ADW account 1420 may be incremented by five dollars.

In an implementation, partial reveals may cause partial credits and debits to occur as well. For example, if only a portion of the game objective was achieved, only a portion of the payout may be revealed. In the foregoing example, if only a portion of the objective was achieved, two of the five dollar payout may be revealed to the user, giving the user the appearance that partial completion of the game objective resulted in a partial reward of two dollars. Account manager instructions 121 may decrement the unrevealed account 1450 by two dollars (leaving the remaining three dollars for another reveal opportunity) and increment the ADW account 1420 by two dollars.

Other types of tracking, displaying, and revealing account balances in connection with a revealed payout function, and methods of utilizing the accounts described above, may be used as well. For example, a first account, such as a revealed account 1440, may be used to display a first balance to the user that includes payouts that have been revealed to the user. The first account may be accessible to make purchases, place wagers, etc., and is what the user perceives is the value of the user's account. A second account, such as the unrevealed account 1450, may store a second balance that includes an amount of funds that the user actually has, which includes unrevealed payout amounts. The second account may not be accessible to the user, but indicates a true value of the user's account. For example, if the second account balance is higher than the first account balance, then a payout has not been revealed to the user. Thus, as used herein, when a "tracking account," "actual account," "ADW account," "revealed account," and "unrevealed account" of the user are updated, various ways to track whether or not a given outcome has been revealed may be used as well.

Furthermore, the various accounts need not be separate accounts, but rather components of a single account, so long as they are associated with a given user.

In addition to the above accounts and functionality, in reserve wagering implementations, account manager instructions 121 may maintain a reserve unrevealed account 1460 associated with the user to track unrevealed payouts using reserve wagers in the manner discussed below. Additionally, reserve wagering implementations may also utilize a reserve wager store 1490 and system reserve unrevealed account 1470 managed by the system to facilitate reserve wagering implementations in the manner discussed below.

Triggering Real-World Wagers

In various implementations, as discussed herein, real-world wagers can be triggered by various events or user actions. In one embodiment, a user may initiate a specific real-world wager by a direct request. In another implementation, the purchase or use of a token may cause the initiation of a real-world wager. In another implementation, another user action, such as the accessing or use of interactive media, may trigger a real-world wager, either directly or via obtaining a token. In yet another implementation, a real-world wager may be initiated independently of a user action, based on system parameters that enable reserve wager functionality, with parameters set by a system administrator or automatically analyzed and determined by the system.

In one implementation, a user may select a particular real-world event, or category of events, on which to place an express real-world wager via a user interface. The user interface may be provided by wager user interface ("U/I") instructions 122. The particular wager that is initiated may depend on wager parameters entered by the user and/or determined by the system either automatically or based on user parameters. For example, wager user interface ("U/I") instructions 122 may initiate a wager for an event identified by the user if the user explicitly identifies the event. On the other hand, wager user interface ("U/I") instructions 122 may initiate a wager for an event that is automatically identified by computer system 104 if the user selects a risk level or other category related to an event instead of a particular event. Other aspects of the wager may be similarly determined (e.g., selection of the winner of a horse race may be based on an explicit indication from the user or based on a level of risk indicated by the user—e.g., select underdog horse if a high risk wager is desired by the user).

In another implementation, the purchase of a token may cause a wager to be initiated. For example, account manager instructions 121 may facilitate the purchase of a particular one dollar token and may automatically initiate (e.g., without an express wager from the user) one or more real-world wagers up to one dollar, as described herein with respect to placing wagers. In this implementation, different tokens may be associated with different risk profiles (e.g., a low risk token when purchased causes a low risk wager to be placed, a high risk token when purchased causes a high risk wager to be placed, and so on). Thus, a user may indicate a desired level of risk of a wager by purchasing an appropriate token. In other implementations, tokens may be associated with other wager parameters as appropriate (e.g., a horse race token). In still other implementations, tokens may be expressly associated with reserve wagering functionality, such that a user may know that a particular token is associated with one or more reserve wagers.

In another implementation, a real-world wager may be triggered based on a use of a token. For example, a real-world wager may be placed responsive to the use of all or a portion of the value of a token to initiate gameplay of a game, view a video, etc. The amount of the real-world wager may be based on the value of the token that is used. For example and without limitation, if a user uses a token that is associated with one real currency dollar to play a game, a real-world wager in the amount of one real currency dollar may be placed on behalf of the user.

In another implementation, a real-world wager may be triggered based on a user interaction with interactive media. For example, a portion or all of the value of a token may not be wagered until a certain event occurs with respect to the game. The user interaction may include, without limitation, winning a game, solving at least a portion of a puzzle, striking one or more targets, user achieving a certain number of points, a certain performance level or title, accomplishing a task within a specified period of time, accessing a certain virtual area, collecting a certain virtual item, beating another user playing an interactive game, playing a certain period of time, a random event (e.g., a number selected using a random number generator), a user input (e.g., user-defined values for inputs), a physical action, a physiological condition (e.g., a monitored heartbeat, a level of perspiration, a blood glucose level, etc.; the monitored physiological condition may be obtained from a wearable device and/or other monitoring device), completion of a game, watching a video, watching a certain number of videos, watching a video for a certain period of time, listening to audio content (e.g., music, podcast, etc.), listening to audio content for a certain period of time, viewing an image, viewing a certain number of images, watching an advertisement, clicking on (or otherwise selecting) an advertisement, and/or other objectives that can be monitored with respect to interactive media content.

In another implementation, a real-world wager may be made using one or more items of value. For example, a user may wager a retailer gift card against another user's physical goods. In an implementation, a real-world wager may be made using a combination of real currency and one or more items of value.

In another implementation using reserve wagering, discussed in detail below, various real-world wagers are triggered by the system independent of specific user actions such as to maintain a pool of reserve wagers to associate with tokens in the manner discussed below. For example, the system may trigger real-world wagers, track their results, and add the wagers and results to a pool based on rules that maintain, for example, a particular volume, type, wager value, and result value of reserve wagers (or, for example, any other wager parameter discussed herein) for use by the system to meet predicted, anticipated, or calculated requirements for upcoming token purchases and use. In some implementations, the results of the reserve wagers may be encrypted or separately stored.

The reserve wagers and associated data may be stored in a reserve wager store 1490 (and, as for results in some implementations, reserve unrevealed account 1470), as shown in FIG. 14. The determination of a triggering event that may cause the system to place a real-world wager associated with reserve wagering functionalities may be controlled by reserve wager instructions 126, which monitor the reserve wager store 1490 in view of triggering events 1492 and decide whether additional real-world wagers should be triggered. In various implementations, additional reserve wagers can be triggered by reserve wager instructions 126 if a particular category value of the reserve wagers in reserve wager store 1490 falls below or rises above a particular threshold. The categories monitored by the system may include, for example, any of the wager parameters discussed herein.

In one implementation, a triggering event may occur where the total value of reserve wagers in reserve wager store 1490 falls below a certain threshold. This total value can be set by the system administrator as a value needed by the system to efficiently provide the reserve wager functionality, or can be determined by the system automatically based on a current system status. For example, the reserve wager instructions 126 may monitor the total value of reserve wagers in reserve wager store 1490 and compare the total value to a total value trigger event in triggering events 1492. If, for example, the triggering event is to place a new real-world wager if the total value of reserve wagers in reserve wager store 1490 falls below $10,000, the reserve wager instructions 126 will indicate to wager processing instructions 123 to place a real-world wager when the value falls below $10,000.

Various alternative triggering events 1492 may be utilized in other implementations. For example, a triggering event could be certain numbers of particular wager denominations needed to fulfill expected cost of wagers needed, denominations of wagers need to fulfill purchase sizes/payout tables, probabilities of wagers needed, rules that would limit the wagers that can be used to fulfill order(s) for a particular user (for example, a user that resides in the state of NM is not allowed to utilize wagers on tracks located in NM), availability of events with public vs. private pari-mutuel pools (the system may include rules preferring or requiring events featuring available private or public pools for the purposes of placing wagers, where wagers placed into public or private pools may represent different levels of company revenue and/or prizing for the user); and other event parameters (e.g., the geographic location of the event, the type of event, (e.g. Thoroughbred vs Harness), the field size, (i.e. the number of horses in the race), and any other applicable event parameter. In various implementations, these triggering events may be used singly or in any appropriate combination. In other implementations, the triggering events may use current values or may use predicted or calculated values.

In an implementation, wager processing instructions 123 may identify one or more real-world wagers to place on behalf of the user or system, place the real-world wagers through wagering system(s) 140, and obtain the outcome of the real-world wagers in accordance with any of the above implementations. For example, wager processing instructions 123 may be triggered to place a real-world wager based on a token purchase by a user, an explicit indication from the user, a user interaction with interactive media from the user, reserve wagering functionality, and/or other wager triggers.

Selecting, Placing, and Obtaining the Outcome of Real-World Wagers

In various implementations, after a wager has been triggered, wager processing instructions 123 may select from among different types of wagers, each of which may be associated with one or more wager parameters. The one or more wager parameters may include, without limitation, a venue at which to place the wager, an event on which to wager, a particular outcome of the event (e.g., a winner of the horse race), a type of wager to place, an amount of the wager, a number of wagers, and/or other parameter used to place a real-world wager. The wager parameters may also include relative risk parameters, including a payout level, a risk level, and/or other parameters identifying risk.

In various implementations, the wager parameters can be specifically selected by the user, automatically selected by the wager processing instructions based on user preferences in connection with a particular wager or token, and/or be automatically selected by reserve wagering instructions 126 in view of such user preferences. Various combinations of wager selection may also be used. For example, in some implementations, the user may directly specify some of the foregoing parameters and wager processing instructions 123 may select other ones of the foregoing parameters. For example and without limitation, the user may identify a particular horse race on which to place the real-world wager and wager processing instructions 123 may select the winner, an amount of the wager, etc.

Based on the wager parameters, wager processing instructions 123 may select one or more types of wagers to place on behalf of the user (if the user has not expressly indicate a type of wager to place) or system. For example, depending on various risk parameters, such as particular odds and payout amount for each of the types of wagers, wager processing instructions 123 may select from among the different types of wagers. In such an implementation, wager processing instructions 123 may associate particular user or system risk profiles with wager risk profiles associated with the various types of wagers. For example, wager processing instructions 123 may score each of the types of wagers to generate a wager risk profile based on the odds of winning and/or the payouts usually associated therewith (e.g., higher payouts for lower odds). Wager processing instructions 123 may generate the wager risk profile based on a calculation of odds of winning and/or potential payouts. For example, the wager risk profile for a given type of bet may be expressed as a product of the odds expressed as a decimal value and a potential payout a ratio (e.g., 6/1 payout ratio yielding six times the wager). Other values may be used in the foregoing calculation and other calculations may be used as well. The wager risk profile may be used to generate a risk matrix that compares the user or system risk profiles with the wager risk profiles to select an appropriate number and type of wagers.

Different wager risk profiles may be associated with different levels of risk. For example, each type of wager may be placed along a scale of levels of risk, with one end of the scale indicating a relatively low risk wager and the other end of the scale indicating a relatively high risk wager. In this manner, the appropriate type of wager may be matched with an appropriate user or system risk profile (and/or other risk information associated with a real-world wager to be placed).

In an implementation, wager processing instructions 123 may blend down a risk of multiple wagers to select an appropriate set of wagers, given a user or system risk profile. For example, for a user that accepts a moderate level of risk, wager processing instructions 123 may select wagers having high odds of winning (e.g. low risk), but low payout amounts and wagers having low odds of winning (e.g., high risk), but high payout amounts. Wager processing instructions 123 may optimize the number and wager amounts of low and high risk wagers to arrive at an overall moderate risk level for the user. The various types of wagers that may be place will now be described.

As is well known, the pari-mutuel system (sometimes known as a "totalisator") is a betting system in which bets of a particular type are pooled together and the final payout is not determined until the results are declared official. The house (e.g., the race track) may take a portion of the bets as payment for the betting related functions provided. The payoff odds are calculated by sharing the betting pool among the winning bets. By contrast, in fixed odds betting, the payout is generally agreed at the time the wager is made. Certain embodiments may place wagers using fixed odds betting.

Common bets in horse racing include:

Win: where the bettor must pick the horse that wins the race in order to win the bet.

Place: where the bettor must pick a horse that finishes either first or second race in order to win the bet.

Show: where the bettor must pick a horse that finishes first, second or third in the race in order to win the bet.

Exacta, perfecta, or exactor: where the bettor must pick the two horses that finish first and second in the race, in the correct order in order to win the bet.

Trifecta: where the bettor must pick the three horses that finish first, second, and third in the race, in the correct order in order to win the bet.

Superfecta: in order to win, the wager the bettor must pick the four horses that finish first, second, third, and fourth in the race, in the correct order in order to win the bet.

Box: wherein a better can place a "box" around exotic betting types (e.g., exacta, trifecta or superfecta bets) in order to place a wager for all permutations of the numbers in the box.

Any2 or Duet: where the bettor must pick the two horses that will place first, second or third in the race but can finish in any order in order to win the bet.

Double or Quinella: where the bettor must pick the winners of two successive races in order to win the bet.

Triple Pick3: where the bettor must pick the winners of three successive races in order to win the bet.

Quadrella: where the bettor must pick the winners of four nominated races at the same track in order to win the bet.

Sweep or pick four: where the bettor must pick the winners of four or more successive races in order to win the bet.

Pick six: where the better must pick the winners of six or more successive races in order to win the bet, with a consolation payment made to bettors that correctly selected five winners out of six races, and with "roll-over" jackpots accumulating each day until one or more bettors correctly picks all six winners.

Win, place and show wagers are generally referred to as straight bets, and the other example wagers listed above are generally referred to as exotic bets. Generally, the greater the odds against winning, the higher the payout and the lower the frequency of a payout. Exotic bets have greater odds against winning than straight bets, but generally with higher payouts when a win occurs. The aforementioned types of wagers are for illustrative purposes only and should not be construed as limiting. Other types of wagers in other contexts may be selected from as well, including (without limitation), selecting a winning team against a point spread, selecting over/under scores, selecting a random number, selecting a winner of a political race, and/or other event or type of wager that may be legally placed.

In view of the above, in various implementations, wager processing instructions 123 may determine a type of wager to place based on a risk tolerance of a user and/or of the system based on reserve wagering instructions 126, and a likelihood and/or amount of payout that is expected for the type of wager. The risk tolerance may be expressly indicated by the user, obtained from a user profile, identified by a type of token that is used to place a wager, specified by the reserve wagering instructions 126, and/or otherwise obtained to identify the risk tolerance of the user and/or the system. For example, wager processing instructions 123 may place straight wagers for a user having a low risk tolerance and place exotic wagers for another user having a higher risk tolerance (or in view of system-specified risk tolerance in a reserve wagering implementation.

In an implementation, wager processing instructions 123 may place two or more wagers over a combination of wager types. For example, wager processing instructions 123 may make straight wagers and exotic wagers in order to hedge the wagers. Such hedging may increase the likelihood of frequent (but smaller) wins from the straight wagers, while obtaining relatively infrequent (larger) payouts from the exotic wagers, which may make reveals of the wager outcomes more exciting from a user perspective.

In an implementation, wager processing instructions 123 may select particular events on which to place wagers based on the number of entries in the event (e.g., the number of runners in a race), a desired risk profile of the user, a number of possible combinations (e.g., where the number of combinations may be linearly or non-linearly based on the number of competitors in an event), a number of favorites or long shots in an event, reserve wagering instructions 126, and/or other factors.

In an implementation, wager processing instructions 123 may generate a results curve, which may reflect desired wagering results or distributions, by breaking a given wager amount down into smaller individual wager amounts, to thereby synthesize the results curve using sub-component bets. The synthesis of a results curve may be performed across multiple events by placing different wagers (tokens) on different events.

In an implementation, wager processing instructions 123 may determine one or more types of wagers to place based on a user specification when a token is purchased, through a user profile that indicate a risk tolerance, the type of token that was purchased, reserve wagering instructions 126, and/or other information that may be used to determine the types of wagers to make.

As described herein, for example, different tokens may be offered that correspond to different types of wagers. For example, and without limitation, a frequent payout token may cause wagers to be placed substantially entirely on straight wagers or other wager-types with a relatively high likelihood of resulting in some level of payout), a high multiple of return token may cause wagers to be placed substantially entirely on exotic bets or the like with a relatively high payout multiple in the event of a wager win, a balanced risk token may cause wagers to be distributed over straight bets and exotic bets, and/or other types of tokens may cause particular types of wagers to be placed.

In an implementation, a given token may be associated with a specific type of wager, such as a quick-pick superfecta wager. For certain tokens, when used by the user, wager processing instructions 123 may automatically pick the horses (or other event parameter) and races (or other events) on which to wager, without the user having to identify the horses or races. Different tokens may also be typed to be used to wager on specific pools, runners, races, or other events. The token type may be represented using text, color (e.g., a gold token may be worth ten dollars, and a copper token may be worth one dollar), graphics, and/or representation.

Funding Wagers Using Tokens and Distributing Payouts to Tokens

In an implementation, wager processing instructions 123 may use one or more tokens to place one or more wagers. The one or more tokens may be associated with a single user account (e.g., a user's ADW account 1420 or Token Account 1430) or from multiple such user accounts (e.g., for pooled wagers). Alternatively, for reserve wager implementations, wager processing instructions 123 may use one or more tokens associated with the system's reserve wager account 1480.

For a given pooled wager, a given token may correspond to a fraction of the pooled wager. In other words, the given wager may be formed from multiple tokens, each token being associated with a corresponding user account, a system account, and/or other accounts. This allows multiple users and/or the system to pool tokens together to place a wager (e.g., to form a larger wager than would be possible otherwise). Any payout resulting from the pooled wager may be distributed in proportion to the number of tokens that each user contributed to the pooled wager.

In an implementation, wager processing instructions 123 may allocate any payout to a token associated with a winning payout and/or to other tokens. For example, when the user purchases several tokens, and corresponding wagers are placed for each token, winnings resulting from a wager associated with one token may be distributed in whole or in part to the other tokens. If a given token resulted in a large winning and five other tokens resulted in no winnings, for example, wager processing instructions 123 may allocate winnings from the given token across the five other tokens. In this manner, regardless of which token is used to interact with interactive media (e.g., playing a game, watching a video, etc.), the user will receive a reward as a result of the user interaction.

As discussed in greater detail elsewhere herein, tokens may be associated with events/wagers that occurred in the past (such as in the various reserve wager implementations herein), where the system associating the tokens with the wagers does not have access to the wager outcome with respect to a given token, at the time the wagers are allocated to tokens or customers. For example, the outcome may be cryptographically encoded and stored, so that the outcome is digitally sealed and tamperproof.

In an implementation, wager processing instructions 123 may take into account fees charged by different wagering system(s) 140, intermediaries, government entities, and/or others in deciding how to allocate wagers. For example, the system may access such fee information, and determine that wagers should not be placed, or should be placed relatively less frequently, at certain wagering system(s) 140, or in certain states or cities because the fee(s) are too large. The determination as to where to place bets may be made to enhance profitability of the system operator and/or to minimize such fees.

In an implementation, wager processing instructions 123 may use one or more wager rules that specify how to select wagers, an amount of wager that should be placed, which wagering system(s) 140 should be used, and/or other characteristics related to selecting wagers. Wager processing instructions 123 may apply the wager rules to a given user or set of users to select and place wagers. For example, wager processing instructions 123 may apply a wager rule that specifies that straight wagers should be placed for users having low risk tolerance and apply the wager rule to a particular user that is associated with low risk tolerance.

Revealing Wager Outcomes

In various implementations described herein, the results of a particular real-world wager or wagers may not be immediately reported to a user who placed the wager or caused the wager to be placed via, for example, a token acquisition. Instead, the results may be revealed via the user interacting with interactive media (e.g., a video game), which then presents the results of the real-world wagers as responses to that interaction (e.g., indications provided by the interactive media to the user). In this manner, the results of the real-world wagers appear to be outcomes of interactive media interactions rather than direct results of the real-world wagers.

In an implementation, wager outcome reveal instructions 124 may identify games or other interactive media in which a reveal should occur, a timing of a reveal, an amount of a reveal, and/or other aspect of a given reveal. Such decisions may be based on various factors such as, without limitation, an amount of payouts to be revealed for a user, when outcomes of real-world wagers will be available, how to increase user interaction with, or enjoyment of, interactive media, whether a partner promotion provider 170 is promoting an item (e.g., high value reveals may be steered toward games being promoted, high value reveals may be associated with certain advertisements, etc.), and/or other factors.

In an implementation, wager outcome reveal instructions 124 may reveal an outcome of a real-world wager through one or more interactive media interfaces with which a user associated with the real-world wager interacts to obtain the outcome. The outcome may include a payout, a loss, or a draw. The one or more interactive media interfaces may be generated by wager outcome reveal instructions 124 or by third party interactive media provider(s) 160.

In an implementation, wager outcome reveal instructions 124 may reveal the outcome such that the outcome appears to have resulted from user interaction with an interactive media interface. For example, the outcome may be revealed such that it appears to have resulted from the user having satisfied one or more objectives in the interactive media interface.

The one or more objectives may include, without limitation, winning a game, solving at least a portion of a puzzle, striking one or more targets, user achieving a certain number of points, a certain performance level or title, accomplishing a task within a specified period of time, accessing a certain virtual area, collecting a certain virtual item, beating another user playing an interactive game, playing a certain period of time, a random event (e.g., a number selected using a random number generator), a user input (e.g., user-defined values for inputs), a physical action, a physiological condition (e.g., a monitored heartbeat, a level of perspiration, a blood glucose level, etc.; the monitored physiological condition may be obtained from a wearable device and/or other monitoring device), completion of a game, watching a video, watching a certain number of videos, watching a video for a certain period of time, listening to audio content (e.g., music, podcast, etc.), listening to audio content for a certain period of time, viewing an image, viewing a certain number of images, watching an advertisement, clicking on (or otherwise selecting) an advertisement, and/or other objectives that can be monitored with respect to interactive media content.

In an implementation, wager outcome reveal instructions 124 may or may not indicate the objective to the user. For example, in some instances, wager outcome reveal instructions 124 may indicate to the user that if the objective is accomplished, then a reward will be granted to the user. If the objective is accomplished, wager outcome reveal instructions 124 may reveal the wager outcome (which is predefined) to the user in the form of the reward.

The reward may include the wager outcome itself (e.g., a payout amount), an equivalent value of the payout in additional tokens, an equivalent value of the payout added to the token used to place the wager, an additional bonus (e.g., one or more additional tokens, virtual item, currency value), and/or other item of value or perceived value. In this manner, wager outcome reveal instructions 124 may reveal the wager outcome such that the reward appears to have resulted from accomplishment of the objective even though the reward resulted from the outcome of the wager, which occurred before the objective was even attempted. If the objective is not accomplished, then the wager outcome (e.g., payout) may be revealed to the user at another time in association with another objective.

In an example embodiment, once a token has been purchased (and/or, in some implementations, a wager has been placed), the interactive game may begin. Based at least in part on the detection of certain interactions of the user with the interactive game, the user may be awarded additional tokens and/or legal currency or other item of value. The awards may be based in whole or in part on the results of real-world wagers related to the token that were placed either after its purchase or as part of a reserve wager implementation (and/or, in some implementations, wagers unrelated to a particular token). However, optionally it may appear to the user that the awards are based on game activity and not dependent on any real-world wager. The user may optionally be notified substantially immediately, upon the occurrence of certain interactions that trigger a reveal of an award, of the corresponding award (e.g., the award amount). The award may be displayed to the user while the interactive game interface is also displayed, and may be displayed within the interactive game and/or external to the interactive game.

For example, if the game is a target game, a portion of the winnings corresponding to a real-world wager may be awarded to the user each time the user hits a target, where the award (including the amount) is displayed to the user substantially immediately after a target is hit. Thus, the reveal of the real-world wager winnings may be incrementally revealed to the user in a time delayed manner in the environment of the interactive game. Different amounts may be awarded (revealed) based at least in part on the type interaction, such as the type of target hit or the area of a target.

For example, if the user purchased a $1.00 token(s) and applied the token(s) to play the interactive game, then $1.00 (minus any features deducted by the system) may be utilized as a real-world wager, or a $1.00 reserve wager may be associated with the token from reserve wager store 1490 in the manner discussed below. Assuming that the $1.00 in bets resulted in a $3.00 payout, either as the result of a current real-world wager or an associated reserve wager, and the target is a bulls eye with different award zones (e.g., a $1.00 award zone near the center of the target, a 50 cent award zone surrounding the $1.00 award zone, and a 25 cent award zone surrounding the 50 cent award zone), each time the user hits a given zone with a virtual projectile, the corresponding award is displayed to the user. Once the system determines that the user has been awarded the $3.00 payout (minus any deductions), the user is so informed and is prompted by the system to purchase more tokens or to use already purchased tokens in the user's account. Otherwise, the game is optionally ended by the system.

Gameplay may optionally be modified by the system based at least in part on the results of the wager(s) associated with the token(s) used to play the game, the results of a wager(s) associated with the token(s) used to play a different game, the value of the token(s) played, the type of tokens played and/or the number of tokens played. For example, based on one or more of the foregoing criteria, a user may be given more virtual lives, extended game play, additional weapons, additional powers, additional land, additional bonus points, more game events shown, etc. By way of further example, gameplay modifications may include modifying game decision points, a reordering of game events, the provision of bonuses (e.g., in the form of points, virtual goods, badges, in-game prizes), the provision of bonus points that may have redemption value (e.g., that can be exchanged for physical goods, services, monetary exchange, etc.), the modification of the path of moving objects within the game, the modification of the form of objects within the game, ending a game round or period of play earlier, extending a game round or period of play, enabling the user to continue playing at the next game level without having to restart at the beginning of the game (e.g., if the user loses the game, the user does not have to start back at the beginning, or if the user's token has been played out, the user may be permitted to add additional tokens without having to start back at the beginning of the game), etc.

Thus, certain embodiments time shift the display of results of wagers in order for the consumer to have the illusion that the awards are being won in real time, as a result of the user's game play, even though the results of the wagers may already be known by the system prior to the user playing the game, and even though the user may be able to collect the results of the wagers without playing the game.

In exemplary embodiments where a token purchase results in a current real-world wager, game events may optionally be used as a metaphor for a time delay or wait period, such as the wager outcome delay. Such metaphors may time shift game play to match the availability of tokens. By way of example and not limitation, the user may have selected a game to play, but the wager results for the token applied to the selected game may be still unknown (and so in certain embodiments, the selected game may not be ready for play). In order to entertain the user until the results are known (e.g., when a wagered-on race result is declared), the system may, by way of example and not limitation, present the user with a racing game with an unknown finish line. The user may continue racing, without the wager results being revealed, as they are not yet known. Once the wager results become available, the finish line may be presented in the game as a metaphor indicating to the user that the token is ready to be played. When the user crosses the finish line, the game play for the selected game may begin or a payout may be revealed. A progress bar may also be displayed, reflecting the progress of token availability.

In exemplary embodiments where a token purchase results in the association of a reserve wager, wager outcome delay is eliminated or substantially reduced. Thus, game events do not have to be used as a metaphor for a time delay or wait period. In reserve waver implementations, therefore, game events or reveal strategies can instead be focused on user engagement with the interactive media, or methodologies that result in users expanded or repeated use of the system.

In an implementation, a number of tokens may be revealed (e.g., results of associated wagers that are revealed) Optionally, the number of in game prizes that can be or are revealed may be based at least in part on the number of tokens played.

In an implementation, because a given token may be associated with one or more real-world wagers, wager outcome reveal instructions 124 may reveal payouts in association with tokens. For example, wager outcome reveal instructions 124 may reveal that a particular token is associated with a particular wager outcome.

Assuming that the user owns several tokens for which corresponding wager outcomes have not been yet been revealed to the user, wager outcome reveal instructions 124 may select tokens to reveal (e.g., select wager outcomes corresponding to tokens) based on the outcome and/or odds of the wagers corresponding to the tokens, and/or other factors.

For example, if three tokens resulted in winnings, and two other tokens resulted in no winnings, wager outcome reveal instructions 124 may alternate between revealing a token associated with winnings with a token associated with no winnings, so that the user is not disappointed by having several reveals in a row with no winnings.

In another example, if the user captures a valuable (e.g., rare) item, such as a gold chest, in a game, the wager outcome reveal instructions 124 may reveal a token associated with a relatively large payout (e.g., low odds of winning, but large payout). On the other hand, if the user finds a low value (e.g., abundant) item, such as a glove, the wager outcome reveal instructions 124 may reveal a token associated with a relatively small payout (e.g., high odds of winning). Thus, wager outcome reveal instructions 124 may select which tokens (and/or value of a payout) to reveal based on events that occur in a game.

In an implementation, wager outcome reveal instructions 124 may determine a win-loss gradation such that a given outcome is placed along the gradation. For example, a given wager may result in a net win (e.g., wager five dollars, receive ten dollars in winnings), a partial loss (e.g., wager five dollars, receive two dollars in winnings) or complete loss (e.g., wager five dollars, receive zero dollars). A win-loss ratio (which may be expressed as a percentage or other value) may be determined for the amount of the win compared to the amount of the loss. For example, the ten dollar win may equate to 100 percent (e.g., net 100 percent of the real-world wager), the two dollar win may equate to 40 percent (e.g., net 40 percent of the real-world wager), and the zero dollar win may equate to 0 percent. Depending on the win-loss ratio for a given outcome, wager outcome reveal instructions 124 may provide different reveals in which items are revealed instead of or in addition to the cash value that may have been won. For example, for lower win-loss ratios, wager outcome reveal instructions 124 may reveal less desirable items, while for higher win-loss ratios, wager outcome reveal instructions may reveal more desirable items.

Reserve Wagering

In various implementations described herein, reserve wagering is used by the system to minimize or eliminate delay between a user acquiring a token and wager outcomes being available to reveal to the user via the reveal functionality discussed herein. To do so, in an implementation, the system places one or more real-world wagers independently of the user acquiring a token. These independently placed wagers are known as reserve wagers. In an implementation, the reserve wagers, and their outcomes (when known) are stored as an inventory of reserve wagers in reserve wager store 1490 (or, in some implementations system reserve unrevealed account 1470 as discussed below).

Then, in various implementations, when the user acquires a token, instead of the system placing a real-world wager and waiting on the results (or in addition thereto), one (or more) of the inventory of reserve wagers is associated with the token such that results can be immediately revealed, such as by using the delayed reveal implementations discussed herein. By using this functionality, a user may immediately start interacting with interactive media and viewing revealed results without being impacted by wager outcome delay.

In an implementation, a reserve wager that may be associable with a token purchased by a user may be placed at any time before the user purchases the particular token. In another implementation, the reserve wager may be placed at any time that allows its results to be obtained more quickly than results would be obtained from a real-world wager placed in response to the token purchase (herein called a target wager).

In an implementation, reserve wagers may be real-world wagers placed in the past such that a result of the associated real-world wager is known (i.e., the real-world wager has been "paid"). In such an implementation, the results will be stored by the system in an encrypted/secure manner, such that even if the outcomes are known inside the system, such as in reserve wager store 1490 or the various accounts discussed herein, they are unknown outside the store and cannot be discovered by a user, to thereby prevent cheating. In an implementation, the results may be stored in a separate system reserve unrevealed account 1470. In another implementation, the reserve wagers may be a real-world wager that is simultaneously occurring and/or will occur very shortly. In such a case, the result of the real-world wager is not yet known, but can be applied almost immediately in the wager revealing process discussed above rather than waiting for a wager outcome delay related to a wager placed in response to a token acquisition.

When using reserve wagering functionality, according to one implementation, a user may acquire (e.g., purchase) a token and, rather than a real-world wager being placed in response to the purchase such as described in some implementations herein, the system will associate the token with a reserve wager from the reserve wager store. In an implementation, the system will match one or more aspects of a reserve wager stored in the reserve wager store 1490 with aspects of a real-world wager that would otherwise be placed in response to the token purchase according to the user or system preferences discussed herein, or other applicable preferences or system-determined parameters.

For example, in one implementation, the system may determine that the user has purchased a $5 token, and determine by accessing user preferences, such as those stored in user profile account 1480, that the user prefers low-risk horse race wagers. The system may then access the reserve wager store 1490 and search for a previously placed $5 low-risk horse race reserve wager (or, e.g., multiple wagers totaling $5) and, if a matching reserve wager is found, assign the reserve wager to the user's token instead of a future real-world wager. Any user, system, or wager preferences or parameters may be used by the system to effectuate this matching. For example, wagers can be categorized by the nature of the wager being placed and/or their probabilities as to risk and return (e.g., Track: Santa Anita; Date 05/05/2022; Race: 4; Horse: 6; Cost: win for $5; Estimated payout (if winner): $15; Probabilities: approximately 30% likelihood of success, 70% failure, projected return on winning: 300%).

In an embodiment, because the matching reserve wager is associated with the token, the results of the reserve wager will also be applied to the token, instead of the results from any future real-world wager that would have been placed by the system. The reserve wager outcome may then be revealed to the user according to any of the implementations discussed herein, such as the delayed reveal implementations, as if it were the results of the future real-world wager, but without any wager outcome delay.

Figure 15:
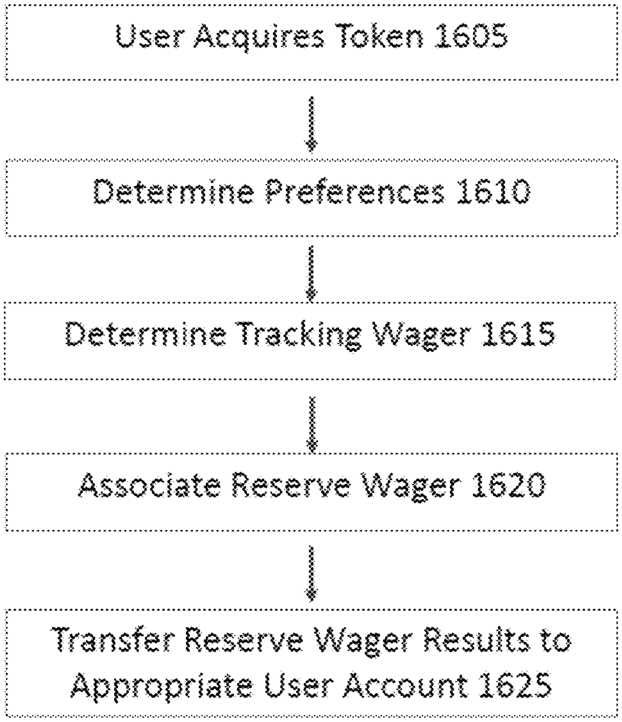
FIG. 15 illustrates a method of using reserve wagering, according to an implementation of the invention.

As an example, in one implementation illustrated in FIG. 15, a user acquires a $5 token according to any of the implementations discussed herein at 1605, such as via account manager instructions 121. The system will then determine the user, system, and wager preferences or parameters indicating how the $5 should be wagered in 1610, such as by accessing user profile account 1480. The system will then determine a future wager to be placed associated with the token at 1615, such as an upcoming live horse race, using any of the appropriate implementations discussed herein. In the reserve wager functionality, this is referred to as a tracking wager. To avoid any wager outcome delay in obtaining the results (i.e., waiting until after the running of the horse race associated with the tracking wager), the system will associate at 1620, in place of the tracking wager, a $5 reserve wager (or wager package) from reserve wager store 1490 that was independently pre-purchased by the system and has already returned (or will shortly return) results. In this implementation, the system associates the reserve wager by matching one or more of the wager parameters of the reserve wager to one or more of the wager parameters of the tracking wager. In other implementations, the reserve wager can be assigned by the system randomly in place of the tracking wager without considering the respective wager parameters, or by considering only certain wager parameters such as total value to filter the available reserve wagers, and then associating a reserve wager randomly. Similarly, if multiple reserve wagers are matched to the tracking wager, a particular reserve wager of the multiple matching reserve wagers can be randomly selected.

In some implementations where the outcome of the reserve wager is presently available, once the reserve wager (or wagers) is assigned to the token in place of the tracking wager (e.g., at 1620 in FIG. 15), the system updates one or more of the user's accounts 1405 to reflect the outcome, such as by updating the user's unrevealed account 1450 and/or reserve unrevealed account 1460 as discussed in more detail below. In this manner, the user may immediately begin interacting with the interactive media to utilize the delayed reveal implementations discussed herein. For example, as the user plays through the $5 token using the interactive media, the system will decrement the balance in the user's unrevealed account 1450 and increment the balance in the user's revealed account 1440, in the manner discussed in more detail below.

In another implementation, the system will associate at 1620 a $5 reserve wager (or wager package) that was pre-purchased by the system and that has not yet returned all or some results in place of the tracking wager. Similarly to the implementation above, the reserve wager can be associated by the system randomly in place of the tracking wager, or the system may match parameters of the reserve wager to the tracking wager as discussed above. In this implementation, the system will be configured to ensure (or increase the likelihood) that, by the time the user utilizes the initial $5 token in his/her interactions with the interactive media, the outcome of the $5 of real-world wagers associated with the reserve wager will become known so that they can be added to the unrevealed account 1450 and/or reserve unrevealed account 1460 in the manner discussed herein.

In various implementations, reserve wagers can be reserved in reserve wager store 1490 on a per player or account basis (e.g., each wagering account or player has its own store of reserve wagers either in the reserve wager store 1490 or in individual user or account-specific reserve wager stores), owned by a third party (i.e. the company store), or remain "unowned" in the wagering system, waiting to be retrieved/assigned to a particular token.

In some implementations, the tracking wager is still placed by the system as a real-world wager and its results are placed into the reserve wager store 1490 as a new reserve wager to replace the reserve wager that was associated with the user's token (e.g., at 1620 in FIG. 15). In some implementations, if the user acquires more tokens, such as a second $5 token, the same reserve wager process discussed above can be utilized to identify a tracking wager and match it to a reserve wager. The reserve wager associated with this second $5 token in this instance may, therefore, be all or part of the user's previous tracking wager if its results were added to the reserve wager store. Or the reserve wager associated with the second $5 token may be a different reserve wager matched to the second $5 token in the manner discussed herein.

In some implementations, the tracking wager, e.g., the $5 wager in the example above, may not be used to place a real-world wager, and the tracking wager may simply be deleted as the user has already obtained an equivalent value (including costs and results) from the assigned reserve wager. In other implementations, such as where required by law or regulation, the $5 tracking wager of the above example may be placed, and its results may be provided to the user as a bonus. In still further implementations, the results of the $5 tracking wager and the reserve wager associated with the user's token (e.g., at 1620 in FIG. 15) are compared and any result differential is rectified in the user's account and revealed to the user, such as by using the delayed reveal implementations herein, and/or indicated to the user by a specific accounting message outside of the interactive media.

In various implementations, the reserve wagers may be stored in reserve wager store 1490 in a data structure that includes various information that can be used by the system to ensure an appropriate association of a reserve wager to a particular token (e.g., in 1620 in FIG. 15). The data structure may store, for each reserve wager, any of the wager parameters discussed herein, or may include or reference any of the user or system preferences discussed herein. For example, the data structure may include at least: the wager amount, the type of wager, the wager risks, and/or the wager payout profile (e.g., odds distribution, number of bets in specific amounts). When a reserve wager is needed (e.g., for assignment to a token) the system may determine the relevant wager parameters of the tracking wager (e.g., 1610 in FIG. 15) and filter the available reserve wagers in the reserve wager store 1490 based thereon to identify the subset of reserve wagers that meet the wager parameters. If there is more than one reserve wager that matches the relevant wager parameters, the system may randomly select one of the matched reserve wagers (e.g., using an RNG) or use other selection techniques.

According to some implementations, even though the outcome of the reserve wagers may be known or knowable (e.g., the horse race has been completed) the system may be configured using various technical features to prevent the system from obtaining or determining the outcome until the occurrence of some event (e.g., the reserve wager is assigned to a specific user). By using the technology and/or an audit trail to implement this, any attempt to specifically assign to a specific user reserve wagers with known outcomes that are particularly high or low can be prevented. As one example, the reserve wagers, and/or their results, can be encrypted (by the system and/or as received by the system) to facilitate this. Alternatively or in addition, the system may not request the results of the reserve wager until assigned to the user. Other techniques may be used.

According to some implementations, the system may be configured to maintain various accounts to provide the reserve wagering functionality discussed above. For example, the system may maintain the ADW account as discussed above to hold a user's current cash balance, and a token account 1430 to track a user's tokens. The system may also include a revealed account 1440 and unrevealed account 1450 that function as discussed in the implementations herein. To provide reserve wager functionality, there may be additional user accounts, such as reserve unrevealed account 1460, additional system accounts 1407 that interact with the reserve wager instructions 126, including reserve wager store 1490 and system reserved account 1470, and additional stores, such as triggering events 1492.

The reserve unrevealed account 1460 is similar to the unrevealed account 1450 discussed herein, but is dedicated to tracking reserve wager outcomes. As discussed above, results of reserve wager results that are known at the time the reserve wager is associated with a particular token may be encrypted so as to prevent the ability for cheating. Accordingly, the reserve unrevealed account 1460 maintains reserve wager outcomes in a manner such that they are not revealed to the user or known to the system. As part of the delayed reveal functionality discussed herein, certain outcomes stored in the reserve unrevealed account 1460 may be revealed to a user and then transferred to the revealed account 1440. In another implementation, the unrevealed account 1450 may also be used to track reserve wager outcomes where encryption is not necessary, or where the outcome of the reserve wager is not yet known or is stored separately.

The system reserve unrevealed account 1470 is similar to the reserve unrevealed account 1460, but may store reserve wager results separately from reserve wager store 1490 as necessary for system security or functionality. In other words, reserve wager store 1490 may store all wager parameters necessary for matching a reserve wager stored therein to a tracking wager, but not the results, which are stored in a relational manner in system reserve unrevealed account 1470 and transferred to reserve unrevealed account 1460 as necessary by reserve wager instructions 126.

For example, when a user deposits cash into his/her account, the ADW account 1420 will reflect the cash balance. When a user elects to convert cash from the ADW account 1420 to tokens, and agrees to utilize the reserve wager functionality (e.g., by selecting such functionality via a user interface and accepting terms and conditions displayed thereon), the cash balance in ADW account 1420 will be decremented, a token balance in token account 1430 will be incremented, and a tracking wager will be determined in the manner discussed above (e.g., 1615 in FIG. 15). A reserve wager will then be assigned (e.g., 1620 in FIG. 15) and an outcome will be determined and reflected in reserve unrevealed account 1460 for future use by the user, such as in the delayed reveal implementations discussed herein. In a delayed reveal implementation, as outcomes of the reserve wager are revealed to the user, the reserve unrevealed account 1460 will be decremented and the revealed account 1440 will be incremented (assuming the outcome is positive).

Group Reveal for Pooled Wagers

Optionally, a token, or group of tokens may be shared by a group of users. For example, a group of users may pool funds together to purchase a group of one or more tokens. All of the users may have been contributed equally to the purchase, or different users may have contributed different amounts to the token purchase. The users may optionally play an interactive game together (e.g., a multi-player interactive game), wherein award reveals may occur upon certain events within the game, as similarly discussed above. Optionally, the award reveals may be provided to all the users (or a subset thereof), at substantially the same time. Optionally, the distribution of the payout to users may be proportionate to their share of the contribution in purchasing the token(s).

Optionally, two or more users may play against each other in an electronic game and place bets, using tokens, as to who will win, where the winner is awarded the tokens (and the associated race winnings) wager by the loser. Optionally, the system determines whether a given user has viewed the results of wagers associated with a token by examining the history of winning reveals for the respective token. For example, the winnings may have been revealed to the user during an interactive game or by the user examining the user's account information. If the user has viewed the results of wagers associated with a token, the system may prevent the user from betting that token against another user in a game, as the user may otherwise unfairly wager a token that the user knows has little or no winnings associated with it.

Securing Real-World Wager Outcomes

In some implementations, the system may transmit, store, and reveal wagering outcomes securely, such as in the reserve token implementations above, so that an outcome of a real-world wager, such as a real-world wager placed as the result of a token acquisition or a reserve wager placed independently by the system will be hidden from users until it is revealed, or such that it will be known whether the outcome was accessed or viewed by the user and/or system before it was intended to be revealed.

For example, a process may be provided enabling a wagering outcome to be encrypted, transmitted, stored, and revealed securely, and/or to provide an indication if the outcome had been earlier revealed or inspected. For example, this process enables computer system 104 to place wagers, such as a real-world wager placed as the result of a token acquisition or a reserve wager placed independently by the system, and without knowing the wager results, assign the reserve wager results to a token and/or store the result in a reserve unrevealed account 1460 and/or a system reserve unrevealed account 1470. This prevents computer system 104 from, for example, assigning a reserve wager with a "good" result to a particular token and/or to favor certain users and/or tokens. As another example, this prevents computer system 104 from favoring certain users with, for example, additional reward tokens that are known to be good tokens, because computer system 104 will not know which tokens are "good" tokens, associated with significant winnings. Further, this process enables a user to initiate a game using a token, and if the user quits the game without computer system 104 revealing the token results, lets the user re-use the token in another game or in a wager with another user. Thus, certain embodiments enable computer system 104 to determine if a reveal occurred or not, and to transfer and manipulate tokens, without knowing a wager outcome associated with a token prior to the outcome being revealed to the user.

By way of illustration, online wagering would benefit from such a mechanism to exchange secret information (e.g., wager results related to a token or reserve wager) so that the results cannot be revealed by computer system 104 or a user. In another implementation, the results cannot be revealed without evidence of their having done so. In such an arrangement, the system provides a reveal timestamp, indicating when the results were revealed, and records a tamper proof journal entry of the exchange of information.

In an example embodiment, computer system 104 may place wagers (e.g., random wagers). The wager results, when received, are cryptographically sealed such that they cannot be viewed before they are revealed to a user, such as via the delayed reveal implementations discussed above. In another implementation, the results may be viewed, but the process of viewing creates a permanent record that the viewing has occurred so that the viewer (whether computer system 104 or a user) cannot hide the fact that the wager results were viewed or otherwise revealed.

By way of further example, computer system 104 may request a number of previously settled and securely sealed wagers (tokens) to reveal to a user. Some of the tokens, during game play, are revealed to the user, while others are not. The tokens that are not revealed are "returned" to the dispensing system. Because there is no indication that the seal was "broken" and the wagers revealed, the dispensing system has confidence that the "returned" tokens have not been revealed and can dispense them again later to the user (or optionally another user).

In particular, with reference to a series of tokens in the foregoing examples, the series of tokens may be the same as an associated series of facts (wager outcomes). When a fact is encrypted with an asymmetric or symmetric key it becomes a secret. When it can be established that an entity (e.g., computer system 104, a viewer, a recipient) has access to both the secret and the key then it can be presumed that the secret has been revealed to the entity.

By way of example, and not limitation, an illustrative process will now be described.

Party A (e.g., a wager placing system) places the wagers and knows the outcomes. A batch of outcomes are selected and shuffled using commutative encryption with Party B. The batches may optionally be formed so that each batch is associated with a similar total value of the wagers, so that each batch has the same or approximately the same value. Neither Party A nor B knows the order of the shuffled, encrypted wager outcomes secrets. Party B (or Party C) (assigner of tokens to wagers) additionally applies one or more keys based on one or more salted hash sequences to further encrypt the secrets in the shuffled order. Keys may be stored with the encrypted sequences so that secrets need to be decrypted in shuffled order. At this point, Party A had knowledge of the outcomes, but cannot decrypt the items in the shuffled order. Party B or Party C knows the sequence but still does not know the original outcomes.

Individual secrets in the shuffled order can be dispensed to third parties which request the keys for secrets they reveal. Once the keys are distributed, computer system 104 may assume the secrets have been revealed (whether or not the keys have been actually used to reveal the secrets.

If Party B or Party C wants to associate tokens with secrets, the tokens can be stored in a known sequence (with an incrementing identifier, by way of example). The tokens are then defined to be assigned in the shuffled secret order.

Keys may be exchanged and/or recorded using public proof of work networks (such as the Bitcoin network, which verifies transactions using encryption) and linked time stamping, or otherwise.

Optionally, a token may be configured to place wagers in different time frames and/or in different currencies. For example, for a given token or set of tokens to be used to access an interactive game, computer system 104 may place some or all of the bets in different countries, with respectively different currencies. Because a given token or set of tokens may be associated with wagers placed on a plurality of events (e.g., races), a given wager may be placed on an event (e.g., a race) occurring at a different time than another event corresponding to another of the wagers.

Optionally, tokens may be used to purchase virtual items in a game, such as more plays of the game, additional lives, bonus points, land, weapons, powers, etc. Optionally, virtual currency is provided to the user to make such purchases as a benefit of purchasing a token to be wagered. As noted elsewhere herein, promotional tokens may be provided to the user as a rebate and/or utilizing a portion of the profits received by computer system 104 operator. Thus, the promotion tokens may be used as a marketing tool enabling the user to make additional wagers.

Exemplary Operation

When the user accesses computer system 104, a user interface may be presented to the user, enabling the user to select an interactive game mode or a user wagering mode. For example, in a user wagering mode, the user may make direct wagering decisions, such as by directly placing bets on sporting events (e.g., selecting tracks, races, horses, wager types, wager amounts, etc.) and wherein payouts are not revealed as part of an interactive game, but are instead simply revealed after a race (or races), corresponding to the user-placed bet, is completed. Optionally, computer system 104 may enable the user to use the same user account and ADW account to access and utilize either mode (e.g., for direct wagering and playing interactive games).

When the user is ready to play a game and selects the interactive game mode, the user may select the interactive game from a plurality of available games via a game menu or otherwise. Games may be presented to the user in one or more groupings, wherein the groupings may be based at least in part on how many tokens are needed to play the game. In addition or instead, games may be grouped according to game type or other game characteristics (e.g., action games, strategy games, one person shooter games, card games, most popular games, newest games, etc.). The amount wagered may correspond to the tokens needed to play the game.

Optionally, one or more bets are placed at least partly in response to a token being purchased (e.g., on the next suitable event on which a wager may be placed). Depending on the availability of sporting events to wager on, the user may be informed that the game play will be delayed until such an event is completed, to thereby enable the wager to be placed on the event and the results of the wager to be known. Or, if the user has selected reserve wagering functionality (or presently selects reserve wagering functionality in response to an indication that game play will be delayed), game play will proceed. Optionally, one or more bets are placed at least partly in response an interactive game being initiated by the user.

If the user has not selected reserve wagering, depending on the availability of sporting events to wager on when the user purchases a token, a corresponding wager may not be immediately placed and the initiation of the interactive game with respect to the user may be optionally correspondingly delayed. For example, if there is no race beginning for 5 minutes (corresponding to 11:35 PM local user time), computer system 104 may estimate how long it will take to complete the race (e.g., 2 minutes after the race starts), and may calculate the total time until the race is estimated to be over (e.g., 5 minutes until the race starts+2 minutes until the race is estimated to be completed). Computer system 104 may then generate a wait notification which may be provided for display (via a user terminal) to the user indicating when the interactive game will begin, which may correspond to about the start time of the race and the estimated race duration (e.g., "your game will start in about 7 minutes, at about 11:37 PM").

Optionally, the interactive game may begin prior to the race or the completion of the event, but the results of the wager are not revealed to the user until the completion of the event and after the results of the wager are received by computer system 104 (which may be after the user has completed the interactive game), where the results may be revealed in a delayed fashion as similarly described above. Optionally, the interactive game may begin prior to the race or after the beginning, but prior to the completion of the race, but the wager is not placed until one or more specified events occur with respect to the game. Optionally, the user may queue up results for one or more tokens, so that there will generally be a token whose results are known, and is ready for playing.

Optionally, the game may be ended when all the wager results are revealed to the user during the game. Optionally, when all the wager results are revealed to the user during the game, the user may be prompted and enabled to purchase additional tokens which may be wagered and which will enable the user to continue playing the game, without the user having to start the game over. Optionally, computer system 104 may enable the user to continue playing the game with no additional token(s)/wager(s) revealed to the user Optionally, the user may inspect the results of the underlying wager(s) (and/or risk reward event(s)) and view the corresponding payouts without having to play the interactive game (e.g., by accessing a user account interface). Optionally, the results of the bets and the winning amounts (if any) are automatically revealed to the user upon the user completing the corresponding game. Optionally, the user may be able to collect or withdraw winnings without having to play a game (e.g., via a user account information user interface).

Optionally, a user may be awarded tokens as a consolation prize for losing one or more bets, for playing a certain number of games, for purchasing a certain number of tokens, for being a registered user for a specified period of time, randomly, and/or otherwise.

System Databases

In an implementation, database(s) 130 may include databases that stores the accounts discussed herein, including user accounts 1405, system accounts 1407, other data used by the system, such as triggering events 1492, and any other data necessary for the functionality discussed herein, including a user database that stores enrollment and other information known about the user, a wager rules database that stores rules used to determine wagers, a reveal rules database that specifies parameters used to identify when and how to reveal wagers, and/or other databases that includes information obtained by computer system 104.

Third Party Interactive Media API and Partner API

In an implementation, third party interactive media API 134 may include various interfaces such as system calls that provide access to some of all of the functions described herein that are relevant to third party interactive media providers(s) 160. Third party interactive media API 134 allows various third party interactive media provider(s) 160 an ability to provide reveals (including amounts of reveals to provide, difficulty of objectives that should be used in a reveal, when to provide reveals, etc.) through their own interactive media, thereby expanding the reveal platform to include a wide range of interactive media publishers.

In an implementation, partner API 136 may include various interfaces such as system calls that provide access to some of all of the functions described herein that are relevant to partner promotions provider(s) 170. For example, using partner API 136, partner promotions provider(s) 170 may provide advertisements, incentives, sample games, and/or other media that is being promoted using the platform provided by computer system 104. For example and without limitation, a reveal may be provided if a user interacts with an advertisement provided by partner promotions provider(s) 170.

Wagering Systems

Wagering system(s) 140 may include automated (e.g., electronically placed wagers through network 102 without system operator intervention) and/or manual (e.g., wagers placed using system operators who work on behalf of an entity operating computer system 104) wagering systems. Such wagering system(s) 140 may be operated by various entities such as horse tracks, casinos, and/or other wagering systems that lawfully allow wagers to be placed.

Payment Systems

Payment system(s) 150 may include conventional electronic funds transfer systems used for credit card and other payments, ACH systems, online payment systems (e.g., PAYPAL), BITCOIN payment systems/exchanges, and/or other payment systems that facilitating funds transfers.

Third Party Interactive Media Providers

Third party interactive media provider(s) 160 may include, for example, game developers that provide interactive games, video providers that stream or provide downloadable video content, music providers that stream or provide downloadable music content, and/or other types of media providers. Third party interactive media provider(s) 160 may use third party interactive media API 134 to interface with computer system 104 to obtain real-world wager outcomes and present the outcomes through their own interactive media platforms. Such third party interactive media provider(s) 160 may include game developers, media providers that stream or provide multimedia downloads, and/or other providers of interactive media.

Partner Promotion Providers

Partner promotions provider(s) 170 may include entities that wish to promote an item such as a good or service. Partner promotions provider(s) 170 may use computer system 104 to provide promotions, which may serve as the basis for a reveal such as an invitation to a user to view an advertisement to receive a reward (even though the reward is based on an outcome of a real-world wager and not on viewing the advertisement).

User Devices

User device(s) 180 may include a device that can interact with computer system 104 through network 102. Such user device(s) may include, without limitation, a tablet computing device, a smartphone, a laptop computing device, a desktop computing device, a network-enabled appliance such as a "Smart" television, and/or other device that may interact with computer system 104.

Various Implementations Of Operations Of The Computer System

Having described an overall use and components of computer system 104, additional implementations of various processing operations of computer system 104 will now be described. The various processing operations that will now be described may relate to various implementations of real-world wager triggers, selection of real-world wagers, reserve wagering, reveals of the outcome of real-world wagers (including of reserve wagers), and/or other aspects of computer system 104. It should be appreciated that the following may be combined with one another, as well as with other processing operations described herein. For example, a particular implementation of a wager trigger may be used in combination with a particular implementation of a reveal or reserve wager. Other combinations are contemplated as well.

As described with respect to the various implementations that follow, unless specifically specified as triggering "a real-world wager," the wager triggers can relate either to a real-world wager (including a reserve wager) or to a simulated wager. A real-world wager trigger (or triggering real-world wagers) may cause a real-world wager to be placed. A simulated wager trigger may cause a simulated wager to be placed (e.g., a simulated wager against another player, a virtual pull on a virtual slot machine, acceptance of an objective to win something of value in a game or other interactive media, etc.). In some implementations, a simulated wager may merely result in a reveal of an outcome of a real-world wager that has already occurred before the simulated wager (giving the user the impression that the simulated wager resulted in the outcome). In other implementations, a simulated wager may trigger a real-world wager to occur. In these implementations, a game or other interactive media may wait for the outcome of the real-world wager and then provide a reveal of the outcome through the game (or other interactive media) so that the outcome appears to have resulted from the simulated wager.

Timing Aspects of a Real-World Wager

As described herein, a real-world wager may be initiated upon acquisition of a token (e.g., when a user purchases or otherwise acquires a token), user selection or initiation of interactive media (e.g., selection of a game to play), an occurrence of an event in the interactive media (e.g., based on a user controlled or other in-game action), a system determination that a reserve wager should be placed, and/or other events that can trigger the real-world wager.

The initiation of the real-world wager may specify a given real-world wager to make (e.g., specify a horse race or other event on which to place the wager, an amount of the wager, a number of wagers to make, etc.) and/or computer system 104 may select the real-world wager based at least in part on one or more wager rules described herein and one or more user or system preferences. In some instances, the wager event on which the selected real-world wager is placed may occur in the future. For example, a horse race may be selected, but may not occur until another five minutes. Thus, the outcome of the horse race may not be known until at least another five minutes (plus the time it takes for the horse race to complete and the outcome to be made available). This is a wager outcome delay.

In an implementation, computer system 104 may delay the reveal of the outcome through interactive media provided to the user associated with the real-world wager until the outcome is known (e.g., until the wager outcome delay has passed). In a reserve wagering implementation, there is no (or limited) wager outcome delay because a reserve wager with a known (or soon to be known) outcome replaces the tracking wager in the manner discussed above. But a delayed reveal may still be utilized in a reserve wager implementation to enhance interactions with the interactive media or to contemplate a limited wager outcome delay. In any case, a delayed reveal may be accomplished in various ways.

If interactive media has not yet been selected by the user associated with the real-world wager, computer system 104 may select a particular interactive medium to provide to the user to provide the delayed reveal functionality. This may occur, for example, when a user purchases a token and the token purchase triggers a real-world wager or the reserve wager process. If the user has not selected interactive media (e.g., a game to play), computer system 104 may select and suggest interactive media for the user to interact with and receive the results of the real-world wagers, either as they arrive from future real-world events or as the system provides the results from associated reserve wagers.

The selected interactive media may be used to reveal the outcome of real-world wagers in a manner related to the wagers themselves or in a logical manner supporting system functionality. For example, computer system 104 may select the interactive media based on its suitability to delay a reveal opportunity based on when the outcome of the real-world wager will become available, or its ability to logically reveal outcomes of associated reserve wagers. For example and without limitation, the reveal opportunity may include a finish line in a racing game. The finish line may not be presented to the user until the wager outcome is known. In the foregoing example, the finish line may not be presented (or achievable) until at least five minutes after the game has been selected (when the outcome of the horse race is known). In a reserve wager implementation, because the outcome has already been determined, waypoints may be added to the racing game for incremental reveals and a finish line may be provided for a final reveal, where the timing of the game may be calculated based on user interaction metrics, such as average user attention spans, previous interactions with the user, further reveal opportunities, and other metrics.

In another embodiment, the selected game may be used to occupy the user until the outcome is available (either due to wager outcome delay, system processing, or other logical interactions in the system), at which time another game that is used to reveal the outcome may be presented to the user. In other words, the selected game may not be used to reveal the outcome, but rather to give the user interactive media content to use while waiting for the outcome. In an implementation, computer system 104 may select the game (or other interactive media) based on an estimated time that the outcome will be available. For example and without limitation, for longer wait times, computer system 104 may select a more difficult game, a game having a greater number of levels, and/or a game that takes a relatively long time to play/learn. For shorter wait times, computer system 104 may select a less difficult game, a game having a fewer number of levels, and/or a game that takes a relative short time to play/learn.

If interactive media has already been started by the user associated with the real-world wager (e.g., when an in-game action triggers the wager), computer system 104 may delay reveal opportunities within the interactive media. For example, computer system 104 may provide the user with a new race level that has a finish line based on an estimated time that the outcome will be available.

In an implementation, if the reveal opportunity is forfeited, then the outcome of the real-world wager may not be revealed. Instead, the outcome may be revealed during another reveal opportunity, in which case the various user accounts may not be updated. For example, if the user exits the racing game before reaching the finish line, the outcome of the real-world wager may not be revealed.

Triggering Wager Opportunities

In an implementation, computer system 104 may provide a wager opportunity to a user. The wager opportunity may be associated with an objective (e.g., "get a bulls eye to win five dollars," "stream a winning video from among various videos to win five dollars," etc.) that gives the appearance to the user that the user is wagering on the outcome of the objective to potentially receive a reward, when, in fact, the reward (or loss) depends on an outcome of a real-world wager.

In an implementation, the wager opportunity, if accepted, may cause computer system 104 to place an actual real-world wager, on which the accepted wager opportunity depends. The real-world wager may be for a future event of may also use the reserve wagering functionality discussed above. The outcome of such a real-world wager may be revealed using the reveal platform described herein.

Providing such wager opportunities may enhance an entertainment value of interactive media because the user may be given an appearance that interaction with the interactive media causes the outcome of the wagers. Thus, computer system 104 may trigger wager opportunities at various times and for various reasons to enhance the entertainment value of interactive media and/or for other reasons. Having generally described triggering wagering opportunities, various implementations of triggering wagering opportunities will now be described.

Wager Triggers Based on In-Game Actions and Other User Interactions

In an implementation, computer system 104 may provide a wager opportunity based on the occurrence of certain user interactions with interactive media. A wager opportunity in this context includes both direct wagers, token acquisition, and the other methods of wagering discussed herein. Upon the occurrence of a certain user interaction, the user may be provided with an opportunity to place a wager, either directly or via acquisition of a token (assuming the user has sufficient funds in his/her ADW account). For example, certain in-game actions in a game may be rewarded with an opportunity to place a wager, thereby enhancing an entertainment value of gameplay.

In a particular example, computer system 104 may provide a "match three" game where an objective is to match three or more items (e.g., gems) that share a similar characteristic (e.g., being the same type of gem). When a user matches four or more gems, computer system 104 may provide the user with a wager opportunity. For example, computer system 104 may provide a congratulatory message with an opportunity to place a wager. The opportunity may be direct (e.g., "place a wager now") or may be indirect (e.g., "match four gems to place a wager"). In an implementation, depending on user preferences, an in-game action may automatically trigger a wager, either directly or as the result of an automatic token acquisition. For example, when a user matches four or more gems, a wager may be placed automatically on behalf of the user.

Computer system 104 may determine one or more wager parameters (e.g., amount, type, wager event, etc.), whether placed based on an accomplished objective or automatically placed, based on an input from the user (e.g., a user specifying the amount), one or more wager rules, a user profile, and/or other parameter described herein used to select wagers.

In an implementation, computer system 104 may associate a wager opportunity with a previous wager. For example, computer system 104 may present a Solitaire game (or other interactive media) to the user that requires five dollars to play (or otherwise access). Upon selection of the Solitaire game and payment of five dollars from the user (e.g., using one or more tokens valued at five dollars), computer system 104 may place a first wager in the amount of five dollars and initiate the Solitaire game (either soon after payment or delayed until the outcome of the first wager is known). The outcome of the first wager may be obtained and revealed as described herein.

While playing the Solitaire game, a "Joker" or other card may be revealed that triggers a wager opportunity that, if accepted by the user, causes computer system 104 to place a second wager, either directly or via a token acquisition, the outcome of which may be obtained and revealed as described herein. Computer system 104 may provide the wager opportunity in association with the first wager. For example, computer system 104 may invite the user to "double down" by paying an additional five dollars (or other amount) to increase the potential payout of the Solitaire game (but also increase the potential loss). Upon receipt of payment of the additional five dollars, computer system 104 may place the second wager.

Alternatively, if a wager event (e.g., a horse race) associated with the first wager is still available to be wagered upon, computer system 104 may increase the amount of the first wager and/or place another wager on the wager event. In the reserve wagering context, system 104 can similarly utilize a second reserve wager related to a first reserve wager associated with the first wager. In this manner, by paying five dollars to play the Solitaire game, the user causes computer system 104 to make a wager in the amount of five dollars. By "doubling down" based on an in-game action, the user causes computer system 104 to double down on the wager by adding an additional amount to the wager and/or making a second wager.

In an implementation, computer system 104 may trigger a wager opportunity based on a pattern of interaction with a given interactive media. For example, computer system 104 may determine that a user tends to play a game for longer periods of time during the weekend than the weekday. When the user plays the game during the weekday, computer system 104 may trigger a wager opportunity to enhance an entertainment value of the game during the weekday. Computer system 104 may trigger wager opportunities based on such patterns differently for different interactive media. For example, a given game may prefer to provide a wager opportunity when the user is not typically engaged with the game as determined from the pattern of interaction (to incent the user to be more engaged), whereas another game may prefer to reward the user with a wager opportunity when the user is engaged with the game.

In an implementation, computer system 104 may trigger a wager opportunity based on a lack of interaction with a given interactive media for a threshold period of time. For example, if a user has not played a given game, streamed a video, etc., within the last two weeks, computer system 104 may provide the user with a wager opportunity the next time that the user plays the given game, streams a video, etc.

In an implementation, computer system 104 may trigger a wager opportunity based on a level of completion of interactive media being provided to the user. For example, computer system 104 may trigger a wager opportunity when gameplay of a user is within a predetermined number of objectives of completing a level and/or a game, when an amount of remaining content of media content (e.g., video, audio, etc.) is below a predetermined threshold, and/or when interactive media is otherwise imminent to end.

In an implementation, computer system 104 may trigger a wager opportunity based on leaderboard positions, movement of positions of the leaderboard, and/or other information related to a leaderboard. For example, computer system 104 may reward a user that is at the top (or a predetermined number of rankings from the top) of a leaderboard with a wager opportunity, and/or may incent others to remain engaged by providing a wager opportunity.

Wager Triggers Based on External Information

In an implementation, computer system 104 may trigger a wager opportunity based on external information. The external information may include, without limitation, social profile information, location information, partner-provided information, content consumption information, timing information, and/or other information that may be used to trigger a wager opportunity.

In an implementation, computer system 104 may trigger a wager opportunity based on social profile information, which may include, without limitation, birthdays, status updates, location check-ins, gameplay rankings relative to connected friends, and/or other information that can be gleaned from a user's social profile. In this manner, computer system 104 may congratulate a user in relation to the social profile information (e.g., wishing the user a happy birthday) or otherwise provide a wager opportunity to the user based on the social profile information.

In an implementation, computer system 104 may trigger a wager opportunity based on location information, which may indicate a location of the user. Computer system 104 may obtain the location information via a user's mobile device (for which identifying information may have been obtained during user enrollment), a social media check-in, and/or other location technique.

For example and without limitation, computer system 104 may identify a partner promotions provider 170 based on the proximity of the user to a retail location of the partner promotions provider 170. Computer system 104 may trigger a wager opportunity that relates to partner promotions provider 170. For example, computer system 104 may incent the user to purchase a promoted item from partner promotions provider 170 for a chance to win ten dollars.

In another example, computer system 104 may present a wager opportunity based on the location of the user within a jurisdiction that allows certain types of real-world wagers to be placed. If the user is detected to be within the jurisdiction, a wager opportunity may be provided to the user.

In an implementation, computer system 104 may trigger a wager opportunity based on partner-provided information, which may include, without limitation, customer purchasing patterns, loyalty programs, and/or other information provided by a partner promotions provider 170. The computer system 104 may use the partner-provided information to customize wager opportunities for the user. For example, based on the purchasing patterns of the user, computer system 104 may determine that certain wagering opportunities are more relevant to the user than other wagering opportunities. Such patterns may be discerned based on an analysis of other users' purchase patterns in relation to wagering opportunities that were accepted by those users.

In an implementation, computer system 104 may trigger a wager opportunity based on content consumption information. For example, computer system 104 may determine that a user is watching a particular episode of a particular show using a third party media provider 160. In an implementation, the wager opportunity may relate to the episode (e.g., wager on an outcome of the episode) and/or the third party media provider that is providing the episode for viewing (e.g., a reward may include a free month of service from the third party media provider—which may or may not be paid for using an outcome of a real-world wager).

In an implementation, computer system 104 may trigger a wager opportunity based on timing information, which may include, without limitation, a date/time that the user is accessing interactive media. In a particular example, if a user is playing a game at a particular time (e.g., late night), a special wagering opportunity associated with that time may be provided to the user. The special wagering opportunity, in an implementation, may be available only for users playing a game or interacting with other media during the particular time. The special wagering opportunity may provide a benefit (e.g., a guaranteed bonus item and/or other guaranteed value) that is not available with other wagering opportunities.

Reveals Based on Multiplayer Interaction

In an implementation, computer system 104 may trigger reveals based on multiplayer interactions, such as, for example, a player-versus-player ("PvP") interaction, a tournament interaction, a massively multiplayer online ("MMO") interaction, and/or other types of multiplayer interactions. Regardless of the type of multiplayer interaction, computer system 104 may manage reveals based on an individual user's unrevealed payout amount (e.g., each user's tracking account). For example, for a given user, computer system 104 may use the amount in the given user's unrevealed account 1450 to set the maximum amount that a user will be allowed to "win" from a multiplayer interaction. If a given user has a ten dollar unrevealed balance in a unrevealed account 1450, then a maximum amount the user will be able to appear to win may be ten dollars. Similarly, the given user may be limited to a cumulative virtual wager of no more than ten dollars so that the user cannot appear to win more than ten dollars from an opponent.

Regardless of the type of multiplayer interaction, computer system 104 may provide a game in which two users play against one another. Such games can include, for example, card games (e.g., poker), puzzle games, shooter games, and/or other games in which two players may be compete against one another. A first player may appear to win a payout and a second player may appear to lose a payout (e.g., apparently resulting from the competition). In fact, the "won" payout may be transferred from the first player's unrevealed account 1450 to the first player's revealed account 1440 and the "lost" payout may be added to the second user's unrevealed account 1450 and deducted from the second user's revealed account 1440. In this manner, the first user is given the impression of having won the payout (e.g., taken the payout from the second user) and the second user is given the impression of having lost the payout (e.g., to the first player) even though the second player really hasn't lost the payout. Later, the "lost" payout will be revealed to the second user during another reveal opportunity in order to transfer back the lost payout from the second user's unrevealed account 1450 to the second user's revealed account 1440. {ADD}.

Other types of multiplayer games (including two or more players) other than head-to-head may use similar mechanics to drive apparent wins and losses between players.

Wager Triggers Based on Promotions

In an implementation, computer system 104 may trigger a wager opportunity based on a promotion from partner promotions provider 170. For example, partner promotions provider 170 may provide an advertisement (e.g., an online or mobile advertisement) to be displayed to the user. The advertisement may be wager-enabled such that computer system 104 triggers a wager opportunity when the user interacts with the advertisement. For example and without limitation, the advertisement may include a mini-game that when played causes a wager opportunity to be triggered (which may relate to the mini-game and/or other interactive media as described herein), a call-to-action (e.g., a clickable link, a fillable form field, etc.) that when responded to by the user triggers the wager opportunity, and/or other content that when interacted with triggers a wager opportunity.

It should be understood that the advertisement may (but need not) be served by computer system 104. For example, computer system 104 may serve advertisement to the user while the user is interacting with a wagering interface or interactive media provided by computer system 104. In other examples, computer system 104 may provide the advertisement to third party interactive media providers 160 that display the advertisement on their own games (for example). In yet other examples, computer system 104 may provide the advertisement to website operators that distribute the advertisement on their own websites or other media.

When the advertisement is provided to third party interactive media providers 160 or others, computer system 104 may embed a link or other call-back to computer system 104 such that computer system 104 may immediately trigger a wager opportunity to the user (e.g., via a popup window) responsive to user interaction with the advertisement and/or log the interaction with the advertisement such that the user is provided with a wager opportunity related to the advertisement the next time that the user logs onto computer system 104. For example, the advertisement may include a link that points to a Uniform Resource Locator ("URL") associated with computer system 104. The link may cause a separate browser window to be opened that includes a user interface provided by computer system 104. The link may include user identification information that identifies the user and/or the user interface may prompt the user to login to computer system 104. The user interface may present a wager opportunity to the user upon identification and/or authentication of the user.

In an implementation, the wager opportunity may be related to the advertisement. For example, the advertisement may promote an online item that if purchased qualifies the user to win a reward, a winner of which may be randomly selected from a pool of users that purchased the item.

Reveal Categories

In an implementation, computer system 104 may reveal an outcome of a real-world wager. The real-world wager may have been initiated and selected as described herein, including by using the reserve wager functionality. Computer system 104 may obtain an outcome of the real-world wager and update an unrevealed account 1450 of a user. The unrevealed account 1450 may store an indication of the outcome (e.g., an amount of a payout or a loss). Computer system 104 may select an appropriate time and/or interactive media to reveal the outcome of the real-world wager through user interactions with interactive media so that the user may perceive that the outcome resulted from the user interactions.

For example, a payout in the amount of ten dollars may have resulted from a real-world wager that was placed by computer system 104 on behalf of the user, or by using the reserve wager functionality. An unrevealed account 1450 of a user may be decremented by ten dollars (incrementally or in one step), and the revealed account 1440 may be incremented by ten dollars in a corresponding manner, until the ten dollar payout has been revealed to the user. The reveal may occur in various ways.

In an implementation, computer system 104 may reveal an outcome of a single real-world wager through a single reveal. For example, a payout may be revealed based on an occurrence of a single event such as, without limitation, turning over a specific card, opening a chest in a game to reveal the payout, matching three gems in a match-three game, having viewed a video at a particular time (e.g., having viewed the video until the three minute mark), and/or other single events that can occur in interactive media. In each of the foregoing examples, the payout from the real-world wager may appear to the user to have resulted from the event (e.g., turning over the specific card), when, in fact, the payout resulted from winning the real-world wager.

In an implementation, computer system 104 may reveal an outcome of a single real-world wager through multiple reveals. For example, a payout may be revealed through several different events in interactive media. The payout may be split into increments and revealed over several events that can occur in interactive media (such as those described above with respect to single events). Each of the increments may be the same value as other increments (e.g., five two dollar payouts to reveal a ten dollar payout) or different value (e.g., a one dollar payout and a nine dollar payout to reveal a ten dollar payout).

In some instances, each increment may be separately revealed/"won." For example, turning over a particular card will reveal two of a ten dollar payout. In other instances, all of the increments may be revealed in an all-or-none fashion such that all events is required before the total payout. For example, the user may be required to perform five tasks in order to have the ten dollar reveal provided such that the failure of either one of the five tasks will not result in a reveal of the ten dollar payout. In the foregoing example, the ten dollar payout may not be revealed and may be maintained in the user's unrevealed account 1450.

Escalating Reveals

In an implementation, computer system 104 may reveal a single outcome using a reveal staircase, in which the outcome is split into different increments each having a different value. In an implementation, the different increments may be revealed randomly or in order of their value. For example, a ten dollar payout may be revealed using four fifty cent reveals, three one dollar reveals, one two dollar reveal, and one three dollar reveal. Each of the foregoing increments may be revealed randomly or in a manner that increases (or decreases). In a particular example, as a user progresses to higher game levels, the four fifty cent reveals may occur before the three one dollar reveals, and so forth. In this manner, as the game progresses to higher levels (or a video is played longer), an amount of the payout that is revealed may increase.

In another example, a series of reveals may escalate in value as user interaction with the interactive media progresses. For example, an escalating reveal may build from zero dollars to the total payout during gameplay, such as in a racing game where the user's winnings escalate as long as they stay ahead of their opponent. Other types of escalating reveals may be used as well, such as increasing winnings as new game levels are achieved.

In an implementation, computer system 104 may reveal an outcome using bracketed reveals. reveals of different values may be locked into a specific escalating platform. For example, a reveal of a ten dollar payout (from a real-world wager) may be structured as following: "beat one enemy:

win one dollar, beat two enemies: win four dollars, beat three enemies: win ten dollars." In the foregoing example, if the user beats only one enemy then only one dollar will be revealed and obtained by the user (e.g., credited to the user's revealed account 1440 and the remaining nine dollars of the ten dollar payout may be retained in the unrevealed account 1450). If the user beats three enemies, then the entire ten dollar payout may be revealed and obtained (e.g., ten dollars credited to the user's revealed account 1440 and decremented from the unrevealed account 1450). The escalating platform need not be consecutively numbered. For example, the reveal may be structured as: "beat one enemy: win one dollar, beat three enemies: win four dollars, beat five enemies: win ten dollars." Other types of bracketed reveals may be used in other contexts as well (e.g., "view one video win one dollar, view two videos win three dollars," and so on).

Reveal Categories—Initial Reveal/Skill-Based Player Action Required to Claim

In an implementation, computer system 104 may reveal an outcome of a real-world wager through a skill-based action that is required to claim a value of the reveal. For example, a user may be required to perform a skill-based action in order to claim the ten dollar payout. The skill-based action may include, without limitation, as hitting a target, defeating an enemy, winning a race, and/or other action that is not completely dependent on chance for the user to win. If the user fails to perform the skill-based action, the payout may not be provided to the user (e.g., not added to the user's revealed account 1440, but instead maintained in the user's unrevealed account 1450). In an implementation, the reveal associated with a skill-based action may include only payouts such that the user is guaranteed to be able to claim a payout upon successful completion of the skill-based action.

Reveal Categories—Reveal Abeyance

In an implementation, computer system 104 may withhold a payout if one or more reveal parameters are not satisfied. A reveal parameter may specify that a minimum level of performance of an objective must be achieved for a reveal to occur. The objective may include any objective described herein, including, for example, an amount of winnings in a game, a number of points in a game, a number of enemies defeated in a game, a length of a video viewed, a number of promotions redeemed, a number of advertisements viewed, etc.

If the minimum level of performance is achieved, then the user may be revealed at least a portion of the payout. On the other hand, if the minimum level of performance is not achieved, then no portion of the payout will be revealed. If no portion of the payout is revealed, then the unrevealed portion will remain in the user's unrevealed account 1450. The unrevealed balance may be used to maintain a value of payouts that have not yet been revealed to the user (and, when revealed, appears to the user that the user has won the revealed payout). In this manner, computer system 104 may reveal at least a portion of the payout depending on whether a minimum threshold of performance (which may be predefined for an individual game or other interactive media) is achieved.

For example, a user's winnings in a game must exceed a threshold percentage (e.g., twenty-five percent) of an initial virtual wager or else an entire value of the reveal will be lost. For example, if a user uses a one dollar token to play a game, then the user's winnings in the game must exceed twenty five cents or else an entire value of the reveal will be lost. The value of the reveal may be a payout of a real-world wager that was placed by computer system 104 in association with the one dollar token that the user used to play the game. If the user's winnings in the game do not exceed twenty five cents (or equivalent value) in the foregoing example, then the entire reveal is lost and the payout will be retained in the unrevealed balance. In an implementation, if the user's winnings exceed a threshold percentage of an original wager, then at least a portion of the winnings may be held over in abeyance. For example, if a user's winnings exceed 200 percent of an original wager, then 25 percent of the winnings may be held over.

Reveal Categories—Unreveals

In an implementation, computer system 104 reveal a payout, and then "unreveal" the payout (i.e., take the payout away). Such reveal and unreveal may be based on user interactions with interactive media. For example, upon completion of an objective, a payout may be revealed to the user. Upon a subsequent event (which may or may not relate to the objective), the payout may be unrevealed. In a particular example, in a capture-the-flag-style game, in which a user must grab an opponent's flag and return the flag to their own home base, the user may grab an opponent flag in the game, at which point computer system 104 causes a reveal of a ten dollar payout (which actually resulted from a real-world wager). The user may be given the impression that grabbing the opponent flag led to the ten dollar payout.

While returning back to the user's home base, another player may recapture the flag, resulting in the payout being unrevealed. Had the user successfully returned the flag to the home base, the payout would have been claimed such that the payout is credited to the actual user account (and decremented from the tracking account). Instead, because the flag was not returned to the home base, the payout is unrevealed and remains in the tracking account, giving the user an impression that the ten dollar payout was gained and then lost. In reality, the ten dollar payout remains in the tracking account for another reveal opportunity. In an implementation, all or a portion of the revealed payout may be unrevealed as described herein.

In an implementation possession of the payout may be graphically represented. For example, if the user grabs the flag, then a graphical representation of a bag of cash may be displayed in the game and apparently carried by the user's game character. When an unreveal occurs, then the bag of cash may be removed from the game character's possession (e.g., appear to be carried by the opposing player).

Reveal Categories—Mirage Reveals

In an implementation, computer system 104 may provide mirage reveals that give an appearance to the user that an objective may be achieved to obtain a reward. However, the objective may not be achievable, thereby guaranteeing a loss. For example, if a user uses a one dollar token to play a game and the token is associated with a real-world wager that had a losing outcome, then computer system 104 may present an objective to the user that, if attempted and accomplished results in a payout, but if attempted and failed results in a loss. In this manner, the user is given an impression that the payout is achievable, when, in fact, the objective is guaranteed to fail, thereby providing a mirage reveal of a payout (that doesn't exist).

In an implementation, the objective associated with the mirage reveal may appear to be a skill-based challenge such that a user is given the impression that skillful attempts at the objective would lead to a payout. In this implementation, computer system 104 may skew a user's input to lead to failure (e.g., adjust a user input that is on-target to one that is off-target), ignore a user's input, provide an objective that is impossible to complete, and/or otherwise cause an attempt to complete the objective to fail.

In an implementation, the objective associated with the mirage reveal may appear to be a random event. For example, the objective may be to spin a virtual wheel, roll virtual dice, guess a number that is to randomly selected, and/or other random event. In this manner, the user may be given the impression that a randomly generated event may lead to a win, when, in fact, the event is not random and is guaranteed to fail.

Other types of objectives that appear to be achievable but be controlled to be guaranteed to fail may be used for mirage reveals as well.

Reveal Categories

In an implementation, computer system 104 may provide guaranteed reveals that may guarantee a payout. For example, computer system 104 may inform the user that the user will have a guaranteed win if the user plays a game (e.g., selects and plays a game), attempts a next level (e.g., attempts a new race in a racing game). The guaranteed win amount may be set as a function of an initial virtual wager. For example, computer system 104 may determine a payout for a given interactive media based on its cost of entry, such as a particular value of a token required to play a game. Computer system 104 may adjust the cost of entry to arrive at the guaranteed win. Such adjustments may include a multiplier, a percentage, and/or other adjustment that may be made to a value. For example, if the adjustment is twenty-five percent and the cost to play a game is two dollar token, then the guaranteed win may be fifty cents or equivalent value (e.g., value in other tokens, credits, in-game items, etc.).

In an implementation, computer system 104 may provide reveals that are tied to promotions from partner promotions provider 170. For example, computer system 104 may provide the user with an opportunity to play a game that costs two dollars. Upon achieving some objective in the game, the user may win (or appear to win) more than two dollars, which may be deducted from the user's tracking account and added to the user's actual user account. Upon failing the objective, the user may be provided with a coupon in the amount of two dollars (or other amount) that can be redeemed for a real purchase from partner promotions provider 170. In this manner, the user may be presented with a win-win type of virtual wager and reveal, while partner promotions provider 170 may provide promotions via computer system 104.

No Wager Reveals

In an implementation, computer system 104 may provide mock reveals that are not driven by wagering mechanics. For example, computer system 104 may provide reveals that are tied to promotions provided by partner promotions provider 170, virtual items (e.g., certain in-game items) that computer system 104 is promoting to sold, and/or other item that is not tied to a real-world wager or a virtual wager. Computer system 104 may provide such mock reveals to facilitate promotional campaigns, retain users, and/or otherwise make the gaming experience more enjoyable for the user. The mock reveals may be triggered by user interactions with interactive media (e.g., in-game action such as a user finding a rare item in a game), events that occur in interactive media without user intervention (e.g., actions of other players, AI players, etc.), and/or other events that may be used to provide mock reveals.

Reveal Categories—Timed Reveals/Reveal Decay

In an implementation, computer system 104 may provide a time-conditioned reveal such that a certain action must be performed to claim a potential payout. For example, computer system 104 may reveal a potential payout of ten dollars (e.g., through one or more reveal mechanisms described herein), subject to the user action to claim the payout. In a particular example, a user may have accomplished a first task to win a potential payout. Computer system 104 may inform the user that an action such as crossing a finish line in a race, completing a puzzle, beat an opponent in a virtual fight, etc., must be accomplished to claim the payout. If the user performs the action, then the payout is claimed in time and computer system 104 transfers the payout amount from the user's unrevealed account 1450 to the user's revealed account 1440. If the user does not perform the action, then the payout is not claimed in time (and in effect expires) and computer system 104 retains the payout amount in the user's unrevealed account 1450, giving an appearance that the user won but failed to claim the payout.

In an implementation, computer system 104 may provide a reveal decay. As with the time-conditioned reveal, computer system 104 may reveal a potential payout such as ten dollars, subject to the user action to claim the payout. The user may be given an opportunity to complete an action such that the longer it takes to complete the action, the payout amount decreases to zero. The rate of decay of the payout (e.g., payout decreases as the time it takes the user to complete the action) may be predefined, based on the amount of the payout (e.g., faster decay for larger payouts than for smaller payouts), based on the amount of the initial virtual or real-world wager, based on the nature/difficulty of the action, and/or other information that can be used to adjust the rate of decay. Any amount of the payout that is decayed (e.g., not claimed) may be retained in the user's unrevealed account 1450 and any amount of the payout that is claimed may be transferred from the user's unrevealed account 1450 to the user's revealed account 1440.

Invitations

In an implementation, computer system 104 may provide an invitation to participate in a reveal opportunity. For example, if a user's unrevealed account 1450 has a value associated with one or more payouts (e.g., ten dollars resulting from one or more payouts of one or more real-world wagers) that have not yet been revealed, computer system 104 may invite the user to participate in one or more reveal opportunities to claim a portion or all of the one or more payouts. For example, computer system 104 may invite the user to play a specific game (e.g., "play this game to claim five dollars"), interact with other interactive media (e.g., "watch a video to win ten dollars"), face off against one or more other players (e.g., "challenge another player to win two dollars"), engage in some other objective, and/or otherwise accept an opportunity to reveal at least a portion of a payout that has not yet been revealed.

Acceptance of the invitation by the user may guarantee the reveal (e.g., allow the user to claim the payout associated with the reveal such that the payout amount is transferred from the user's unrevealed account 1450 to the user's revealed account 1440) and/or be conditioned upon achieving an objective related to the reveal. For example, computer system 104 may provide the reveal to the user upon acceptance (e.g., playing a game or watching a video) and/or may determine whether an objective has been accomplished by the user (e.g., win a level in a played game or watch a video for a certain period of time) before providing the reveal.

In an implementation, the user may be invited to challenge another player in a player-versus-player mode or other competitive mode in which two or more players compete against one another. The winner may be provided with a reveal of a payout from each of their respective unrevealed accounts 1450. The winner may appear to have gained a payout from beating the loser, when, in fact, the payout resulted from a real-world wager. The loser may have appeared to lost an opportunity to win the payout, when, in fact, the payout remains unrevealed (and retained in the loser's unrevealed account 1450).

In an implementation, computer system 104 may invite the challenged player to accept the challenge from the user. If the challenged player has a positive balance in his/her unrevealed account 1450, then computer system 104 may reveal a payout associated with the challenged player if the challenged player accepts the challenge (e.g., computer system 104 may communicate to the challenged player "accept the challenge and win two dollars"). The two dollar reward may appear to have resulted from the accepted challenge, when, in fact, the two dollar reward is a portion or all of a payout that resulted from a real-world wager placed on behalf of the challenged player.

In an implementation, computer system 104 may impose an apparent penalty on the challenged player if the challenge is not accepted. For example, computer system 104 may deduct an amount from the challenged player's revealed account 1440, but add the deducted amount to the challenged player's unrevealed account 1450. In this manner, the challenged player may appear to be penalized if the challenge is not accepted. Upon acceptance of the challenge by the challenged player, computer system 104 may provide the challenged player with a reveal of a payout if the challenge is won by the challenged player.

In an implementation, upon reveal of a payout, computer system 104 may present a related reveal opportunity. For example, if a user completes an objective related to a first reveal and claims a first payout, the user may be presented with an opportunity to double the first payout or take nothing in a "double or nothing" manner. For example, the user may appear to have won five dollars based on an in-game action (when in fact the five dollars resulted from a real-world wager). Computer system 104 may offer the user a double or nothing opportunity related to a second opportunity that, if accepted (and, in some cases, requirements of the opportunity—e.g., win a level—completed), may result in an additional five dollar win. On the other hand, if the user accepts and fails any objective related to the second opportunity, computer system 104 may remove the first payout (and retain the first payout in the unrevealed account 1450 or transfer back the first payout to the unrevealed account 1450).

In an implementation, such double or nothing opportunities may be predicated on the user having sufficient value in his/her unrevealed account 1450. For example, in the foregoing five dollar double or nothing opportunity, the unrevealed account 1450 associated with the user may be required to have ten or more dollars of value. In an implementation, if the user does not have sufficient funds to cover a double or nothing win (e.g., has eight dollars in the unrevealed account 1450), then the user may still be offered the double or nothing opportunity, but be guaranteed to lose the double or nothing opportunity (because the user's unrevealed account 1450 value of eight dollars would not cover a ten dollar reveal).

In an implementation, computer system 104 may provide an invitation to participate in a reveal opportunity based on external triggers such as, for example, content, geolocational data, player behavior, partner promotions, and/or other types of reveal triggers described herein.

Data Driven Reveal

In an implementation, computer system 104 may determine an amount of the reveal based on various factors such as, without limitation, total available winnings in a user's unrevealed account 1450, player lifetime handle, player gameplay patterns, percentage of available winnings versus an initiating wager, current position (e.g., rank, score, etc.) on estimated player lifetime, game being played, etc. reveals may be designed using all available data related to the user to craft the best possible experience for the user.

For example, computer system 104 may provide all or a portion of the available winnings in a user's unrevealed account 1450 using a single reveal based on any of the foregoing data. In particular, to incent a user who has not accessed the game platform of computer system 104 within the last two weeks, the user may be presented with an opportunity to reveal all of the winnings available in that user's unrevealed account 1450. In this manner, a user whose interest in the gaming platform may be waning may be presented with the largest possible payout for that user to provide more excitement for the user.

Brutal Reveal

In an implementation, computer system 104 may reveal a payout as a cash reward (e.g., "defeat an enemy in a game and win two dollars"), an in-game reward (e.g., "defeat an enemy in a game and win a thermite bomb"), a multimedia reward (e.g., "defeat an enemy in a game and win two music downloads"), and/or other value. The revealed item may have a value that is equivalent to the payout amount. For example, the thermite bomb may ordinarily be purchased for two dollars. Alternatively, the revealed item may have a value that is higher than the payout amount, even though only the payout amount is used to acquire the item. For example, two music downloads may ordinarily be purchased for more than two dollars, but a payout in the amount of two dollars (an amount of a payout) may be used to pay for the two music downloads. In other words, a two dollar payout may be decremented from the user's unrevealed account 1450 and the two dollar payout may be used to pay for the item.

When an item other than cash is revealed as a payout, computer system 104 may select the item to be revealed based on a random selection from among a pool of items, a promotion related to the item (e.g., virtual items that may be "on sale" for a given game), a gameplay history of the user (e.g., an item that the user has paid for or otherwise may be interested in), a strategic item that may be useful based on current gameplay (e.g., particular type of virtual weapon to be used against an opponent during a current battle, a particular hint during a word game, etc.), a cosmetic item designed to distract an opponent (e.g., a high-pitched dancing marmoset that will cavort on screen during an opponent's turn to annoy the opponent), a temporary action on a user's profile (e.g., defacing a profile picture), and/or other information that may be used to select an item to offer as a reveal of a payout.

In an implementation, computer system 104 may provide a selectable list of items to claim as a payout, including a cash payout and one or more of the items other than cash described in the foregoing examples. Computer system 104 may select items to include in the selectable list as described with respect to selecting an item to reveal. For example, the items on the selectable list may be included based on a random selection, gameplay history, strategic items based on current gameplay, cosmetic items, a temporary action, and/or other information. In this manner, the user may select from among different payout options.

In the foregoing implementations and examples, by providing items other than cash as a payout option, computer system 104 may promote those items for "sale" that may be accepted by the user in lieu of an actual cash payout. If a given item is accepted as a payout instead of cash, computer system 104 may deduct the cash value of the payout from the user's unrevealed account 1450 and retain the cash value as payment for the item (as if the user had purchased the item with real currency).

Win-Win Reveals

In an implementation, computer system 104 may enhance a perceived value of a payout by providing one or more companion items. For example, computer system 104 may augment a two dollar payout with one or more companion items as a bonus. Such companion prizes may include, without limitation, virtual currency, virtual items, in-game power-ups, new content, sponsored partner prizes such as gift cards or discounts, etc. The bonus may be communicated to the user before a virtual wager. For example, computer system 104 may invite the user to attempt an objective for a chance to win two dollars and an in-game item (or a multimedia download, etc.). On the other hand, the bonus may be made a surprise. For example, computer system 104 may invite the user to attempt an objective for a chance to win two dollars. Upon completion of the objective, computer system 104 may communicate a congratulatory message that the user has won two dollars and a bonus item. In an implementation, the bonus may include a cash bonus that is awarded to the user as a surprise. In this implementation, the user's tracking account must be able to cover the original payout and the bonus amount.

In an implementation, computer system 104 may provide a consolation item in the event that a user fails to complete an objective. The consolation item may include, without limitation, virtual currency, virtual items, in-game power-ups, new content, sponsored partner prizes such as gift cards or discounts, etc.

Computer system 104 may select a bonus item and/or a consolation item as described with respect to selecting an item to reveal. For example, the bonus item and/or the consolation item may be selected based on a random selection, gameplay history, strategic items based on current gameplay, cosmetic items, a temporary action, and/or other information.

Geolocation Reveals

In an implementation, computer system 104 may determine a user's physical location and provide custom reveal opportunities and/or reveals based on the user's physical location. Computer system 104 may determine the physical location based on location information from a user's device (e.g., GPS information), a social check-in, and/or other location techniques. The reveal opportunity and/or reveal may be made before, during, and/or after user interaction with interactive media.

Computer system 104 may associate certain reveal locations (e.g., a city, a zip code, a particular retailer, etc.) with a reveal trigger such that when a user enters, is determined to be at, and/or leaves a reveal location (as determined from the user's physical location), a reveal opportunity may be presented to the user. For example, computer system 104 may invite the user to make a purchase at a nearby partner retailer for a chance to win a payout or be guaranteed to win a payout. In another example, computer system 104 may provide an opportunity to win or otherwise obtain a particular payout (e.g., via cash, item, etc.) when a user enters a particular city.

Likewise, computer system 104 may associate certain reveal locations (e.g., a city, a zip code, a particular retailer, etc.) with a reveal item such that when a user enters, is determined to be at, and/or leaves a reveal location (as determined from the user's physical location), a reveal item may be revealed to the user. For example, computer system 104 may reveal a particular in-game item (which may have a cash value of a payout that resulted from a real-world wager) when the user is at certain physical locations. Alternatively or additionally, computer system 104 may reveal certain cash amounts based on a user's location. For example, a first location may be associated with a reveal of a first amount of cash winnings while a second location may be associated with a reveal of a second amount of cash winnings. In this manner, computer system 104 may provide reveals that are specific to a given location.

Monetization Methods

In an implementation, an operator of computer system 104 may monetize the interactive media and wagering platform described herein and maintain a system account to obtain the funds from various entities, such as users, third party interactive media provider(s) 160, partner promotions provider(s) 170, and/or others.

In an implementation, an operator of computer system 104 may monetize the interactive media and wagering platform described herein by collecting fees related to the sale/use of tokens. The fees may be fixed or be a percentage of a token's value. For example, the operator of computer system 104 may collect a certain percentage of value of a token when the token is purchased and/or used by a user. In another implementation, an operator of computer system 104 may monetize the use or reserve wagering. The fees may be fixed or be a percentage of a token's value or wager amount.

In an implementation, an operator of computer system 104 may monetize the interactive media and wagering platform described herein by collecting fees in relation to use of interactive media. For example, an operator of computer system 104 may collect all or a portion of in-game item sales based on games developed in-house and/or by third party interactive media provider(s) 160. When a user purchases an in-game item using a token (which may be associated with a payout amount from a real-world wager), for example, the operator of computer system 104 may collect the entire purchase price (e.g., if the game is developed in-house) or at least a fixed fee or a percentage of the purchase price from third party interactive media provider(s) 160, such as a third party game publisher.

In an implementation, an operator of computer system 104 may monetize the interactive media and wagering platform described herein by collecting fees from a third party interactive media provider 160 each time that a game or other interactive media provided by the third party interactive media provider 160 is promoted to users. For example, computer system 104 may agree to incentivize a user to play a game from third party interactive media provider 160, in exchange for a fee from third party interactive media provider 160.

In an implementation, an operator of computer system 104 may agree to provide larger or more frequent reveals for certain games than others in exchange for a fee from third party interactive media provider 160. For example, a user who has a large unrevealed payout (resulting from a real-world wager) may be steered to play a given game provided by third party interactive media provider 160. In another example, computer system 104 may provide reveals with a greater frequency in a given game than for other games. By doing so, upon reveal of the large payout or frequent payouts to the user playing the given game, the user may associate the payouts with the given game itself, increasing the game's goodwill with respect to that user. In exchange for such favorable reveals directed to the game, the operator of computer system 104 may collect a fee from a publisher of the given game.

In an implementation, an operator of computer system 104 may agree to integrate promotions (e.g., advertisements, promoted content such as games, videos, etc.) in exchange for a fee from partner promotions provider(s) 170. The fee may relate to providing the promotions using the interactive media platform. In an implementation, the fee may relate to providing a reveal in relation to the promotion to incent the user to interact with the promotion. For example, an operator of computer system 104 may charge a fee to partner promotions provider(s) 170 for inviting the user to click an advertisement for a reveal opportunity.

It should be appreciated that although the various instructions are illustrated in FIG. 1 as being co-located within a single computing device 110, one or more instructions may be executed remotely from the other instructions. For example, some computing devices 110 of computer system 104 may be programmed by some instructions while other computing devices 110 may be programmed by other instructions, as would be appreciated. Furthermore, the various instructions described herein are exemplary only. Other configurations and numbers of instructions may be used, so long as the processor(s) 112 are programmed to perform the functions described herein.

Other monetization methods may be used as well. Furthermore, for each monetization technique, computer system 104 may be programmed (e.g., by account manager instructions 121) to keep track of credits due to the operator of computer system 104, transfer funds from a payor related to the monetization methods, and/or perform other functions related to monetizing the interactive media and wagering platform provided by computer system 104.

Certain implementations described herein relate to gaming, including online gambling. Certain embodiments described herein enable betting to be performed by a user with respect to one or more events (e.g., wherein the betting results are revealed to the user (optionally in a time delayed manner) based at least in part on the user's game play with respect to an interactive game (e.g., an online interactive electronic game)). By way of example and not limitation, the event may be a sporting event, a lottery, stock market activity, a political race, or other form of risk resolution that provides a return against an amount wagered. The interactive game, by way of example and not limitation, may involve physical coordination, social interaction, problem solving or another activity unrelated to the underlying event being wagered on. Further, the actual selection of events (e.g., races and competitors, stocks, etc.) to wager on may optionally be automatically selected, without requiring the user to perform manual selections. Certain embodiments thereby enable new games to be synthesized from existing games and wagerable events (such as a sporting event). Thus, fun and exciting interactive games may be provided, with cash payouts funded by results from wagers on one or more forms of gambling.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor(s) 112 as well as data that may be manipulated by processor(s) 112. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases 130 described herein may be, include, or interface to, for example, an Oracle™ relational database sold commercially by Oracle Corporation. Other databases, such as Informix™, DB2 (Database 2) or other data storage, including file-based (e.g., comma or tab separated files), or query formats, platforms, or resources such as OLAP (On Line Analytical Processing), SQL (Structured Query Language), a SAN (storage area network), Microsoft Access™, MySQL, PostgreSQL, HSpace, Apache Cassandra, MongoDB, Apache CouchDB™, or others may also be used, incorporated, or accessed. The database may comprise one or more such databases that reside in one or more physical devices and in one or more physical locations. The database may store a plurality of types of data and/or files and associated data or file descriptions, administrative information, or any other data. The database(s) 130 may be stored in storage device 114 and/or other storage that is accessible to computer system 104.

Figure 2:
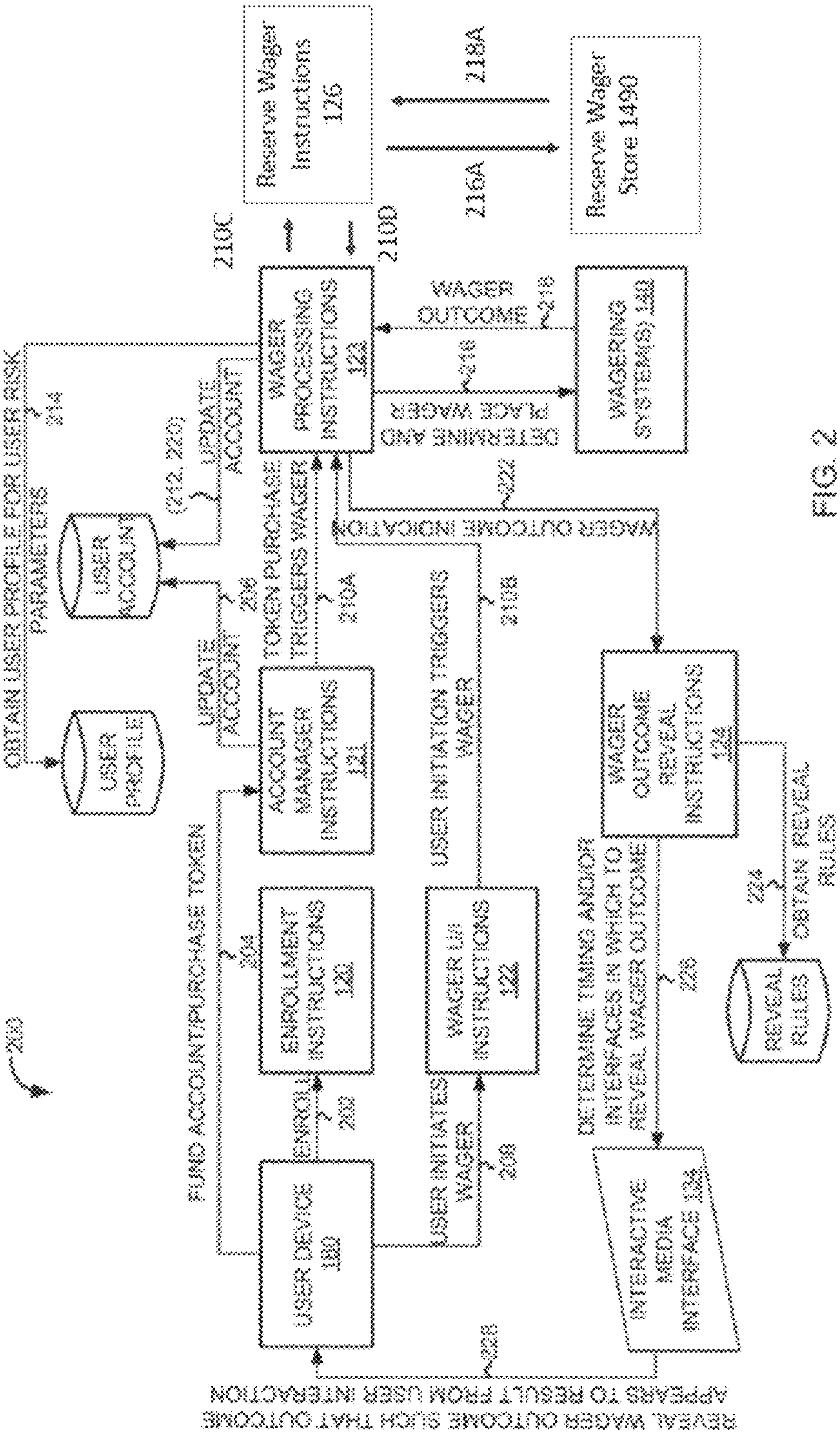
FIG. 2 illustrates a data flow diagram in a system of revealing real-world wager outcomes based on user interactions with interactive media, including by using reserve wagering, according to an implementation of the invention.

FIG. 2 illustrates a data flow diagram in a system of revealing real-world wager outcomes based on user interactions with interactive media, according to an implementation of the invention. The various processing operations and/or data flows depicted in FIG. 2 (and in the other drawing figures such as FIGS. 3-7 and 14) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, enrollment instructions 120 may enroll a user to use the computer system. For example, the user may use user device 180 to provide user information that is used and stored by the computer system to facilitate the functions described herein. Once enrolled, various user accounts 1405, including a profile account 1480, may be established for the user, as shown in FIG. 14. The user profile account 1480 may include risk tolerance information that indicates a level of risk that the user is willing to accept when placing real-world wagers. The user accounts 1405 may also include one or more accounts that indicate a value of tokens, real currency, items, etc. that the user may use.

In an operation 204, account manager instructions 121 may fund an ADW account 1420 based on payment information provided by the user. For example, a user may add an amount of real currency (e.g., cause funds to be transferred from a payment account 1410) to an ADW account 1420, which may be used to purchase one or more tokens, the ownership of which is tracked by token account 1430 for the user. In an operation 206, account manager instructions 121 may update the ADW account 1420 and token account 1430 to reflect the token purchase. Thereafter, either or both are available for use to access one or more of the functions provided by the computer system.

In an operation 208, wager U/I instructions 122 may receive a user specified wager specification that includes parameters to place a real-world wager the user would like to make. The wager specification may include an event, an outcome, an amount to wager, and/or other information used to place one or more real-world wagers.

In an operation 210, wager processing instructions 123 may receive a wager trigger, which causes a wager to be placed. The wager trigger may include a token purchase (illustrated as operation 210A), a user initiation through wager U/I instructions 122 (illustrated as operation 210B), a user interaction with interactive media interface 134 (not illustrated in FIG. 2), and/or other initiation.

Where reserve wagering is not used, in an operation 214, wager processing instructions 123 may access user profile account 1480 associated with the user. The user profile account 1480 may indicate a risk tolerance associated with the user, and/or other wager parameter preferences of the user. In an operation 216, wager processing instructions 123 may determine and place a wager with wagering system(s) 140. For example, wager processing instructions 123 may determine a number of wagers to place, an event on which to place the real-world wager, an outcome of the event, an amount of the real-world wager, and/or other parameter of the real-world wager based on the user profile. Alternatively or additionally, wager processing instructions 123 may use the real-world wager specification specified by the user (if any). In either case, in an operation 212, wager processing instructions 123 may update the user account based on the amount of the real-world wager.

In an operation 218, an outcome of the real-world wager may be received. For example, wager processing instructions 123 may receive the outcome from wagering system(s) 140 (and/or other source of the outcome of the event on which the wager was placed). In an operation 220, wager processing instructions 123 may update various accounts based on the outcome in the manner discussed herein. For example, a payout may be credited to a user's token account 1430 or, in the context of a delayed reveal function, an unrevealed account 1450.

Where reserve wager functionality has been selected, wager processing instructions 123 may interact with reserve wager instructions 126 (illustrated as operations 210C and 210D) to match and associate a reserve wager from reserve wager store 1490 (illustrated as operation 216A) with the token as described herein and obtain its result (illustrated as operation 218A). The outcome of the associated reserve wager is then passed to wager outcome reveal instructions 124 in operation 222 rather than a real-world wager outcome 218 in the implementation above as described herein. As part of the matching process, in operation 214, wager processing instructions 123 and reserve wager instructions 126 may access user profile account 1480 associated with the user to determine wager parameters and user preferences in the manner discussed herein. In operations 212 and 220, wager processing instructions 123 may update the user accounts, based on the amount of the wager in association with the reserve wager functionality.

In an operation 222, wager processing instructions 123 may provide an indication of the outcome of the real-world wager or associated reserve wager to wager outcome reveal instructions 124. In an operation 224, wager outcome reveal instructions 124 may obtain one or more reveal rules that specify when and/or how the outcome should be revealed to the user. For example, the one or more reveal rules may specify a parameter that indicates a timing of the reveal, what type and/or particular interactive media should be used to reveal the outcome, and/or other parameter that specifies a reveal of the outcome.

In an operation 226, wager outcome reveal instructions 124 may determine a timing and/or interactive media interface to reveal the real-world wager outcome. The timing and/or interactive media interface may be determined based on the one or more reveal rules.

In an operation 228, wager outcome reveal instructions 124 may generate and provide interactive media interface 134, which may include an interface for an interactive game, video, and/or other interactive media content. Interactive media interface 134 may reveal the outcome of the real-world wager. For example, interactive media interface 134 may present an interactive media objective associated with the outcome of the real-world wager. In a particular example, the interactive media objective may include an in-game objective such as, without limitation, hitting a target, completing a game level, watching a video for a predetermined length of time, and/or other objective.

In an implementation, upon successful completion of the objective, a payout of the real-world wager may be revealed such that the user is given the impression that the payout resulted from achieving the interactive media objective when, in fact, the payout resulted from the outcome of the real-world wager, which was determined prior to the successful completion of the objective.

In an implementation, if the real-world wager resulted in a loss, wager outcome reveal instructions 124 may not provide any interactive media interface 134 to the user. In another implementation, wager outcome reveal instructions 124 may provide an interactive media interface 134 that provides an objective that is not achievable (e.g., cannot be successfully completed by the user, which may give the user an impression that the loss resulted from the failure to achieve the objective when, in fact, the loss resulted from the outcome of the real-world wager, which was determined prior to the failure by the user to complete the objective).

Figure 3:
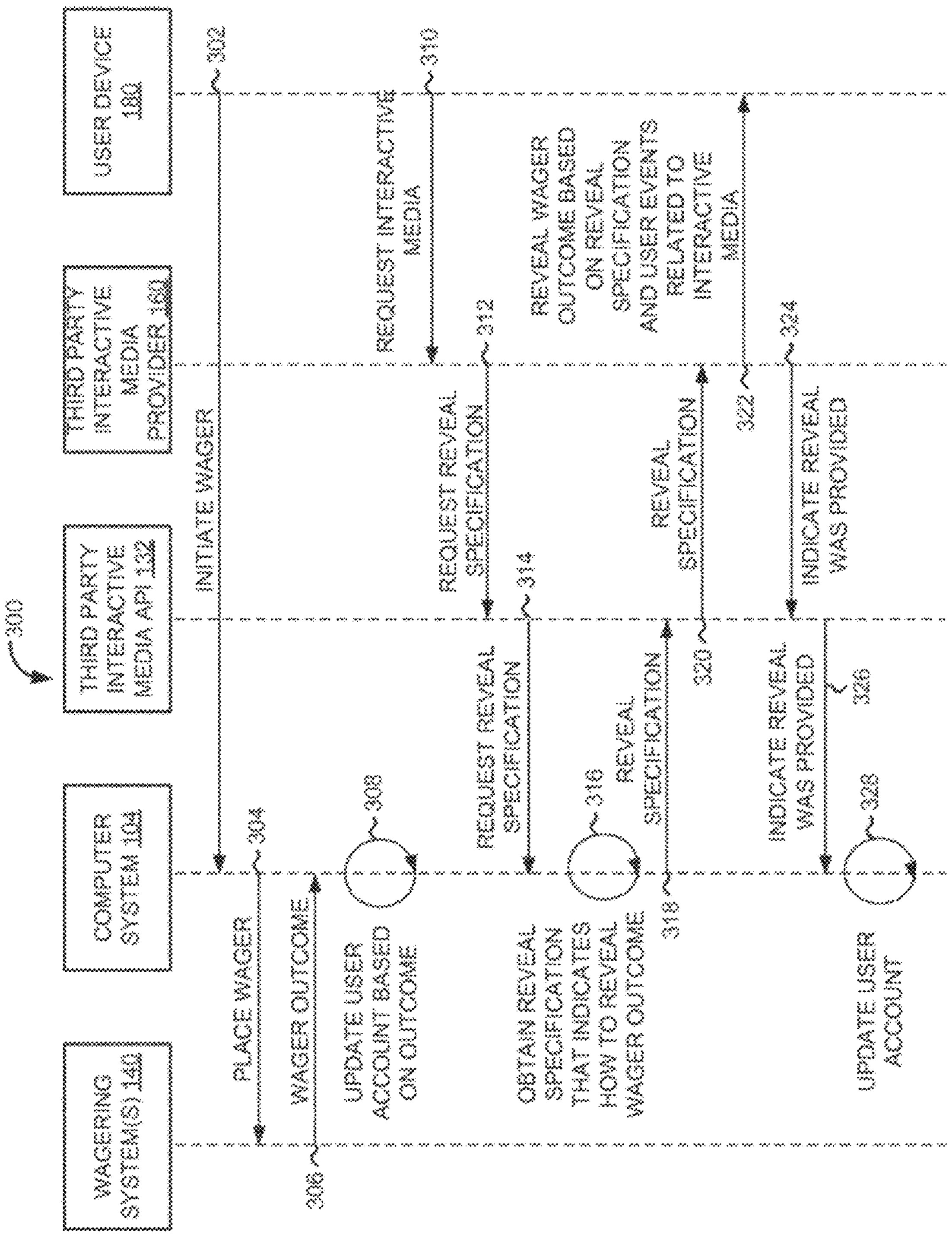
FIG. 3 illustrates a data flow diagram in a system of revealing real-world wager outcomes based on user interactions with interactive media provided by a third party interactive media provider, according to an implementation of the invention.

FIG. 3 illustrates a data flow diagram in a system of revealing real-world wager outcomes based on user interactions with interactive media provided by a third party interactive media provider, according to an implementation of the invention.

In an operation 302, a real-world wager may be initiated. The real-world wager may be initiated based on a token purchase, a user interaction in an interactive media interface, a direct initiation by the user, a reserve wager indication, and/or other wager trigger that can cause the real-world wager to be initiated. In an operation 304, responsive to the wager initiation, computer system 104 may place a real-world wager with wagering system(s) 140 or, in a reserve wagering implementation, associate a reserve wager with the wager initiation. In an operation 306, an outcome of the real-world wager or associated reserve wager may be obtained by computer system 104. In an operation 308, a user account 1405 associated with the user may be updated based on the outcome. For example, an unrevealed account 1450 or reserve unrevealed account 1460 associated with the user may be incremented by the payout amount.

In an operation 310, a user may request (from user device 180) interactive media from a third party interactive media provider 160. Responsive to the request, in an operation 312, third party interactive media provider 160 may make an API call to third party interactive media API 132 requesting a reveal specification. The API call may include user credentials (e.g., a username and password) used to authenticate the user, reveal parameters specified by third party interactive media provider 160, and/or other information. The reveal parameters may specify a limit on a payout amount to be revealed. For example, a twenty five cent slot machine game may not provide large wins and therefore may place a limit on the amount of payout that it can reveal.

Other game-specific characteristics such as a requested denomination (e.g., a particular game may wish to provide payouts in particular denominations or other items of value), a level of difficulty, an average length of gameplay, whether the game is online or offline enabled, etc., may be used to specify the reveal as well, which may be provided in the reveal parameters. For example, a particular game may wish to provide payouts using particular denominations of real or virtual currency. Computer system 104 may convert a cash value of the payout to the requested denomination such that any payout revealed by the particular game is made in the requested denomination. In another example, longer duration games may be associated with larger potential payout reveals. In an operation 314, third party interactive media provider 160 may process the API call and request a reveal specification from computer system 104.

In an operation 316, computer system 104 may obtain a reveal specification (which may take into account any reveal parameters) that indicates how to reveal the outcome of the real-world wager. For example, the reveal specification may indicate when the reveal may occur (e.g., a time by which the reveal must occur before expiring), how the reveal may occur (e.g., in a single event or over multiple events), an amount of the reveal (e.g., a real currency value of the reveal), any bonus reveal that may be provided (e.g., a bonus virtual item that accompanies the reveal), a level of difficulty of an objective used to make the reveal (e.g., some reveals may require a more difficult-to-achieve objective than other reveals), and/or other parameters that specify how and/or when the reveal may occur.

In operations 318 and 320, the reveal specification may be communicated to third party interactive media provider 160 through third party interactive media API 132. In an operation 322, the outcome of the real-world wager may be revealed to the user based on the reveal specification. In an implementation, multiple reveal specifications may be requested throughout gameplay (not illustrated in FIG. 3).

Third party interactive media provider 160 may use its own game mechanics to reveal the outcome according to the reveal specification. For example, a shooting game may provide an objective to hit a target that, if hit by the user, causes the reveal to occur as if the outcome of the real-world wager resulted from successful hit (even though the outcome of the real-world wager was predefined). If not hit by the user, the reveal may not occur and may be saved for another reveal opportunity, either within the shooting game and/or other interactive media. In another example, a puzzle game may provide an objective to complete at least a portion of a puzzle. In another example, a media streaming service may provide a video that upon viewing by the user for at least some period of time causes the reveal to occur. Other examples using different types of interactive media may be used as well, leveraging different types of game mechanics and other interactive media formats to potentially provide reveals of outcomes of real-world wagers to users.

In an implementation, user device 180 (which renders the game or other interactive media) may pre-cache the reveal specification. A given reveal specification may be pre-cached before the game starts or after the game starts. In this manner, offline gameplay may be enabled where, once pre-cached at user device 180, reveals may occur during offline gameplay. When the user device 180 returns online, any reveals that occurred may be reported to computer system 104.

In an implementation, the reveal specification may specify whether a reveal can be associated with an objective that is achievable or has a predetermined outcome. For example, viewing a video may be achievable and may not be suitable for an objective that is predetermined to fail.

Although described with respect to third party interactive media API 132 and third party interactive media provider 160, the processing operations described with respect to FIG. 3 is applicable in other contexts as well. For example, a game may execute on user device 180 (whether or not third party interactive media provider 160 is involved). The game may request a reveal specification from computer system 104 (along with reveal parameters, if applicable) and pre-cache the reveal specification before or during gameplay. The game may interface with computer system 104 using third party interactive media API 132 or an equivalent API that can interface with computer system 104.

Figure 4:
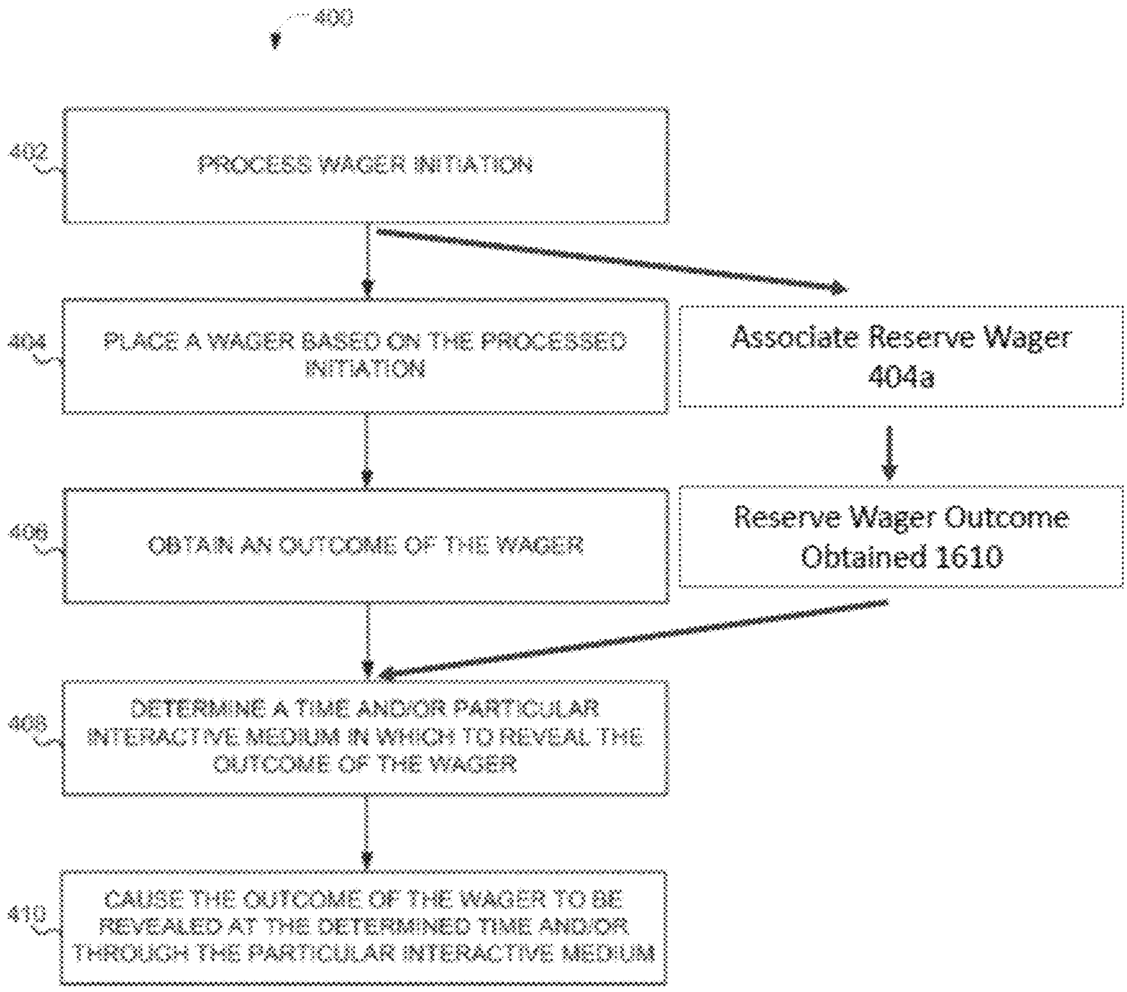
FIG. 4 illustrates a flow diagram for a process of revealing real-world wager outcomes based on user interactions with interactive media, including by using reserve wagering, according to an implementation of the invention.

FIG. 4 illustrates a flow diagram for a process of revealing real-world wager outcomes based on user interactions with interactive media, according to an implementation of the invention.

In an operation 402, a wager initiation may be processed. The wager initiation may include a token purchase, a user interaction with interactive media, a user specified wager specification, and/or other way to initiate a real-world wager.

In an operation 404, a real-world wager may be placed responsive to the wager initiation. Alternatively, in operation **404*a***, a reserve wager may be associated with the target real-world wager in the manner discussed herein.

In an operation 406, an outcome of the real-world wager may be obtained. Alternatively, in operation **406*a***, the outcome of the associated reserve wager is obtained. The outcome may include a payout (e.g., a win), a loss, or a draw.

In an operation 408, a timing and/or particular interactive media to reveal the outcome obtained in operations 406 or **406*a*** may be determined. For example, payouts may use particular types of interactive media while losses may use other types of interactive media.

In an operation 410, the outcome may be revealed based on the timing and/or particular interactive media.

Figure 5:
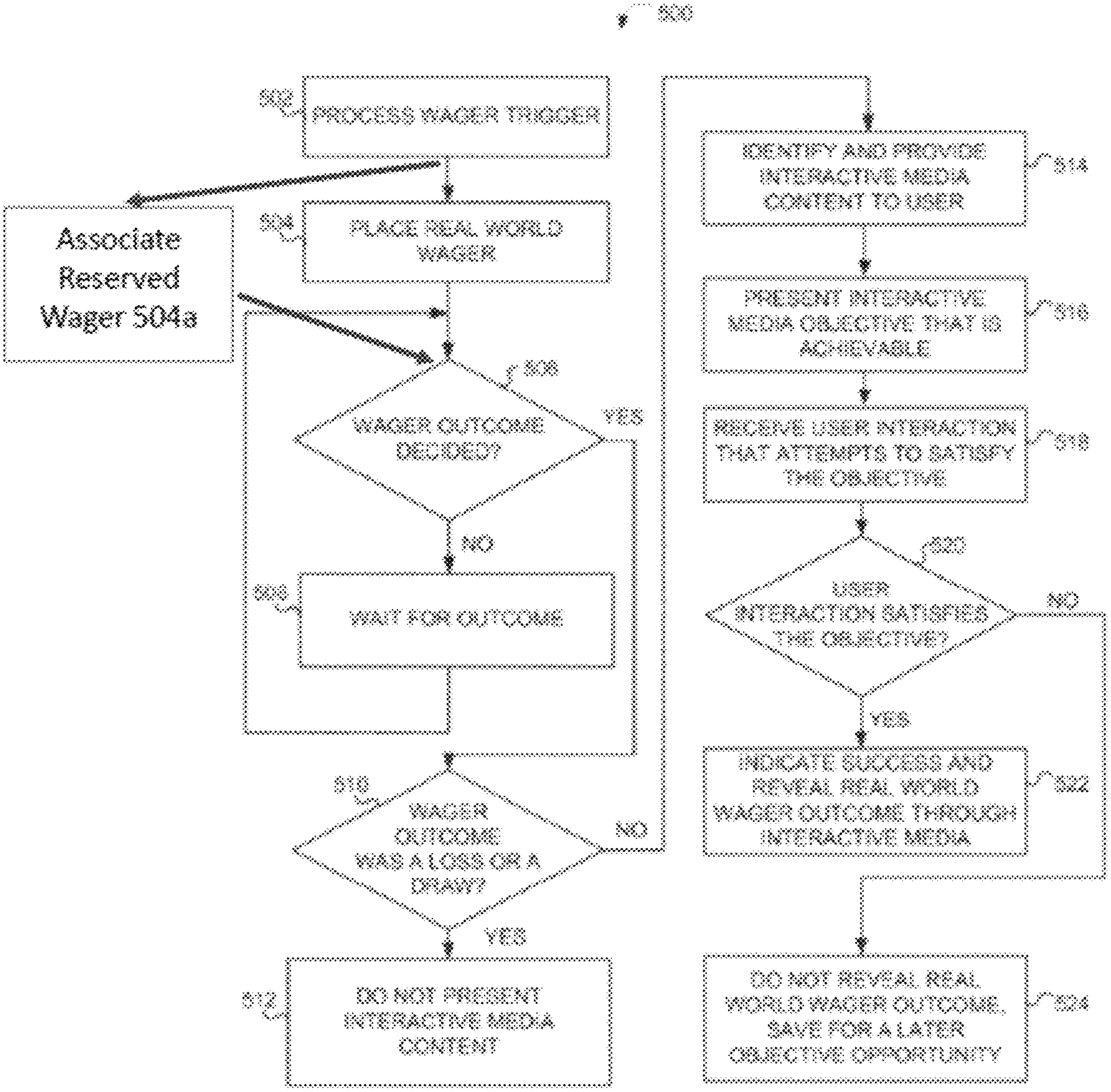
FIG. 5 illustrates a flow diagram for a process of revealing outcomes of real-world wagers that were triggered before user interactions with interactive media, including by using reserve wagering, according to an implementation of the invention.

FIG. 5 illustrates a flow diagram for a process 500 of revealing outcomes of real-world wagers that were triggered before user interactions with interactive media, according to an implementation of the invention.

In an operation 502, a wager trigger may be processed.

In an operation 504, a real-world wager may be placed in response to the wager trigger. For example, and without limitation, a real-world wager on a horse race may be placed. Alternatively, in an operation 504*a*, a reserve wager may be associated with a target wager in the manner discussed above. In an operation 506, a determination of whether the outcome of the wager has been decided may be made. For example, a determination of whether the result of the horse race has been decided may be made. In the context of a reserve wager where the outcome is already known, this step can be omitted. In the context of an associated reserve wager having a result that is not yet known (but will be known before a real-world wager placed in response to the wager trigger), this step may be performed.

In an operation 508, if the outcome has not been decided, process 600 may wait for a period of time for the outcome to be decided. In an implementation, the period of time may be predefined.

In an operation 510, a determination of whether the outcome (either from a current wager through operation 504 or from an associated reserve wager in operation 504*a*) was a loss or a draw may be determined. In an operation 512, if the outcome was a loss or a draw, no interactive media may be provided to the user that reveals the outcome. In another implementation (not illustrated in FIG. 5), interactive media that includes an objective that is not achievable may be provided to the user.

In an operation 514, if the outcome was not a loss or a draw (e.g., includes a payout), interactive media may be identified and provided to the user. For example, a suitable game, video, etc., may be identified that can be used as a medium for which to reveal the outcome of the real-world wager (or reserve wager) such that it appears to the user that interaction with the medium by the user resulted in the payout, even though the payout was determined before the user interaction.

In an operation 516, an interactive media objective that is achievable may be presented to the user. The objective may be presented to the user explicitly (e.g., a communication may be provided to the user: "defeat a game boss and receive a reward," where the reward include the outcome of the real-world wager) or may appear to the user to occur during the course of interaction with the interactive media (e.g., a user may defeat the game boss and be provided with the reward without any prior notification that doing so would result in the reward).

In an operation 518, an indication of a user interaction that attempts to satisfy the objective may be received. In an operation 520, a determination of whether the user interaction satisfies the objective may be made. If the objective is satisfied, in an operation 522, the outcome of the real-world wager (or reserve wager) may be revealed to the user such that the outcome appears to have resulted from successful completion of the objective. On the other hand, if the objective is not satisfied, in an operation 524, the outcome may not be revealed (and the user may or may not be notified of such failure). The outcome may be retained for a later reveal opportunity, either in the current interactive media and/or other interactive media that is provided to the user.

Figure 6A:
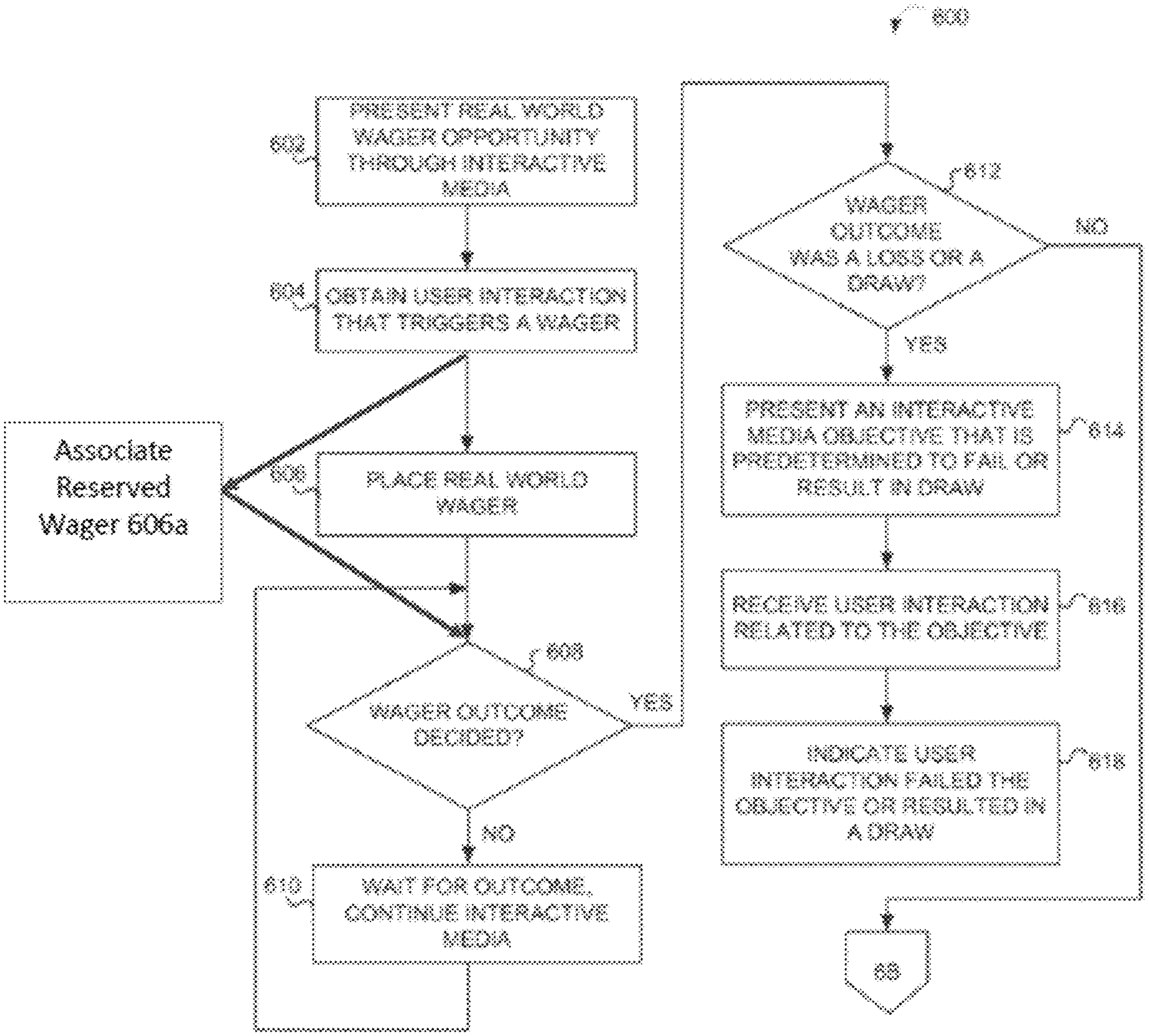
FIG. 6A illustrates a portion of a flow diagram for a process of revealing outcomes of real-world wagers triggered by user interactions with interactive media, including by using reserve wagering, according to an implementation of the invention.

FIG. 6A illustrates a portion of a flow diagram for a process 600 of revealing outcomes of real-world wagers triggered by user interactions with interactive media, according to an implementation of the invention.

In an operation 602, a real-world wager opportunity may be presented to a user through interactive media. The real-world wager opportunity may be associated with the start of interactive media and/or during interactive media. For example, a user may be presented with an opportunity to start playing a game for a particular value of one or more tokens, start viewing a video for the particular value, and/or start other types of interactive media. Alternatively or additionally, the user may be presented with an in-game opportunity such as to purchase a particular item for a particular value of one or more tokens, an opportunity to continue watching a video for the particular value, and/or otherwise interact with the interactive media.

Whichever implementation is used to present a real-world wager opportunity, a user interaction that triggers a real-world wager may be obtained in an operation 604. For example, the user may indicate a willingness to start the game for the particular value of one or more tokens, purchase an in-game item, etc.

In an operation 606, responsive to the wager trigger from operation 604, a real-world wager may be placed. Alternatively, in an operation 606*a*, a reserve wager may be associated with a target wager in the manner discussed above.

In an operation 608, a determination of whether the outcome of the real-world wager has been decided may be determined. If the outcome has not been decided, process 600 may wait for the outcome and continue provided the interactive media. For example, the game may be initiated and the user may be allowed to play the game until the outcome is decided. In other implementations not illustrated in FIG. 6A, the start of the game (or other interactive media) or in-game purchase (or other user interaction) may be delayed until the outcome of the real-world wager has been decided. In the context of a reserve wager where the outcome is already known, this step can be omitted. In the context of an associated reserve wager having a result that is not yet known (but will be known before a real-world wager placed in response to the wager trigger), this step may be performed.

In an operation 612, if the outcome of the real-world wager has been decided (either from a current wager through operation 606 or from an associated reserve wager in operation 606*a*), a determination of whether the outcome was a loss or a draw may be made.

In an operation 614, if the outcome was a loss or a draw, an interactive media objective that is not achievable (e.g., predetermined to result in failure or a draw) may be presented to the user. For example, a target that cannot be hit may be presented to the user. In another implementation not illustrated in FIG. 6A, an interactive media objective may not be presented to the user if the outcome was a loss or a draw.

In an operation 616, a user interaction that attempts to satisfy the interactive media objective that is not achievable may be received. For example, a user attempt to hit the target may be received. In an operation 618, the failure may be indicated to the user such that the loss/draw resulting from the real-world wager appears to result from the failure to satisfy the objective.

Figure 6B:
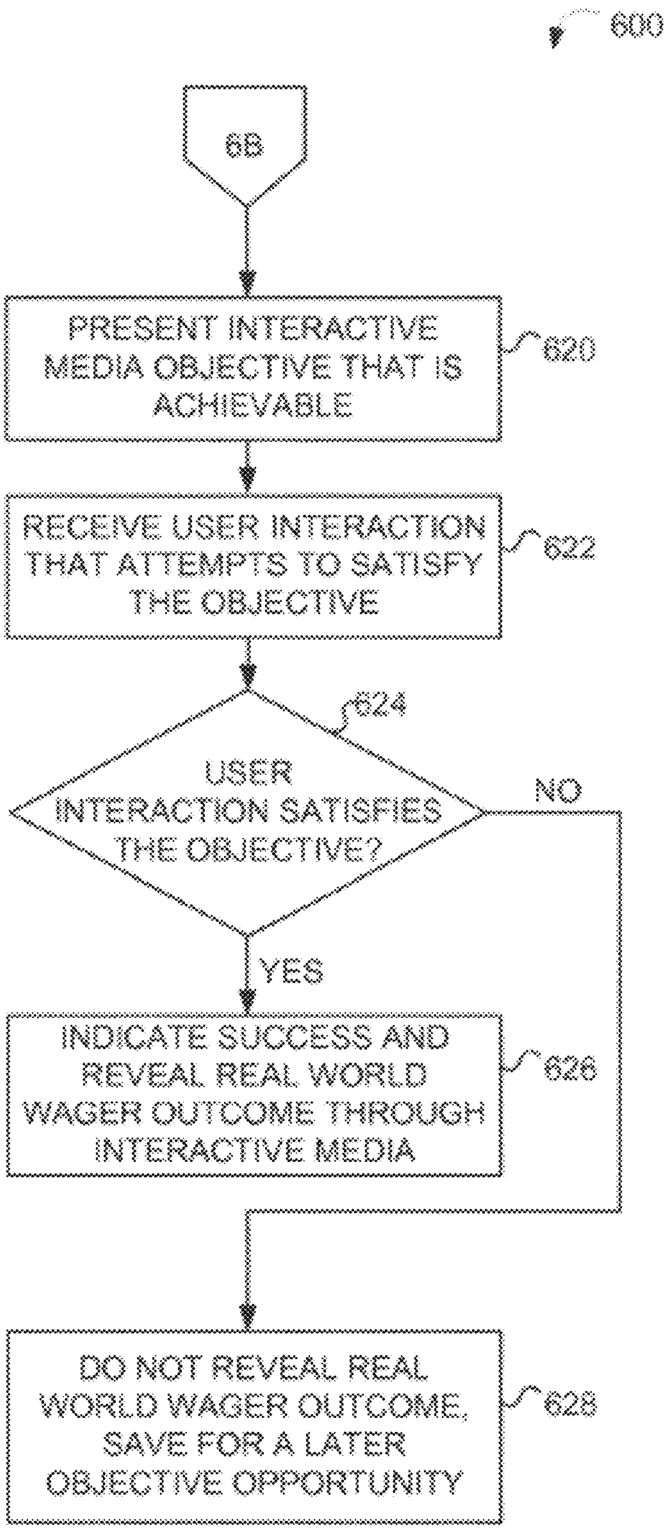
FIG. 6B illustrates another portion of a flow diagram for the process of revealing outcomes of real-world wagers triggered by user interactions with interactive media, including by using reserve wagering, according to an implementation of the invention.

Referring back to operation 612, if the outcome was not a loss or a draw, process 600 may proceed to operation 620 illustrated in FIG. 6B, which illustrates another portion of a flow diagram for process 600 of revealing outcomes of real-world wagers triggered by user interactions with interactive media, according to an implementation of the invention.

Referring to FIG. 6B, in operation 620, an interactive media objective may be presented to the user that is achievable. The objective may be presented to the user explicitly (e.g., a communication may be provided to the user: "defeat a game boss and receive a reward," where the reward include the outcome of the real-world wager) or may appear to the user to occur during the course of interaction with the interactive media (e.g., a user may defeat the game boss and be provided with the reward without any prior notification that doing so would result in the reward).

In an operation 622, an indication of a user interaction that attempts to satisfy the objective may be received. In an operation 624, a determination of whether the user interaction satisfies the objective may be made. If the objective is satisfied, in an operation 626, the outcome of the real-world wager may be revealed to the user such that the outcome appears to have resulted from successful completion of the objective. On the other hand, if the objective is not satisfied, in an operation 628, the outcome may not be revealed (and the user may or may not be notified of such failure). The outcome may be retained for a later reveal opportunity, either in the current interactive media and/or other interactive media that is provided to the user.

Figure 7:
FIG. 7 illustrates a screenshot of a user interface used to interact with the interactive media and wager platform provided by the computer system, according to an implementation of the invention.

FIG. 7 illustrates a screenshot 700 of a user interface 701 used to interact with the interactive media and wager platform provided by computer system 104, according to an implementation of the invention. User interface 701 (and other user interfaces described herein) may be used to cause various actions to be performed by computer system 104.

Figure 8:
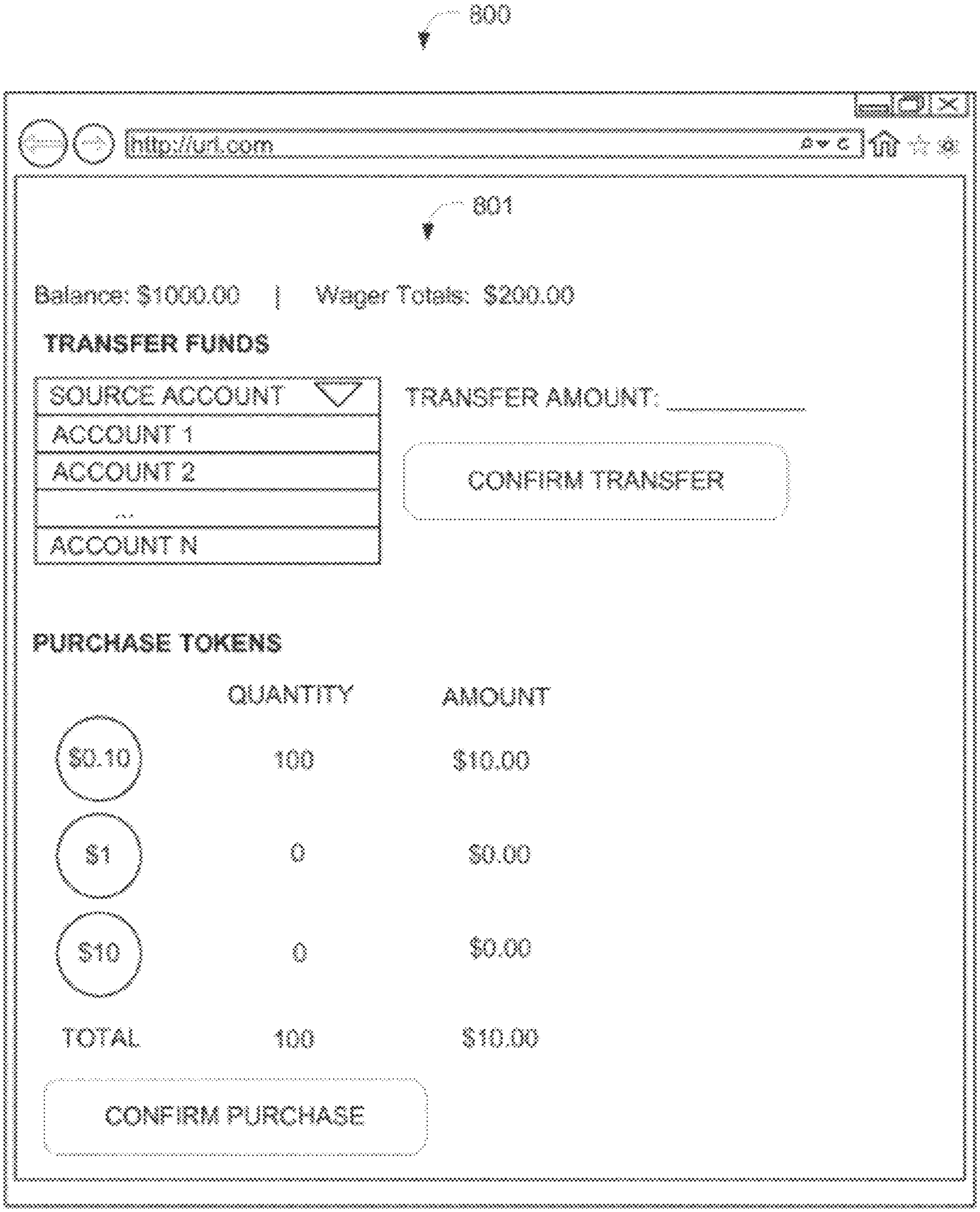
FIG. 8 illustrates a screenshot of a user interface used to manage user accounts, including transferring funds and purchasing tokens, according to an implementation of the invention.

For example, an input 702, when selected (e.g., clicked or otherwise interacted with), may cause an account management interface to be provided (as illustrated in FIG. 8).

Figure 9:
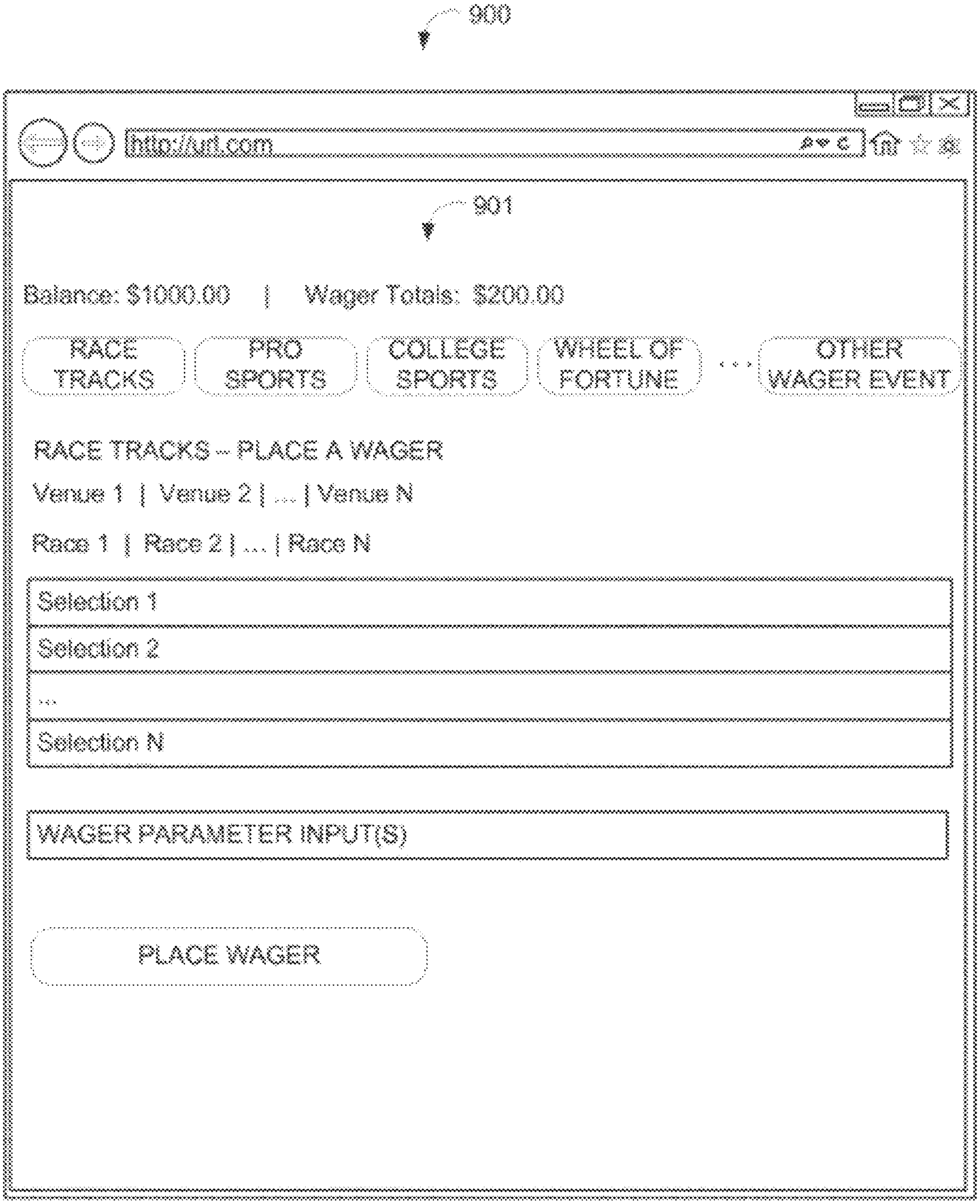
FIG. 9 illustrates a screenshot of a user interface used to directly place wagers using the interactive media and wager platform provided by the computer system, according to an implementation of the invention.

An input 704, when selected, may cause a real-world wager interface to be provided (as illustrated in FIG. 9). The real-world wager interface may allow the user to directly place real-world wagers via computer system 104.

Figure 10:
FIG. 10 illustrates a screenshot of a user interface used to select games to play using the interactive media and wager platform provided by the computer system, according to an implementation of the invention.

An input 706, when selected, may cause a game selection interface to be provided (as illustrated in FIG. 10). The game selection interface allows the user to select games to play. Computer system 104 may reveal an outcome of a real-world wager through the selected games.

An input 708, when selected, may cause a video selection interface to be provided (not illustrated in the figures). The video selection interface allows the user to select videos to watch. Computer system 104 may reveal an outcome of a real-world wager through the selected videos.

An input 710, when selected, may cause other interfaces that allows selection of other interactive media (e.g., music, photos, etc.) to be provided or other actions to be performed. Computer system 104 may reveal an outcome of a real-world wager through the other interactive media.

FIG. 8 illustrates a screenshot 800 of a user interface 801 used to manage user accounts, including transferring funds and purchasing tokens, according to an implementation of the invention. User interface 801 may be used to transfer funds from a payment account 1410 (e.g., one or more accounts that were added during the enrollment process) to a ADW account 1420 stored by computer system 104, and to view balances in various other accounts as provided by the system. Computer system 104 may cause funds to be transferred to/from various accounts responsive to the inputs received via user interface 801. In an implementation (not illustrated), user interface 801 may be used to add payment accounts 1410 that can be used to provide funds.

User interface 801 may be used to purchase tokens. In an implementation, as illustrated, different tokens may correspond to different denominations of cash value. The user may specify which token and a number of the tokens to purchase. A token purchase may result in the corresponding adjustment of the value of an ADW account 1420 and a token account 1430. The purchase of a given token may also cause a real-world wager in the amount of the value of the given token to be placed, or for the reserve wagering functionality to associate a reserve wager with the token, in the manner discussed above, which may cause the cash value of the given token to be depleted (to pre-pay for the real-world wager). In an implementation, the given token may be used to interact with interactive media (e.g., play a game). If so used, the outcome of the real-world wager (or reserve wager) may be revealed through the interactive media (and/or through other interactive media).

Alternatively or additionally, different tokens may have other characteristics (e.g., different levels of risk as described herein). The user may purchase different tokens based on their individual characteristics.

FIG. 9 illustrates a screenshot 900 of a user interface 901 used to directly place wagers using the interactive media and wager platform provided by the computer system, according to an implementation of the invention. User interface 901 may be used by users to specify real-world wagers to be placed. In this manner, a user may select wager parameters, such as, without limitation, an identification of the type of wagering event on which to place a real-world wager, an identification of a venue at which to place the real-world wager (e.g., which of the wagering system(s) 140 to use), an identification of a wager event such as a horse race on which to place a real-world wager, a selection of a winner (e.g., particular horse that will win the race, numbers that will be randomly drawn, etc.), and/or other wager parameter inputs such as an amount and number of real-world wagers to place.

In an implementation, computer system 104 may obtain and present wager event information (not illustrated in FIG. 9). The wager event information may include, without limitation, a start of the event (e.g., date and/or time that the wager event will take place), competitors in the wager event (e.g., horses, teams, etc.) if applicable, odds information related to the wager event (e.g., chances of winning, point spread information, payouts, etc.), and/or other information. The wager event information may be obtained from wagering system(s) 140 and/or other source of information.

FIG. 10 illustrates a screenshot 1000 of a user interface 1001 used to select games to play using the interactive media and wager platform provided by the computer system, according to an implementation of the invention. The selected games may be downloaded and/or streamed to user devices (e.g., user device(s) 180). All or a portion of the selectable games may be provided by computer system 104. All or a portion of the selectable games may be provided by third party game publishers (e.g., third party interactive media provider(s) 160).

At least some of the selectable games may have a fee to play or be free to play. At least some of the games may be a promotional reward associated with them, which may be indicated to the user. For example, "GAME 5" may be associated with a promotion that incents the user to play the game. In an implementation, the incentive may be revealed in addition to a reveal of an outcome of a real-world wager (or reserve wager). For example, the incentive may augment the reveal of the outcome of the real-world wager (or reserve wager). In another implementation, the incentive may appear to be an additional incentive, when, in fact, the incentive is merely a reveal of the outcome of the real-world wager (or reserve wager). In other words, the incentive does not augment the reveal of the outcome of the real-world wager (or reserve wager).

User interface 1001 may be provided by computer system 104 and/or at least some of the aspects of user interface 1001 may be used in conventional online application stores, such as various mobile application stores used to provide game content to mobile devices.

Figure 11:
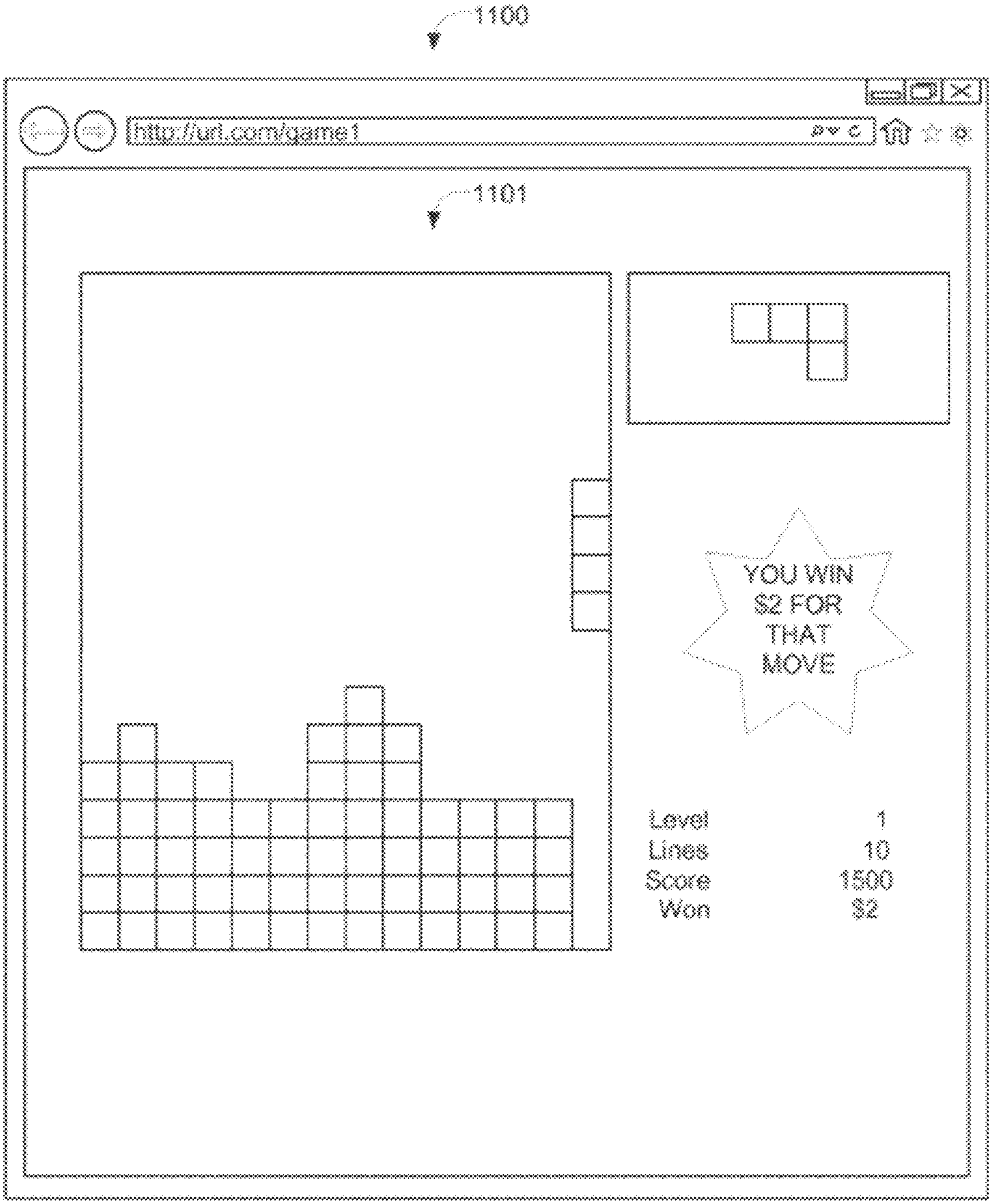
FIG. 11 illustrates a screenshot of a user interface used to play a game involving user skill in which a payout is revealed based on an event that occurs during gameplay, according to an implementation of the invention.

FIG. 11 illustrates a screenshot 1100 of a game interface 1101 used to play a game involving user skill in which a payout is revealed based on an event that occurs during gameplay, according to an implementation of the invention. A payout of a real-world wager may be revealed during gameplay such that certain user interactions with the game (e.g., user inputs that result in certain in-game actions) are rewarded by revealing at least a portion of the payout.

For example, computer system 104 may allocate a ten dollar payout (resulting from a real-world wager (or reserve wager) that has already occurred prior to the user interactions) to be potentially revealed by the game played using game interface 1101. Computer system 104 may determine the allocated payout amount based on various factors described herein. In an implementation, for example, the allocated payout amount may be based on a token used to play the game. For instance, if a particular two dollar token was used to play the game, any payout that is associated with that particular two dollar token may be used as the allocated payout amount.

The game may reveal none, a portion, or all of the allocated payout amount depending on an in-game action. Typically, the game may determine the particular in-game actions that trigger reveals (and how much each reveal should of the allocated potential reveal amount). Alternatively or additionally, computer system 104 may indicate in-game actions that should trigger reveals.

The game may report back to computer system 104 the amount of the payout that was revealed (if any) so that computer system 104 may update relevant accounts associated with the user that played the game.

Figure 12:
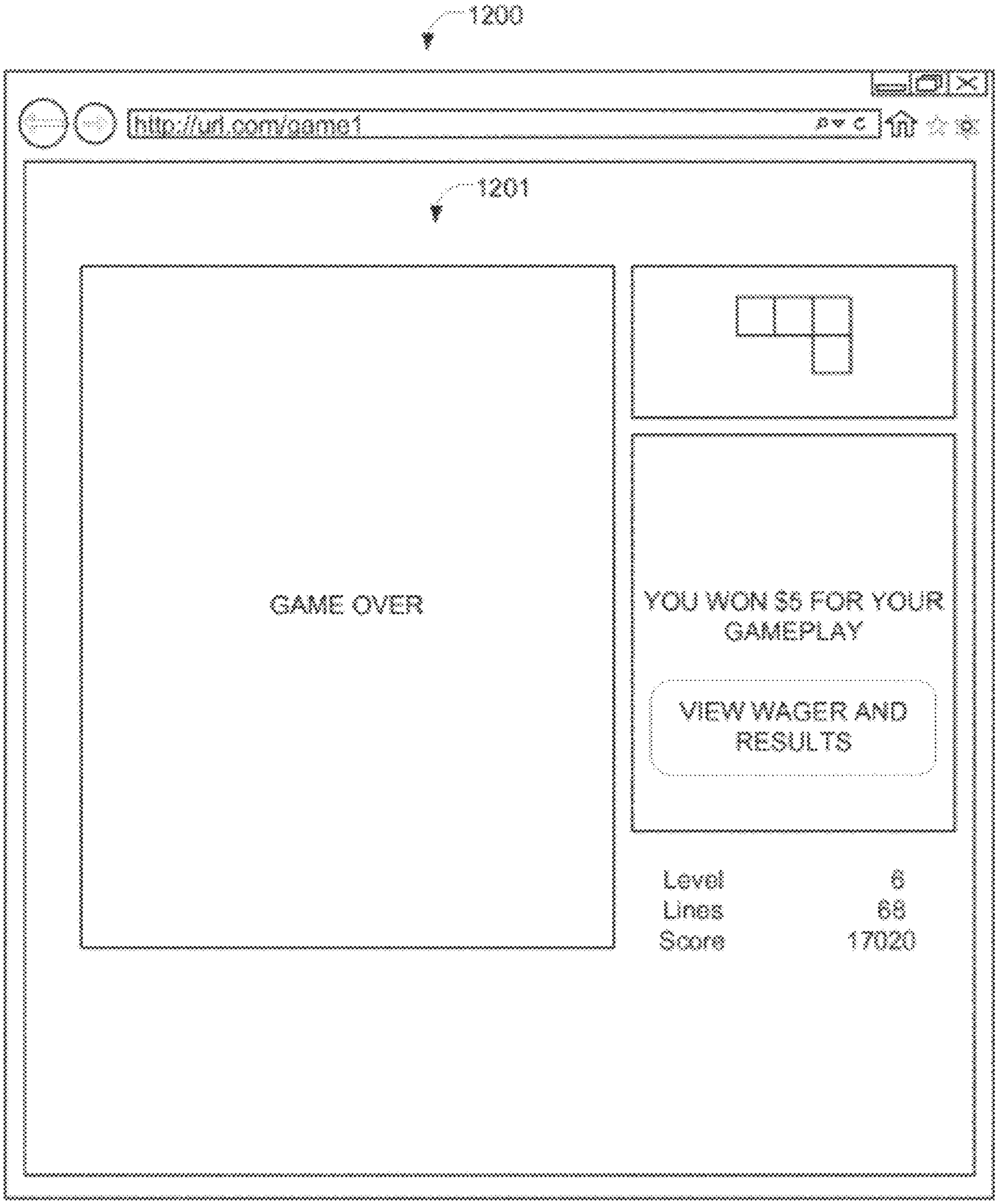
FIG. 12 illustrates a screenshot of a user interface used to play a game involving user skill in which a payout is revealed based on a gameplay result, according to an implementation of the invention.

FIG. 12 illustrates a screenshot 1200 of a game interface 1201 used to play a game involving user skill in which a payout is revealed based on a gameplay result, according to an implementation of the invention. As described above with respect to FIG. 11, the game may be allocated with a payout amount that may be potentially revealed. As illustrated in FIG. 12, a payout may be revealed in association with an overall gameplay (e.g., result of a game that has ended). The amount of the payout that is revealed may be determined based on a point total, a level total, and/or other gameplay performance metric. The gameplay performance metric may be specified by the game itself and/or by computer system 104.

Figure 13:
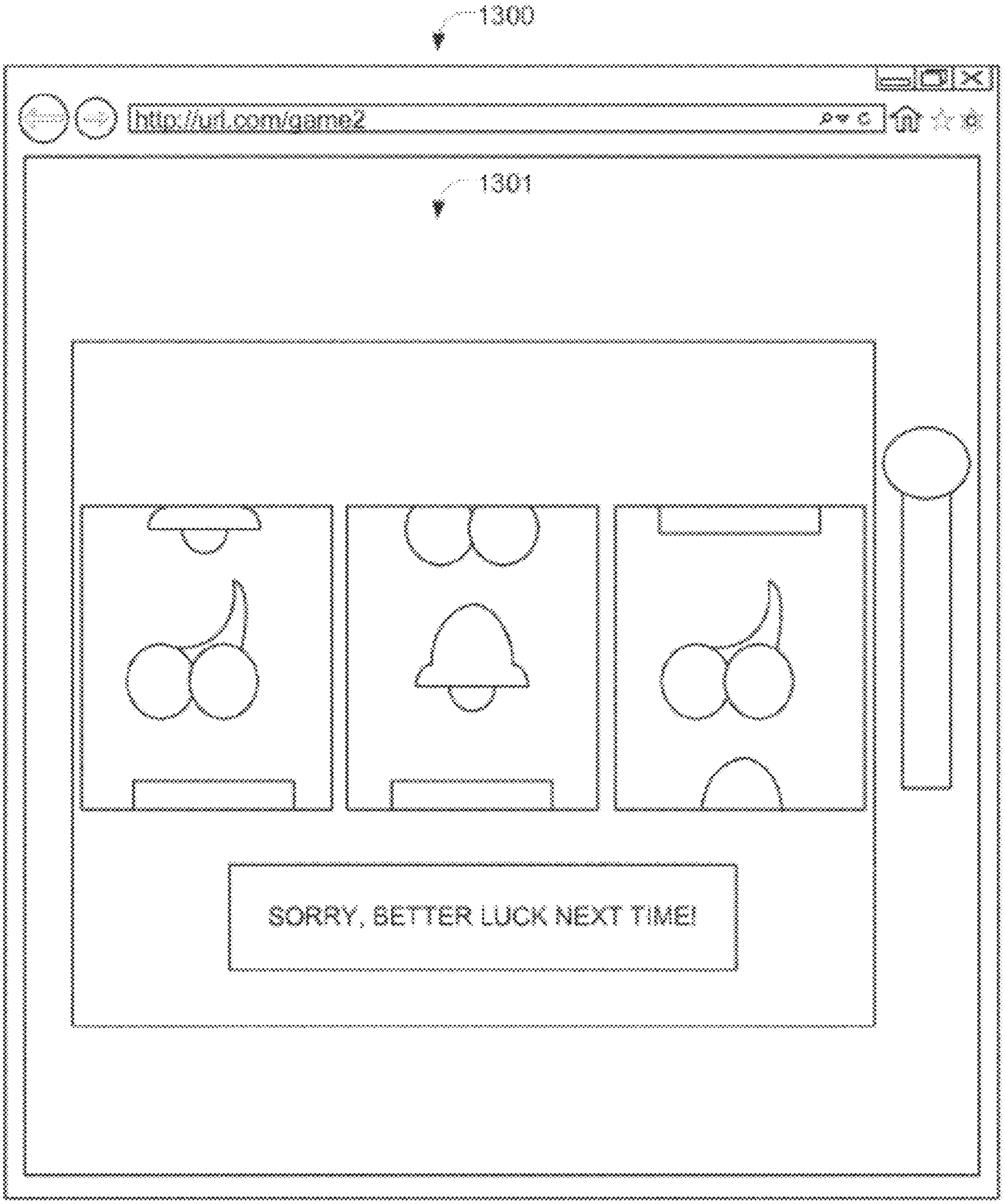
FIG. 13 illustrates a screenshot of a user interface used to play a game in which a payout is revealed based on random selections, according to an implementation of the invention.

FIG. 13 illustrates a screenshot 1300 of a game interface 1301 use to play a game in which a payout is revealed based on random selections, according to an implementation of the invention. The game played using user interface 1301 may use a random event generator such as a random number generator to generate random results. As illustrated in FIG. 13, the game includes a slot machine style game, although other random outcome based games may be used as well (e.g., a spinning wheel, randomly drawn numbers, etc.). As described above with respect to FIG. 11, the game may be allocated with a payout amount that may be potentially revealed. The amount of the allocated payout amount that is revealed may be determined based on the random event.

For example, in the illustrated slot machine game, the amount of the payout that is revealed may be based on a probability of an occurrence of a combination of symbols (e.g., where each symbol may have its own probability of being randomly selected based on a randomly generated number). Less probable combinations may be associated with higher payouts that are revealed. For instance, three "cherry" symbols may result in a maximum revealed payout (e.g., reveal the entire allocated payout amount), three "bell" symbols may result in half of the allocated payout amount being revealed, while zero matching symbols may result in zero payout being revealed.

By way of illustration and not limitation, an operation of gameplay for a game played using user interface 1301 will be described. The general principles of this example may be applied to skill-based games as well. As previously described, computer system 104 may allocate a payout amount that may be potentially revealed by the game. In an implementation, the game may provide an indication of a allocated payout that it should receive. For example, a game may not provide large payouts and therefore may request a maximum payout allocation. In this manner, the game may provide input used to determine the allocated payout amount. The game and/or the computer system 104 may determine various game events that trigger a reveal of at least a portion of the allocated payout amount that may be revealed.

The user may use a particular five dollar token to play the game. The five dollar token may be associated with an outcome of a real-world wager (or reserve wager). The allocated payout amount may be based on the outcome (e.g., the allocated payout amount may be fifty dollars if the payout associated with the five dollar token is fifty dollars or the allocated payout amount may be zero dollars if the payout associated with the five dollar token is zero dollars—this may occur when the real-world wager lost).

Based on gameplay, the user may potentially appear to win up to the allocated payout amount (e.g., fifty dollars). Thus, the user may be given the impression that gameplay results in winning a revealed amount, when in fact the revealed amount resulted from a payout of a real-world wager in which the outcome has already occurred. In an implementation, the outcome occurs before gameplay even starts. In an implementation, the outcome occurs during gameplay (in which case, apparent potential wins will not occur until the outcome occurs).

In the illustrated slot machine game, the game may use the five dollar token used to play the game to provide a number of virtual pulls for a chance to "win." For example, if each pull costs one half dollar, then the user may have a possibility of making ten pulls using the five dollar token. If none of the ten pulls results in a win (which may be randomly determined), then none of the allocated payout amount will be revealed and the game will communicate this to computer system 104. On the other hand, if at least some of the pulls results in a win, all or a portion of the allocated payout amount will be revealed. For example, if a ten dollar win results from the first pull, the user may be given the impression that the five dollar token may now be worth fifteen dollars (not accounting for the original half dollar fee for the first pull for illustrative purposes). The user may then continue gameplay using a number of pulls equivalent for the fifteen dollars (e.g., thirty pulls). If the user continues gameplay and does not win again, then the ten dollar reveal will be "unrevealed" and a zero reveal will be communicated to computer system 104. On the other hand, if the user does not attempt more pulls after the ten dollar win, the game will communicate the ten dollar reveal to computer system 104, which may update its records to indicate the ten dollar reveal occurred and/or indicate that forty dollars remains to be revealed.

Although illustrated as web-based interfaces (e.g., websites) rendered on a browser application, the various user interfaces described herein (e.g., illustrated by FIGS. 7-13)

may include, without limitation, the web-based interface, an electronic mail interface, a mobile application interface (including smartphones and tablets), one or more application programming interfaces, a Smart TV interface, a console game interface, a virtual reality interface, a GAMESTICK interface, and/or other interfaces that may be pulled by users and/or pushed to users. As would be appreciated, the various user interfaces may be communicably coupled to one or more components illustrated in FIG. 1 (e.g., computer system 104) either directly and/or through intermediaries. As such, inputs, selections, and/or other interactions with the user interfaces may cause one or more functions to be performed by one or more components illustrated in FIG. 1 responsive to the interactions with the user interfaces. Furthermore, the various graphical objects illustrated in the user interfaces are for illustration and not limitation. Other configurations, numbers, appearance, and/or other characteristics of the graphical objects may be changed according to particular needs (e.g., design/aesthetics).

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of revealing portions of outcomes of real-world wagers through interactive media applications, the method being implemented in a computer system having a non-transitory computer readable storage medium having stored thereon computer program instructions and one or more physical processors programmed with the computer program instructions that, when executed by the one or more physical processors, cause the computer system to perform the method, the method comprising:

storing, by the computer system, a plurality of reserve wagers in a reserve wager store;

providing, by the computer system, a wager opportunity to a user via interactive media;

receiving, by the computer system, an acceptance of the wager opportunity by the user;

matching, by the computer system, at least one reserve wager of the plurality of reserve wagers in the reserve wager store with the accepted wager opportunity;

obtaining, by the computer system, an outcome of the matched reserve wager;

updating, by the computer system, an unrevealed account balance based on the outcome of the matched reserve wager; and causing, by the computer system, at least a portion of the unrevealed account balance to be revealed to the user by the user's interaction with the interactive media.

2. The method of claim 1, further comprising storing a set of reserve wager rules, wherein reserve wagers are placed and stored in the reserve wager store based on the stored rules.

3. The method of claim 2, wherein the reserve wager rules comprise heuristic rules that balance maintaining an availability of wager results when needed by a user with not over committing unnecessary capital by making more reserve wagers than is likely to be necessary.

4. The method of claim 1, further comprising creating and managing, for the user, the reserve wager store, an unrevealed account to hold the unrevealed account balance, and a revealed account to hold a revealed account balance including at least the portion of the unrevealed account balance that is revealed to the user.

5. The method of claim 1, further comprising deleting the matched reserve wager from the reserve wager store after it is matched with the accepted wager opportunity.

6. The method of claim 1, wherein the wager opportunity comprises a direct wager opportunity.

7. The method of claim 1, wherein the wager opportunity comprises a token acquisition opportunity.

8. The method of claim 1, the method further comprising providing, by the computer system, the wager opportunity as a result of a pattern of interaction by the user with the interactive media.

9. The method of claim 1, the method further comprising obtaining, by the computer system, information about the user external to the computer system; and providing the wager opportunity as a result of the external information.

10. The method of claim 1, wherein the unrevealed account balance is associated with the user.

11. The method of claim 1, wherein the unrevealed account balance is associated with the system.

12. A system for revealing portions of outcomes of real-world wagers through interactive media applications, the system comprising:

a computer system having a non-transitory computer readable storage medium having stored thereon computer program instructions and one or more physical processors programmed with the computer program instructions that, when executed by the one or more physical processors, program the computer system to:

store a plurality of reserve wagers in a reserve wager store;

provide a wager opportunity to a user via interactive media;

receive an acceptance of the wager opportunity by the user;

match at least one reserve wager of the plurality of reserve wagers in the reserve wager store with the accepted wager opportunity;

obtain an outcome of the matched reserve wager;

update an unrevealed account balance based on the outcome of the matched reserve wager; and cause at least a portion of the unrevealed account balance to be revealed to the user by the user's interaction with the interactive media.

13. The system of claim 12, wherein the computer system is further programmed to store a set of reserve wager rules, wherein reserve wagers are placed and stored in the reserve wager store based on the stored rules.

14. The system of claim 13, wherein the reserve wager rules comprise heuristic rules that balance maintaining an availability of wager results when needed by a user with not over committing unnecessary capital by making more reserve wagers than is likely to be necessary.

15. The system of claim 12, wherein the computer system is further programmed to create and manage, for the user, the reserve wager store, an unrevealed account to hold the unrevealed account balance, and a revealed account to hold a revealed account balance including at least the portion of the unrevealed account balance that is revealed to the user.

16. The system of claim 12, wherein the computer system is further programmed to delete the matched reserve wager from the reserve wager store after it is matched with the accepted wager opportunity.

17. The system of claim 12, wherein the wager opportunity comprises a direct wager opportunity.

18. The system of claim 12, wherein the wager opportunity comprises a token acquisition opportunity.

19. The system of claim 12, wherein the computer system is further programmed to provide the wager opportunity as a result of a pattern of interaction by the user with the interactive media.

20. The system of claim 12, wherein the computer system is further programmed to obtain information about the user external to the computer system; and provide the wager opportunity as a result of the external information.

21. The system of claim 12, wherein the unrevealed account balance is associated with the user.

22. The system of claim 12, wherein the unrevealed account balance is associated with the system.

* * * * *